United States Patent
Park et al.

(10) Patent No.: US 11,627,334 B2
(45) Date of Patent: Apr. 11, 2023

(54) INTER PREDICTION-BASED IMAGE CODING METHOD AND APPARATUS

(71) Applicant: LG ELECTRONICS INC., Seoul (KR)

(72) Inventors: Naeri Park, Seoul (KR); Junghak Nam, Seoul (KR); Hyeongmoon Jang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/559,964

(22) Filed: Dec. 22, 2021

(65) Prior Publication Data
US 2022/0116652 A1    Apr. 14, 2022

Related U.S. Application Data

(63) Continuation of application No. PCT/KR2020/008133, filed on Jun. 24, 2020.
(Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/107* (2014.11);
(Continued)

(58) Field of Classification Search
CPC .... H04N 19/52; H04N 19/105; H04N 19/107; H04N 19/132; H04N 19/139; H04N 19/172; H04N 19/176; H04N 19/573
See application file for complete search history.

(56) References Cited

U.S. PATENT DOCUMENTS

| | | | | |
|---|---|---|---|---|
| 2008/0018788 A1* | 1/2008 | Zhou | ........ | H04N 19/112 375/E7.137 |
| 2009/0262249 A1* | 10/2009 | Niu | ........ | G06T 3/4007 348/E5.062 |

(Continued)

FOREIGN PATENT DOCUMENTS

| KR | 10-2017-0021302 A | 2/2017 |
|---|---|---|
| KR | 10-1941304 B1 | 1/2019 |

(Continued)

OTHER PUBLICATIONS

Chen, et al., "Symmetrical Mode for Bi-Prediction", Joint Video Exploration Team (JVET) of ITU-T SG 16 WP 3 and ISO/IEC JTC 1/SC 29/WG 11,10th Meeting, Document: JVET-J0063-v3, San Diego, USA, Apr. 10-21, 2018.

(Continued)

*Primary Examiner* — Jeremiah C Hallenbeck-Huber
(74) *Attorney, Agent, or Firm* — Dentons US LLP

(57) ABSTRACT

An image decoding method according to the present document may comprise the steps of: deriving an inter prediction mode from encoded information; configuring reference picture lists, deriving motion information comprising reference picture indexes for symmetric motion vector differences (SMVD); and generating prediction samples on the basis of the motion information, wherein the reference picture indexes for SMVD can be derived on the basis of short-term reference pictures included within the reference picture lists.

15 Claims, 23 Drawing Sheets

Related U.S. Application Data

(60) Provisional application No. 62/865,958, filed on Jun. 24, 2019.

(51) Int. Cl.

| | | |
|---|---|---|
| *H04N 19/132* | (2014.01) | |
| *H04N 19/176* | (2014.01) | |
| *H04N 19/70* | (2014.01) | |
| *H04N 19/107* | (2014.01) | |
| *H04N 19/139* | (2014.01) | |
| *H04N 19/172* | (2014.01) | |
| *H04N 19/573* | (2014.01) | |

(52) U.S. Cl.
CPC ......... *H04N 19/132* (2014.11); *H04N 19/139* (2014.11); *H04N 19/172* (2014.11); *H04N 19/176* (2014.11); *H04N 19/573* (2014.11); *H04N 19/70* (2014.11)

(56) References Cited

U.S. PATENT DOCUMENTS

| | | | | |
|---|---|---|---|---|
| 2014/0037011 A1* | 2/2014 | Lim | ............... | H04N 19/513 375/240.16 |
| 2014/0064374 A1* | 3/2014 | Xiu | ............... | H04N 19/31 375/240.16 |
| 2015/0078456 A1 | 3/2015 | Hannuksela | | |
| 2015/0085927 A1* | 3/2015 | Sjoberg | ............... | H04N 19/46 375/240.12 |
| 2016/0330472 A1* | 11/2016 | Han | ............... | H04N 19/573 |
| 2018/0278949 A1* | 9/2018 | Karczewicz | ............... | H04N 19/587 |

FOREIGN PATENT DOCUMENTS

| | | |
|---|---|---|
| KR | 10-2019-0032334 A | 3/2019 |
| WO | 2020/172341 A1 | 8/2020 |
| WO | 2020/221258 A1 | 11/2020 |

OTHER PUBLICATIONS

Chen, et al., "CE4: Symmetrical MVD Mode (Test 4.5.1)" Joint Video Experts Team (JVET) of ITU-T SG 16 WP 3 and ISO/IEC JTC 1/SC 29/WG 11,12th Meeting, Document: JVET-L0370-v1, Macao, CN, Oct. 3-12, 2018.

Luo, et al. "CE4-Related: Simplified Symmetric MVD Based on CE4.4.3", Joint Video Experts Team (JVET) of ITU-T SG 16 WP 3 and ISO/IEC JTC 1/SC 29/WG 11, Document: JVET-M0444-v2,13th Meeting: Marrakech, MA, Jan. 9-18, 2019.

Bross,"Versatile Video Coding (Draft 5)", JVET-N1001-v8, Joint Video Experts Team (JVET) of ITU-T SG 16 WP 3 and ISO/IEC JTC 1/SC 29/WG 11, 14th Meeting: Geneva, CH, Jun. 11, 2019, pp. 1-385, 55, 124-127, 160-165, 175-176.

* cited by examiner

FIG. 8
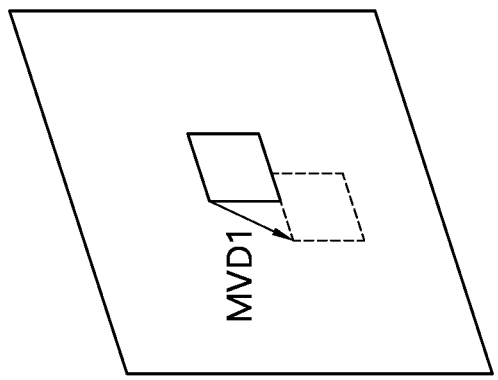
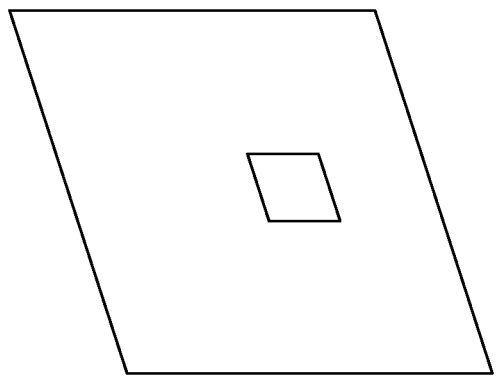
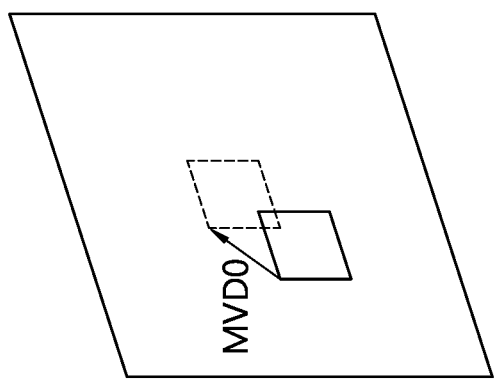

INTER PREDICTION-BASED IMAGE CODING METHOD AND APPARATUS

This application is the Continuation Bypass of International Application No. PCT/KR2020/008133, filed on Jun. 24, 2020, which claims the benefit of U.S. Provisional Application No. 62/865,958, filed on Jun. 24, 2019, the contents of which are all hereby incorporated by reference herein in their entirety.

BACKGROUND OF THE DISCLOSURE

Field of the Disclosure

The present document is related to an inter prediction-based image coding method and apparatus.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

Also, inter prediction in image/video coding may include a procedure for symmetric motion vector difference (SMVD) reference indices and/or a procedure for a merge motion vector difference (MMVD). There is a discussion of applying a related technology to the procedure for SMVD reference indices by considering reference picture marking (for example, short-term or long-term reference).

SUMMARY

According to an embodiment of the present document, a method and a device for improving image/video coding efficiency are provided.

According to an embodiment of the present document, a method and a device for performing inter prediction efficiently in an image/video coding system are provided.

According to an embodiment of the present document, a method and a device for signaling information on motion vector differences for inter prediction are provided.

According to an embodiment of the present document, a method and a device for signaling information on L0 motion vector differences and L1 motion vector differences are provided when bi-prediction is applied to a current block.

According to an embodiment of the present document, a method and a device for signaling an SMVD flag are provided.

According to an embodiment of the present disclosure, a method and a device for deriving an L1 motion vector difference based on an SMVD flag are provided.

According to an embodiment of the present document, a procedure for SMVD reference indices may be performed based on reference picture marking.

According to an embodiment of the present document, a procedure for SMVD reference indices may be performed using short-term reference pictures (pictures marked as being used for short-term reference).

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Advantageous Effects

According to the present disclosure, the overall image/video compression efficiency may be improved.

According to the present disclosure, signaling of information on motion vector differences may be performed efficiently.

According to the present disclosure, L1 motion vector differences may be efficiently derived when bi-prediction is applied to a current block.

According to the present disclosure, the complexity of a coding system may be reduced by signaling information used for deriving L1 motion vector differences efficiently.

According to one embodiment of the present disclosure, efficient inter prediction may be performed using short term reference pictures for deriving a reference picture index of SMVD.

The technical effects achieved through specific embodiments of the present disclosure are not limited to those described above. For example, various other technical effects may be obtained, which may be understood or derived from the present disclosure by a person having ordinary skills in the related art. Therefore, specific effects of the present disclosure are not limited to the embodiments disclosed explicitly in this document and may include various other effects that may be understood or derived from the technical characteristics of the present disclosure.

BRIEF DESCRIPTION OF THE DRAWINGS

FIG. 8 is a diagram for describing symmetric motion vector differences (SMVD) according to one embodiment of the present disclosure.

DESCRIPTION OF EXEMPLARY EMBODIMENTS

Figure 1:
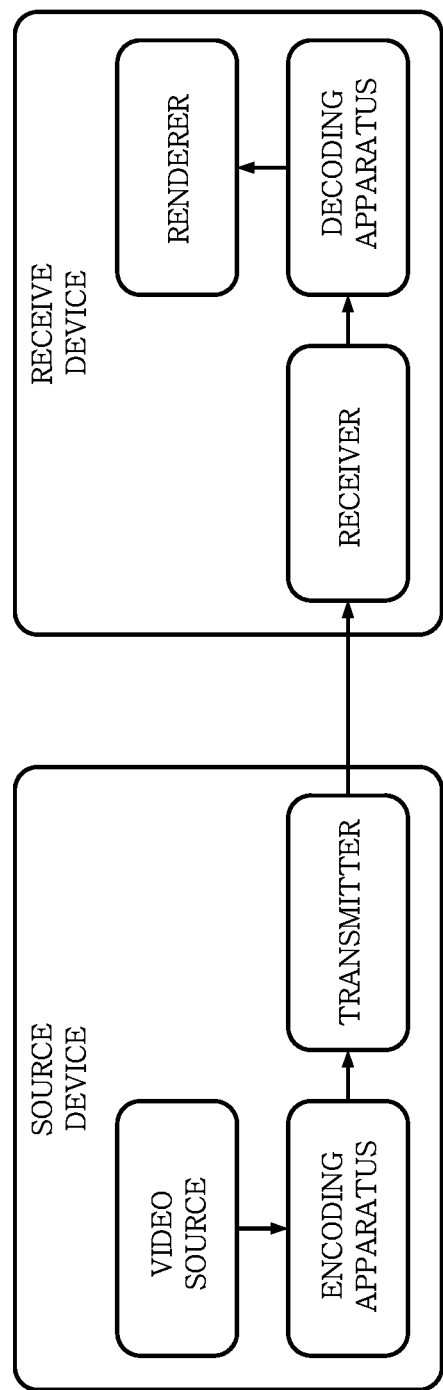
FIG. 1 illustrates an example of a video/image coding system to which the embodiments of the present document may be applied.

The present document may be modified in various forms, and specific embodiments thereof are described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the disclosure of the present document.

Hereinafter, examples of the present embodiment are described in detail with reference to the accompanying drawings. In addition, like reference numerals are used to indicate like elements throughout the drawings, and the same descriptions on the like elements are omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Figure 2:
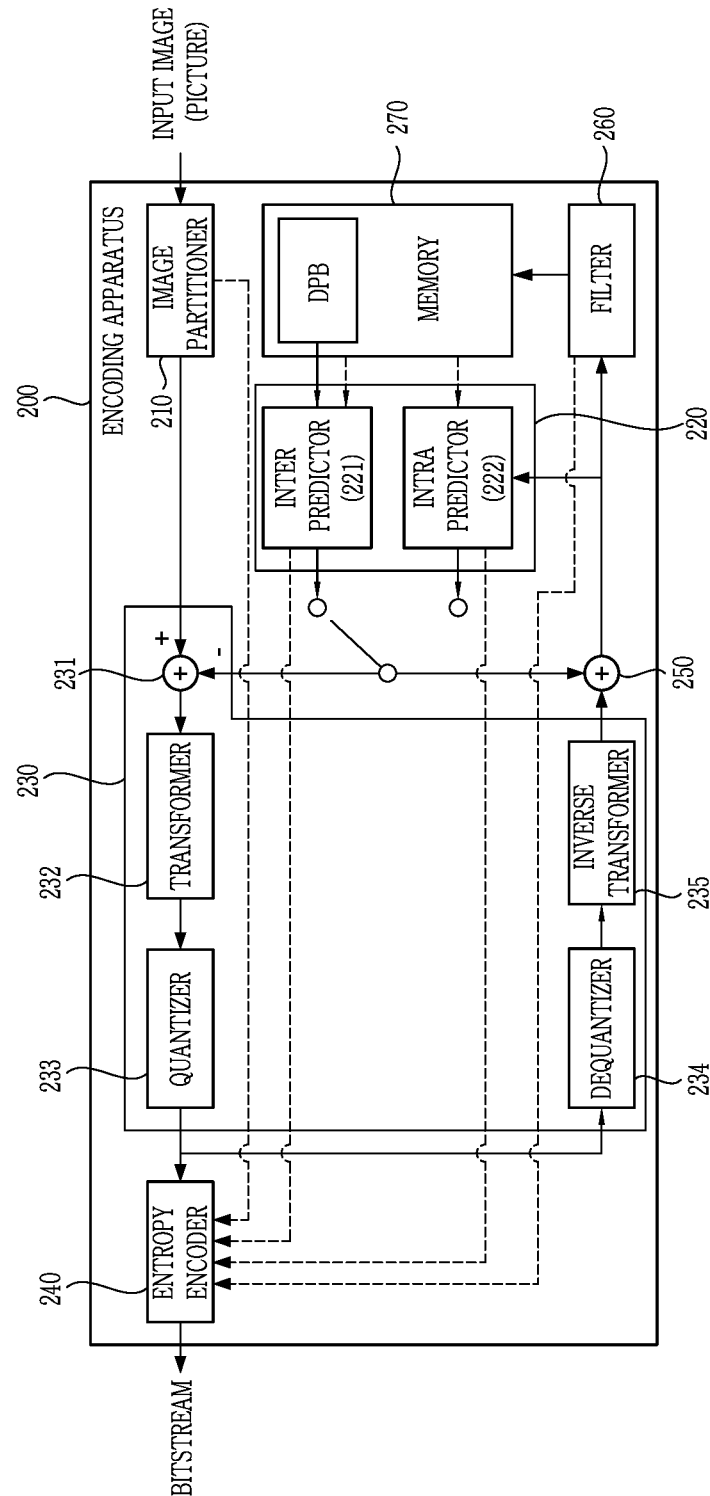
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which are described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
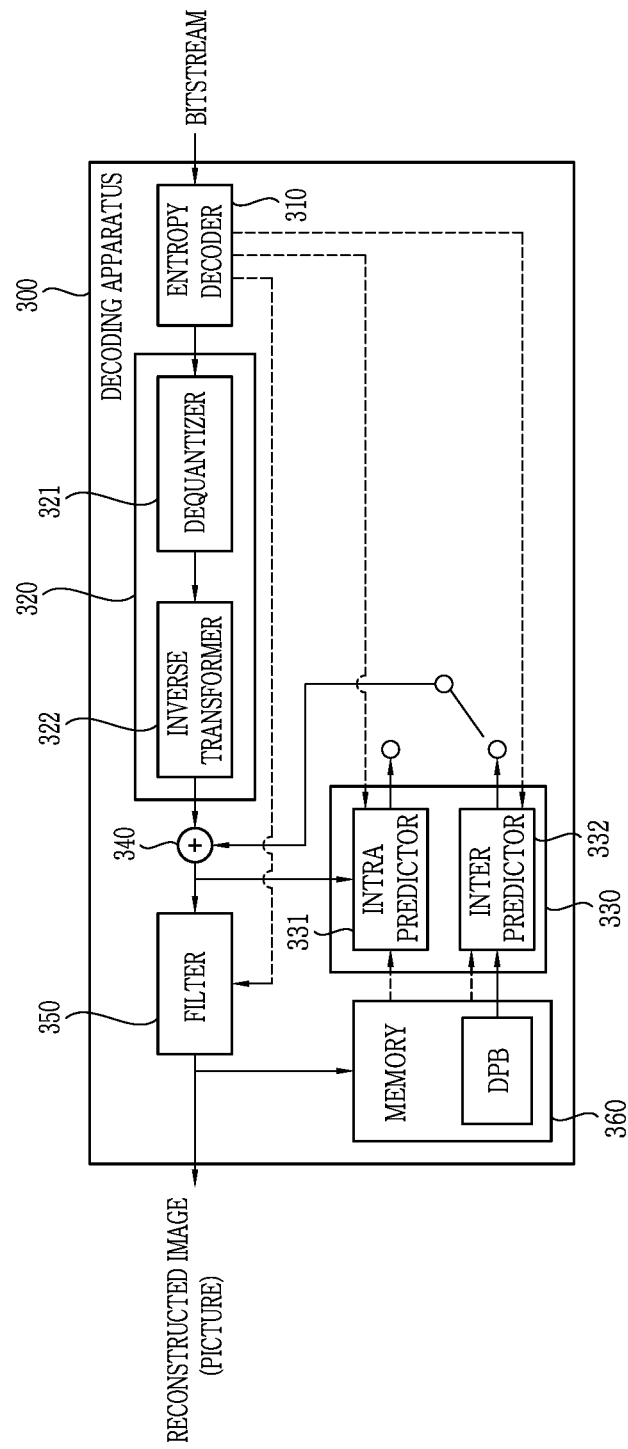
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra subpartitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

A video/image encoding procedure based on inter prediction may include, for example, the following.

Figure 4:
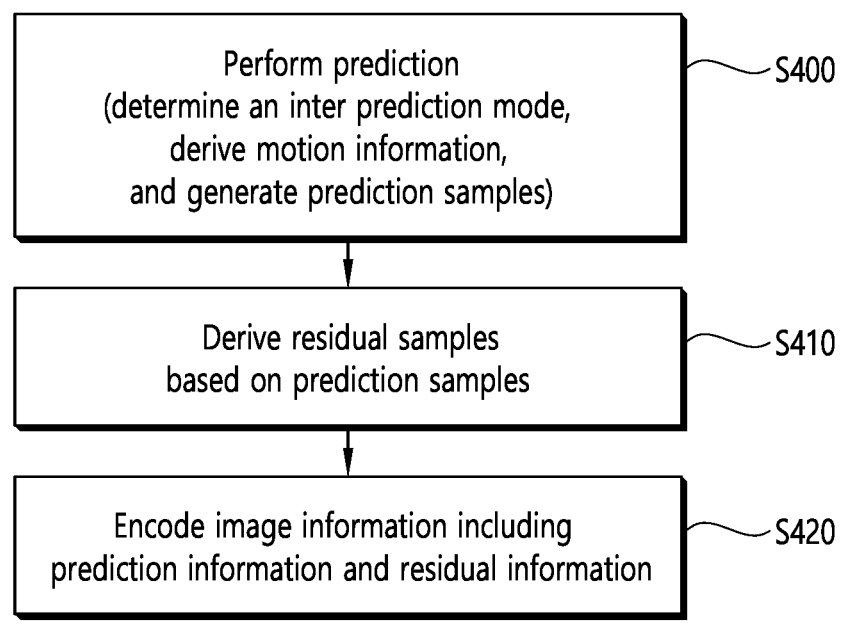
FIG. 4 shows an example of a video/image encoding method based on inter prediction.

FIG. 4 shows an example of a video/image encoding method based on inter prediction.

The encoding apparatus performs inter prediction on the current block (S400). The encoding apparatus may derive inter prediction mode and motion information of the current block and generate prediction samples of the current block. Here, the inter prediction mode determination, the motion information derivation, and the prediction samples generation procedure may be performed simultaneously, or one procedure may be performed before the other. For example, the inter predictor of the encoding apparatus may include a prediction mode determiner, a motion information deriver, and a prediction sample deriver. The prediction mode determiner may determine a prediction mode for the current block, the motion information deriver may derive motion information of the current block, and prediction sample deriver may derive motion samples of the current block. For example, the inter predictor of the encoding apparatus may search for a block similar to the current block in a predetermined region (search region) of reference pictures through motion estimation and derive a reference block whose difference to the current block is a minimum or a predetermined reference or less. Based on this, the inter predictor may derive a reference picture index indicating a reference picture in which the reference block is located and derive a motion vector based on a position difference between the reference block and the current block. The encoding apparatus may determine a mode applied to the current block among various prediction modes. The encoding apparatus may compare RD costs for the various prediction modes and determine an optimal prediction mode for the current block.

For example, when a skip mode or a merge mode is applied to the current block, the encoding apparatus may configure a merge candidate list to be described later and derive a reference block whose difference to the current block is minimum or a predetermined reference or less among reference blocks indicated by the merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the encoding apparatus may configure a (A)MVP candidate list to be described later and use a motion vector of an mvp candidate selected from among the mvp (motion vector predictor) candidates included in the (A)MVP candidate list, as mvp of the current block. In this case, for example, a motion vector indicating the reference block derived by the above-described motion estimation may be used as the motion vector of the current block, and an mvp candidate having a motion vector whose difference to the motion vector of the current block, among the mvp candidates, is smallest may be the selected mvp candidate. A motion vector difference (MVP) which is a difference from which the mvp was subtracted may be derived from the motion vector of the current block. In this case, the information on the MVD may be signaled to the decoding apparatus. In addition, when the (A)MVP mode is applied, the value of the reference picture index may be configured as reference picture index information and separately signaled to the decoding apparatus.

The encoding apparatus may derive residual samples based on the prediction samples (S410). The encoding apparatus may derive the residual samples by comparing the original samples of the current block with the prediction samples.

The encoding apparatus encodes image information including prediction information and residual information (S420). The encoding apparatus may output the encoded image information in the form of a bitstream. The prediction information may include prediction mode information (ex. skip flag, merge flag or mode index) and information on motion information as information related to the prediction procedure. The information on the motion information may include candidate selection information (ex. merge index, mvp flag or mvp index) that is information for deriving a motion vector. In addition, the information on the motion information may include the information on the MVD and/or reference picture index information described above. The information on the motion information may include information indicating whether L0 prediction, L1 prediction, or bi prediction is applied. The residual information is information on the residual samples. The residual information may include information on quantized transform coefficients for the residual samples.

The output bitstream may be stored in a (digital) storage medium and delivered to the decoding apparatus, or may be delivered to the decoding apparatus via a network.

Meanwhile, as described above, the encoding apparatus may generate a reconstructed picture (including the reconstructed samples and the reconstructed block) based on the reference samples and the residual samples. This is to derive the same prediction result in the encoding apparatus as that performed in the decoding apparatus and because coding efficiency may be increased. Therefore, the encoding apparatus may store a reconstructed picture (or reconstructed samples, a reconstructed block) in the memory and use it as a reference picture for inter prediction. As described above, the in-loop filtering procedure may be further applied to the reconstructed picture.

A video/image decoding procedure based on inter prediction may include, for example, the following.

Figure 5:
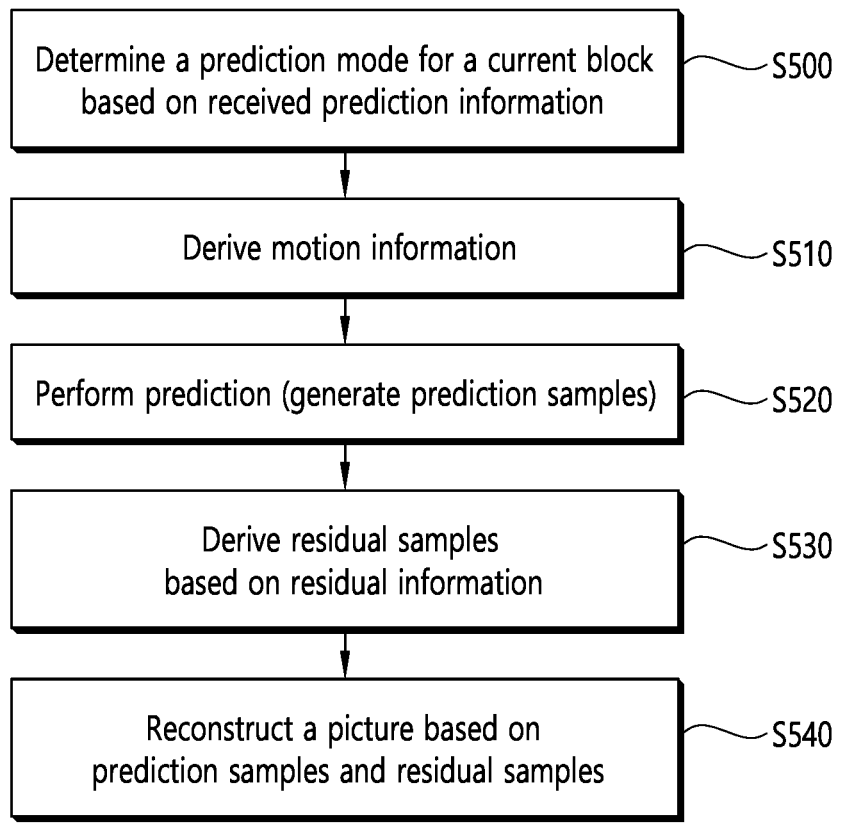
FIG. 5 shows an example of a video/image decoding method based on inter prediction.

FIG. 5 shows an example of a video/image decoding method based on inter prediction.

Referring to FIG. 5, the decoding apparatus may perform an operation corresponding to the operation performed in the encoding apparatus. The decoding apparatus may perform prediction on the current block based on the received prediction information and derive prediction samples.

Specifically, the decoding apparatus may determine a prediction mode for the current block based on the received prediction information (S500). The decoding apparatus may determine which inter prediction mode is applied to the current block based on the prediction mode information in the prediction information.

For example, the decoding apparatus may determine whether the merge mode is applied to the current block or whether (A)MVP mode is determined based on the merge flag. Alternatively, one of various inter prediction mode candidates may be selected based on the mode index. The inter prediction mode candidates may include a skip mode, a merge mode, and/or (A)MVP mode, or may include various inter prediction modes described below.

The decoding apparatus derives motion information of the current block based on the determined inter prediction mode (S510). For example, when a skip mode or a merge mode is applied to the current block, the decoding apparatus may configure a merge candidate list to be described later, and select one of the merge candidates included in the merge candidate list. The selection may be performed based on the above selection information (merge index). The motion information of the current block may be derived using the motion information of the selected merge candidate. The motion information of the selected merge candidate may be used as motion information of the current block.

As another example, when the (A)MVP mode is applied to the current block, the decoding apparatus may configure an (A)MVP candidate list to be described later and use a motion vector of an mvp candidate selected from the mvp candidates included in the (A)MVP candidate list as mvp of the current block. The selection may be performed based on the above-described selection information (mvp flag or mvp index). In this case, the MVD of the current block may be derived based on the information on the MVD, and the motion vector of the current block may be derived based on mvp and the MVD of the current block. In addition, a reference picture index of the current block may be derived based on the reference picture index information. A picture indicated by the reference picture index in the reference picture list for the current block may be derived as a reference picture referred for inter prediction of the current block.

Meanwhile, as described below, motion information of the current block may be derived without configuring a candidate list, and in this case, motion information of the current block may be derived according to a procedure disclosed in a prediction mode to be described later. In this case, the configuration of the candidate list as described above may be omitted.

The decoding apparatus may generate prediction samples for the current block based on the motion information of the current block (S520). In this case, the reference picture may be derived based on the reference picture index of the current block, and the prediction samples of the current block may be derived using the samples of the reference block indicated by the motion vector of the current block on the reference picture. In this case, as described below, a prediction sample filtering procedure may be further performed on all or some of the prediction samples of the current block.

For example, the inter predictor of the decoding apparatus may include a prediction mode determiner, a motion information deriver, and a prediction sample deriver. The prediction mode for the current block may be determined based on the prediction mode information received from the prediction mode determiner, motion information (motion vector and/or reference picture index, etc.) of the current block may be derived based on the information on the motion information received from the motion information deriver, and the prediction sample deriver may derive the prediction samples of the current block.

The decoding apparatus generates residual samples for the current block based on the received residual information (S530). The decoding apparatus may generate reconstructed samples for the current block based on the prediction samples and the residual samples and generate a reconstructed picture based on the reconstructed samples (S540). Thereafter, the in-loop filtering procedure or the like may be further applied as described above.

Figure 6:
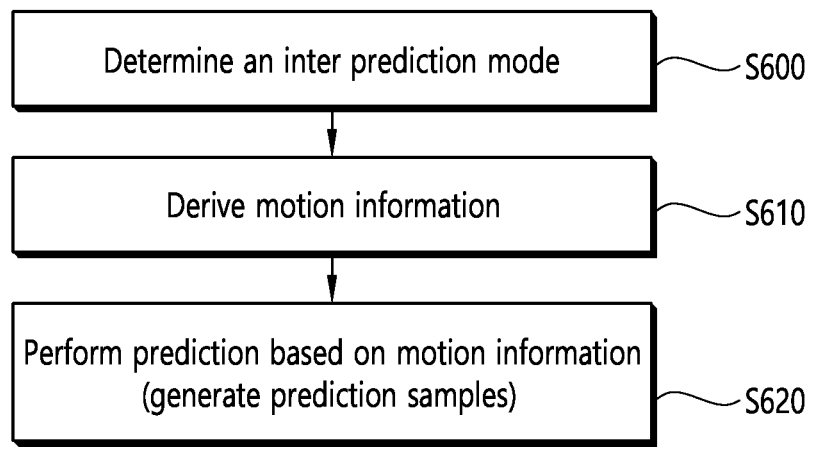
FIG. 6 exemplarily shows an inter prediction procedure.

FIG. 6 exemplarily shows an inter prediction procedure.

Referring to FIG. 6, as described above, the inter prediction procedure may include determining an inter prediction mode, deriving motion information according to the determined prediction mode, and performing prediction based on the derived motion information (generation of a prediction sample). The inter prediction procedure may be performed by the encoding apparatus and the decoding apparatus as described above. In this document, a coding apparatus may include an encoding apparatus and/or a decoding apparatus.

Referring to FIG. 6, the coding apparatus determines an inter prediction mode for the current block (S600). Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In this document, some modes and/or motion information candidates derived by some modes may be included as one of motion information candidates of other modes. For example, an HMVP candidate may be added as a merge candidate in the merge/skip mode or may be added as an MVP candidate in the MVP mode. When the HMVP candidate is used as a motion information candidate in the merge mode or the skip mode, the HMVP candidate may be referred to as an HMVP merge candidate.

Prediction mode information indicating the inter prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Meanwhile, information indicating whether the list0 (L0) prediction, the list1 (L1) prediction, or the bi-prediction described above is used in the current block (current coding unit) may be signaled in the current block. The information may be referred to as motion prediction direction information, inter prediction direction information or inter prediction indication information, and may be configured/encoded/signaled in the form of, for example, an inter_pred_idc syntax element. That is, the inter_pred_idc syntax element may indicate whether the aforementioned list0 (L0) prediction, list1 (L1) prediction, or bi-prediction is used for the current block (current coding unit). In this document, for the convenience of description, the inter prediction type (L0 prediction, L1 prediction, or BI prediction) indicated by the inter_pred_idc syntax element may be indicated as a motion prediction direction. L0 prediction may be represented as pred_L0, L1 prediction as pred_L1, and bi-prediction as pred_BI. For example, the following prediction type may be indicated according to the value of the inter_pred_idc syntax element.

TABLE 1

| Value of inter_pred_idc | Name of inter_pred_idc | |
|---|---|---|
| | ( cbWidth + cbHeight ) != 8 | ( cbWidth + cbHeight ) = = 8 |
| 0 | PRED_L0 | PRED_L0 |
| 1 | PRED_L1 | PRED_L1 |
| 2 | PRED_BI | — |

As described above, one picture may include one or more slices. The slice may have one of slice types including intra (I) slice, predictive (P) slice, and bi-predictive (B) slice. The slice type may be indicated based on slice type information. For blocks in an I slice, inter prediction may not be used for prediction and only intra prediction may be used. Of course, even in this case, the original sample value may be coded and signaled without prediction. Intra prediction or inter prediction may be used for blocks in a P slice, and only uni prediction may be used when inter prediction is used. Meanwhile, intra prediction or inter prediction may be used for blocks in a B slice, and up to bi prediction may be used when inter prediction is used.

L0 and L1 may include reference pictures that are previously encoded/decoded prior to the current picture. For example, L0 may include reference pictures before and/or after the current picture in POC order, and L1 may include reference pictures after and/or before the current picture in POC order. In this case, L0 may be assigned a lower reference picture index relative to previous reference pictures in the POC order than the current reference pictures, and L1 may be assigned a lower reference picture index relative to previous reference pictures in the POC order than the current picture. In the case of B slice, bi-prediction may be applied, and in this case, unidirectional bi-prediction may be applied or bidirectional bi-prediction may be applied. The bidirectional bi-prediction may be called true bi-prediction.

The coding apparatus derives motion information for the current block (S610). The motion information derivation may be derived based on the inter prediction mode.

Inter prediction may be performed using motion information of the current block. The encoding apparatus may derive optimal motion information for the current block through a motion estimation procedure. For example, the encoding apparatus may search for a similar reference block having a high correlation in units of fractional pixels within a predetermined search range in the reference picture using the original block in the original picture for the current block, thereby deriving motion information. Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the decoding apparatus according to various methods based on the inter prediction mode.

The coding apparatus performs inter prediction based on the motion information on the current block (S620). The coding apparatus may derive prediction sample(s) for the current block based on the motion information. The current block including the prediction samples may be referred to as a predicted block.

When the merge mode is applied, the motion information of the current prediction block is not directly transmitted, and the motion information of the current prediction block is derived using motion information of a neighboring prediction block. Therefore, the motion information of the current prediction block may be indicated by transmitting flag information indicating that the merge mode is used and a merge index indicating which neighboring prediction blocks are used. The merge mode may be called a regular merge mode.

The encoder must search a merge candidate block used to derive motion information of the current prediction block to perform the merge mode. For example, up to five merge candidate blocks may be used, but the embodiment(s) of the present document are not limited thereto. A maximum number of the merge candidate blocks may be transmitted in a slice header or a tile group header and the embodiment(s) of the present document are not limited thereto. After finding the merge candidate blocks, the encoder may generate a merge candidate list and select a merge candidate block having the smallest cost among them as a final merge candidate block.

The merge candidate list may use, for example, five merge candidate blocks. For example, four spatial merge candidates and one temporal merge candidate may be used. Hereinafter, the spatial merge candidate or the spatial MVP candidate to be described later may be referred to as SMVP, and the temporal merge candidate or the temporal MVP candidate to be described later may be referred to as TMVP.

Hereinafter, a method of constructing a merge candidate list according to this document is described.

The coding apparatus (encoder/decoder) inserts spatial merge candidates derived by searching for spatial neighboring blocks of the current block into the merge candidate list. For example, the spatial neighboring blocks may include a bottom left corner neighboring block, a left neighboring block, a upper right corner neighboring block, an upper neighboring block, and an upper left corner neighboring block of the current block. However, this is an example, and in addition to the above-described spatial neighboring blocks, additional neighboring blocks such as a right neighboring block, a bottom neighboring block, and a bottom right neighboring block may be further used as the spatial neighboring blocks. The coding apparatus may detect available blocks by searching the spatial neighboring blocks based on the priority, and may derive motion information of the detected blocks as the spatial merge candidates.

The coding apparatus inserts the temporal merge candidate derived by searching the temporal neighboring block of the current block into the merge candidate list. The temporal neighboring block may be located on a reference picture that is a picture different from the current picture in which the current block is located. The reference picture in which the temporal neighboring block is located may be called a collocated picture or a col picture. The temporal neighboring block may be searched in order of the bottom right corner neighboring block and the bottom right center block of the co-located block for the current block on the col picture. Meanwhile, when motion data compression is applied, specific motion information may be stored as representative motion information for each predetermined storage unit in the col picture. In this case, it is not necessary to store the motion information for all the blocks in the predetermined storage unit, thereby obtaining a motion data compression effect. In this case, the predetermined storage unit may be previously determined, for example, in 16×16 sample units, 8×8 sample units, or the like, or size information on the predetermined storage unit may be signaled from the encoder to the decoder. When the motion data compression is applied, motion information of the temporal neighboring block may be replaced with representative motion information of the predetermined storage unit in which the temporal neighboring block is located. That is, in this case, from an implementation point of view, a predetermined value is arithmetically shifted to the right based on coordinates (top left sample position) of the temporal neighboring block, and thereafter, the temporal merge candidate may be derived based on motion information of the prediction block covering an arithmetically left shifted position. For example, in the case of a sample unit having the predetermined storage unit is 2n×2n, if the coordinates of the temporal neighboring block are (xTnb, yTnb), motion information of the prediction block located at the modified position ((xTnb>>n)<<n), (yTnb>>n)<<cn)). Specifically, for example, in case where the predetermined storage unit is a 16×16 sample unit, if the coordinates of the temporal neighboring block are (xTnb, yTnb), motion information of the prediction block located at modified position ((xTnb>>4)<<4), (yTnb>>4)<<4)) may be used for the temporal merge candidate. Or, for example, in case where the predetermined storage unit is an 8×8 sample unit, if the coordinates of the temporal neighboring block are (xTnb, yTnb), motion information of the prediction block located at the modified position ((xTnb>>3)<<3), (yTnb>>3)<<3)) may be used for the temporal merge candidate.

The coding apparatus may determine whether the number of current merge candidates is smaller than the maximum number of merge candidates. The maximum number of merge candidates may be predefined or signaled from the encoder to the decoder. For example, the encoder may generate information on the maximum number of merge candidates, encode the information, and transmit the encoded information to the decoder in the form of a bitstream. If the maximum number of merge candidates is filled up, a subsequent candidate addition process may not be performed.

As a result of the checking, if the number of the current merge candidates is smaller than the maximum number of merge candidates, the coding apparatus inserts the additional merge candidate into the merge candidate list.

As a result of the checking, if the number of the current merge candidates is not smaller than the number of the maximum merge candidates, the coding apparatus may terminate the construction of the merge candidate list. In this case, the encoder may select an optimal merge candidate among merge candidates configuring the merge candidate list based on a rate-distortion (RD) cost, and signal selection information (ex. merge index) indicating the selected merge candidate to the decoder. The decoder may select the optimal merge candidate based on the merge candidate list and the selection information.

The motion information of the selected merge candidate may be used as the motion information of the current block, and the prediction samples of the current block may be derived based on the motion information of the current block. An encoder may derive residual samples of the current block based on the prediction samples, and may signal residual information on the residual samples to a decoder. The decoder may generate reconstructed samples based on the residual samples and the predicted samples derived based on the residual information, and generate a reconstructed picture based thereon as described above.

When the skip mode is applied, the motion information of the current block may be derived in the same manner as that of the case where the merge mode is applied. However, when the skip mode is applied, the residual signal for the corresponding block is omitted, and thus prediction samples may be used as reconstructed samples.

When the MVP mode is applied, a motion vector predictor (mvp) candidate list may be generated using a motion vector of a reconstructed spatial neighboring block and/or a motion vector of a temporal neighboring block (or Col block). That is, the motion vector corresponding to the reconstructed spatial neighboring block and/or the motion vector corresponding to the temporal neighboring block may be used as a motion vector predictor candidate. When bi-prediction is applied, an mvp candidate list for deriving L0 motion information and an mvp candidate list for deriving L1 motion information may be generated and used separately. The above-described prediction information (or information on the prediction) may include selection information (ex. MVP flag or MVP index) indicating an optimal motion vector predictor candidate selected from the motion vector predictor candidates included in the list. In this case, the predictor may select a motion vector predictor of the current block from among the motion vector predictor candidates included in the motion vector candidate list using the selection information. The predictor of the encoding apparatus may obtain a motion vector difference (MVD) between the motion vector of the current block and the motion vector predictor, encode the same, and output it in a bitstream form. That is, the MVD may be obtained as a value obtained by subtracting the motion vector predictor from the motion vector of the current block. In this case, the predictor of the decoding apparatus may obtain a motion vector difference included in the information on the prediction and derive the motion vector of the current block by adding the motion vector difference and the motion vector predictor. The predictor of the decoding apparatus may obtain or derive a reference picture index indicating the reference picture from the information on the prediction.

Figure 7:
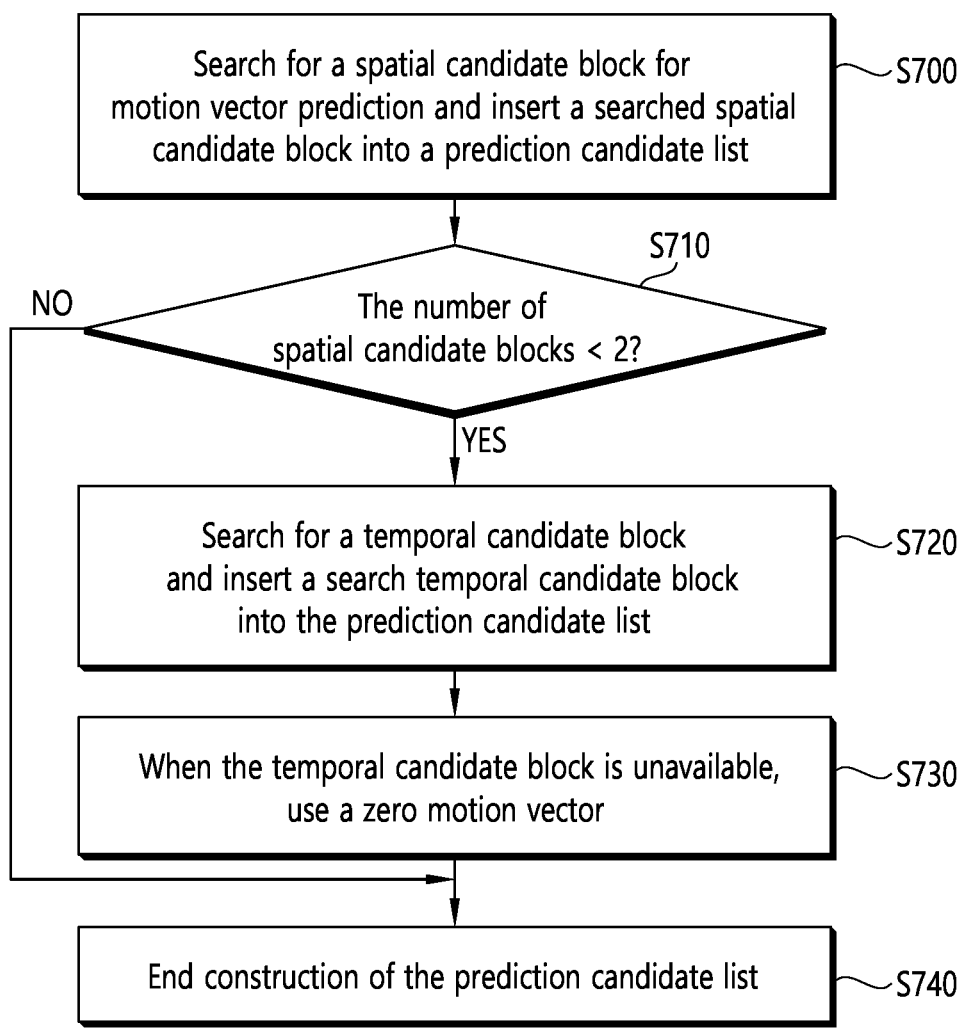
FIG. 7 shows a method for constructing an MVP candidate list according to the present disclosure.

FIG. 7 is a flowchart illustrating a method of constructing a motion vector predictor candidate list.

Referring to FIG. 7, an embodiment may first search for a spatial candidate block for motion vector prediction and insert it into the prediction candidate list (S700). Thereafter, an embodiment may determine whether the number of spatial candidate blocks is less than two (S710). For example, in an embodiment, when the number of spatial candidate blocks is less than 2, a temporal candidate block may be searched for and additionally inserted into the prediction candidate list (S720), and when the temporal candidate block is unavailable, a zero motion vector may be used (S730). That is, the zero motion vector may be additionally inserted into the prediction candidate list. Thereafter, an embodiment may end the construction of the preliminary candidate list (S740). Alternatively, according to an embodiment, when the number of spatial candidate blocks is not less than two, the construction of the preliminary candidate list may be terminated. Here, the preliminary candidate list may indicate an MVP candidate list (S740).

Meanwhile, when the MVP mode is applied, the reference picture index may be explicitly signaled. In this case, the reference picture index refidxL0 for the L0 prediction and the reference picture index refidxL1 for the L1 prediction may be separately signaled. For example, when MVP mode is applied and BI prediction is applied, both information on refidxL0 and information on refidxL1 may be signaled.

When the MVP mode is applied, as described above, the information on the MVD derived from the encoding apparatus may be signaled to the decoding apparatus. The information on the MVD may include, for example, information representing x and y components of the MVD absolute value and the sign. In this case, information indicating whether the MVD absolute value is greater than 0 and greater than 1, and the MVD remainder may be signaled step by step. For example, the information indicating whether the MVD absolute value is greater than 1 may be signaled only when the value of the flag information indicating whether the MVD absolute value is greater than 0 is 1.

For example, the information on the MVD may be configured as the following syntax, encoded in the encoding apparatus, and signaled to the decoding apparatus.

TABLE 2

| mvd_coding( x0, y0, refList ,cpIdx ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|     abs_mvd_greater1_flag[ 0 ] | ae(v) |
| if( abs_mvd_greater0_flag[ 1 ] ) | |
|     abs_mvd_greater1_flag[ 1 ] | ae(v) |
| if( abs_mvd_greater0_flag[ 0 ] ) { | |
|     if( abs_mvd_greater1_flag[ 0 ] ) | |
|         abs_mvd_minus2[ 0 ] | ae(v) |
|     mvd_sign_flag[ 0 ] | ae(v) |
| } | |
| if( abs_mvd_greater0_flag[ 1 ] ) { | |
|     if( abs_mvd_greater1_flag[ 1 ]) | |
|         abs_mvd_minus2[ 1 ] | ae(v) |
|     mvd_sign_flag[ 1 ] | ae(v) |
| } | |
| } | |

For example, in Table 2, the abs_mvd_greater0_flag syntax element may indicate information on whether the difference MVD is greater than 0, and the abs_mvd_greater1_flag syntax element may indicate information on whether the difference MVD is greater than 1. Also, the abs_mvd_minus2 syntax element may indicate information about a value obtained by −2 to the difference MVD, and the mvd_sign_flag syntax element may indicate information about the sign of the difference MVD. In addition, in Table 2, [0] of each syntax element may indicate information on L0, and [1] may indicate information on L1.

For example, MVD[compIdx] may be derived based on abs_mvd_greater0_flag[compIdx] *(abs_mvd_minus2[compIdx]+2)*(1-2*mvd_sign_flag[compIdx]). Here, compIdx (or cpIdx) represents an index of each component and may have a value of 0 or 1. compIdx 0 may indicte x component and compIdx 1 may indicate y component. However, this is merely an example and values of each component may be expressed by using a coordinate system other than the x and y coordinate systems.

Meanwhile, MVD (MVDL0) for L0 prediction and MVD (MVDL1) for L1 prediction may be separately signaled, and the information on MVD may include information on MVDL0 and/or information on MVDL1. For example, when the MVP mode is applied to the current block and BI prediction is applied, both information on the MVDL0 and information on the MVDL1 may be signaled.

FIG. 8 is a diagram for describing symmetric motion vector differences (SMVD).

When BI prediction is applied, symmetric MVD may be used in consideration of coding efficiency. In this case, signaling of some of the motion information may be omitted. For example, when symmetric MVD is applied to the current block, information on refidxL0, information on refidxL1, and information on MVDL1 may not be signaled from the encoding apparatus to the decoding apparatus and may be internally derived. For example, when MVP mode and BI prediction are applied to the current block, flag information (ex. symmetric MVD flag information or sym_mvd_flag syntax element) indicating whether to apply symmetric MVD may be signaled, and when the value of the flag information is 1, the decoding apparatus may determine that symmetric MVD is applied to the current block.

When symmetric MVD mode is applied (i.e., the value of symmetric MVD flag information is 1), information on mvp_l0_flag, mvp_l1_flag, and MVDL0 may be explicitly signaled and, as described above, signaling of information on refidxL0, information on refidxL1, and information on MVDL1 may be omitted and derived internally. For example, refidxL0 may be derived as an index indicating a previous reference picture closest to the current picture in POC order in reference picture list 0 (which may be called list 0 or L0). refidxL1 may be derived as an index indicating a next reference picture closest to the current picture in the POC order in reference picture list 1 (which may be called list 1 or L1). Or, for example, refidxL0 and refidxL1 may both be derived as 0. Or, for example, the refidxL0 and refidxL1 may be derived as minimum indexes having the same POC difference in the relationship with the current picture. Specifically, for example, when [POC of current picture]-[POC of first reference picture indicated by refidxL0] is a first POC difference and [POC of the second reference picture indicated by refidxL1] is a second POC difference, only if the first POC difference and the second POC difference are the same, a value of refidxL0 indicating the first reference picture may be derived as a value of refidxL0 of the current block and a value of refidxL1 indicating the second reference picture may be derived as a value of refidxL1 of the current block. In addition, for example, when there are a plurality of sets in which the first POC difference and the second POC difference are the same, refidxL0 and refidxL1 of a set having the minimum difference may be derived as refidxL0 and refidxL1 of the current block.

Referring to FIG. 8, reference picture list 0, reference picture list 1, and MVDL0 and MVDL1 are shown. Here, MVDL1 is symmetric with MVDL0.

MVDL1 may be derived as negative (−) MVDL0. For example, the final (improved or modified) motion information (motion vector; MV) for the current block may be derived based on the following equation.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad [\text{Eq. 1}]$$

In Equation 1, $mvx_0$ and $mvy_0$ may represent an x component and a y component of L0 motion information or motion vector for L0 prediction, and $mvx_1$ and $mvy_1$ may represent an x component and a y component of L1 motion information or motion vector for L1 prediction. Also, $mvpx_0$ and $mvpy_0$ may represent the x component and y component of the motion vector predictor for L0 prediction, and $mvpx_1$ and $mvpy_1$ may represent the x component and y component of the motion vector predictor for L1 prediction. Also, mvdx₀ and mvdy₀ may represent an x component and a y component of a motion vector difference for L0 prediction.

Meanwhile, the MMVD mode is a method of applying motion vector difference (MVD) to the merge mode, and motion information directly used to generate prediction samples of the current block (i.e., the current CU) may be implicitly derived. For example, an MMVD flag (i.e., mmvd_flag) indicating whether to use MMVD for a current block (i.e., a current CU) may be signaled, and MMVD may be performed based on this MMVD flag. When MMVD is applied to the current block (i.e., when mmvd_flag is 1), additional information on MMVD may be signaled.

Here, the additional information on the MMVD includes a merge candidate flag (i.e., mmvd_cand_flag) indicating whether the first candidate or the second candidate in the merge candidate list is used together with the MVD, and a distance index (i.e., mmvd_distance_idx) for indicating the motion magnitude and a direction index (i.e., mmvd_direction_idx) for indicating a motion direction.

In the MMVD mode, two candidates located in the first and second entries among the candidates in the merge candidate list (i.e., the first candidate or the second candidate) may be used, and the two candidates (i.e., the first candidate or the second candidate) may be used. One of them may be used as the base MV. For example, a merge candidate flag (i.e., mmvd_cand_flag) may be signaled to indicate any one of two candidates (i.e., the first candidate or the second candidate) in the merge candidate list.

Furthermore, distance index (i.e., mmvd_distance_idx) specifies motion magnitude information and indicate the pre-defined offset from the starting point. The offset may be added to either horizontal component or vertical component of starting MV. The relation of distance index and pre-defined offset is specified in the following table.

TABLE 3

| | MmvdDistance[ x0 ][ y0 ] | |
|---|---|---|
| mmvd_distance_idx[ x0 ][ y0 ] | tile_group_fpel_mmvd_enabled_flag == 0 | tile_group_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Referring to Table 3 above, the distance of the MVD (eg, MmvdDistance) is determined according to the value of the distance index (eg, mmvd_distance_idx), and the distance of the MVD (eg, MmvdDistance) may be derived by using integer sample precision or fractional sample precision based on the value of tilegroup_fpel_mmvd_enabled_flag. For example, when tilegroup_fpel_mmvd_enabled_flag is equal to 1, it indicates that the distance of the MVD is derived by using integer sample precision in the current tile group (or picture header), and when tile_group_fpel_mmvd_enabled_flag is equal to 0, it indicates that the distance of the MVD is derived by using fractional sample precision in the tile group (or picture header). In Table 1, information (flag) for a tile group may be replaced with information for a picture header, for example, tile_group_fpel_mmvd_enabled_flag may be replaced with ph_fpel_mmvd_enabled_flag (or ph_mmvd_fullpel_only_flag).

In addition, the direction index (eg, mmvd_direction_idx) indicates the direction of the MVD with respect to the starting point, and may indicate four directions as shown in Table 4 below. In this case, the direction of the MVD may indicate the sign of the MVD. The relationship between the direction index and the MVD sign may be expressed as the following table.

TABLE 4

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

Referring to Table 4, the sign of the MVD (eg, MmvdSign) is determined according to the value of the direction index (eg, mmvd_direction_idx), and the sign of the MVD (eg, MmvdSign) may be derived for the L0 reference picture and the L1 reference picture.

Based on the above-described distance index (eg, mmvd_distance_idx) and direction index (eg, mmvd_direction_idx), the offset of the MVD may be calculated using the following equations.

$$MmvdOffset[x0][y0][0] = \qquad [Eq.\ 2]$$
$$(MmvdDistance[x0][y0] << 2) * MmvdSign[x0][y0][0]$$

$$MmvdOffset[x0][y0][1] = \qquad [Eq.\ 3]$$
$$(MmvdDistance[x0][y0] << 2) * MmvdSign[x0][y0][1]$$

In Equations 2 and 3, the MMVD distance (MmvdDistance[x0][y0]) and MMVD signs (MmvdSign[x0][y0][0], MmvdSign[x0][y0][1]) may be derived based on Table 3 and/or Table 4. In summary, in the MMVD mode, a merge candidate indicated by a merge candidate flag (eg, mmvd_cand_flag) is selected from among the merge candidates in the merge candidate list derived based on the neighboring blocks, and the selected merge candidate is used as a base candidate (eg, MVP). In addition, motion information (ie, motion vector) of the current block may be derived by adding an MVD derived using a distance index (eg, mmvd_distance_idx) and a direction index (eg, mmvd_direction_idx) based on the base candidate.

A predicted block for the current block may be derived based on motion information derived according to the prediction mode. The predicted block may include prediction samples (prediction sample array) of the current block. When the motion vector of the current block indicates a fractional sample unit, an interpolation procedure may be performed, through which prediction samples of the current block may be derived based on reference samples in the fractional sample unit within a reference picture. When bi-prediction is applied, prediction samples derived through weighting or weighted averaging (according to phase) of prediction samples derived based on L0 prediction (that is, prediction using reference picture and MVL0 in reference picture list L0) and prediction samples derived based on L1 prediction (that is, prediction using reference picture and MVL1 in reference picture list L1) may be used as prediction samples of the current block. When bi-prediction is applied, if the reference picture used for L0 prediction and the reference picture used for L1 prediction are located in different temporal directions with respect to the current picture (i.e., bi-prediction and bidirectional prediction), it may be called true bi-prediction.

As described above, reconstructed samples and reconstructed pictures may be generated based on the derived prediction samples, and then procedures such as in-loop filtering may be performed.

As described above, according to this document, when bi-prediction is applied to the current block, prediction samples can be derived based on a weighted average. Conventionally, the bi-prediction signal (ie, the bi-prediction samples) can be derived through a simple average of the L0 prediction signal (L0 prediction samples) and the L1 prediction signal (L1 prediction samples). That is, the bi-prediction samples were derived as an average of the L0 prediction samples based on the L0 reference picture and MVL0 and the L1 prediction samples based on the L1 reference picture and MVL1. However, according to this document, when bi-prediction is applied, a bi-prediction signal (bi-prediction samples) can be derived through a weighted average of the L0 prediction signal and the L1 prediction signal as follows.

In the above-described MMVD related embodiments, a method that considers a long-term reference picture in the MVD derivation process of MMVD may be proposed, thereby maintaining and increasing compression efficiency in various applications. In addition, the method proposed in the embodiments of this document can be equally applied to SMVD, which is a symmetric MVD technology used in inter mode (MVP mode), in addition to the MMVD technology used in MERGE.

Figure 9:
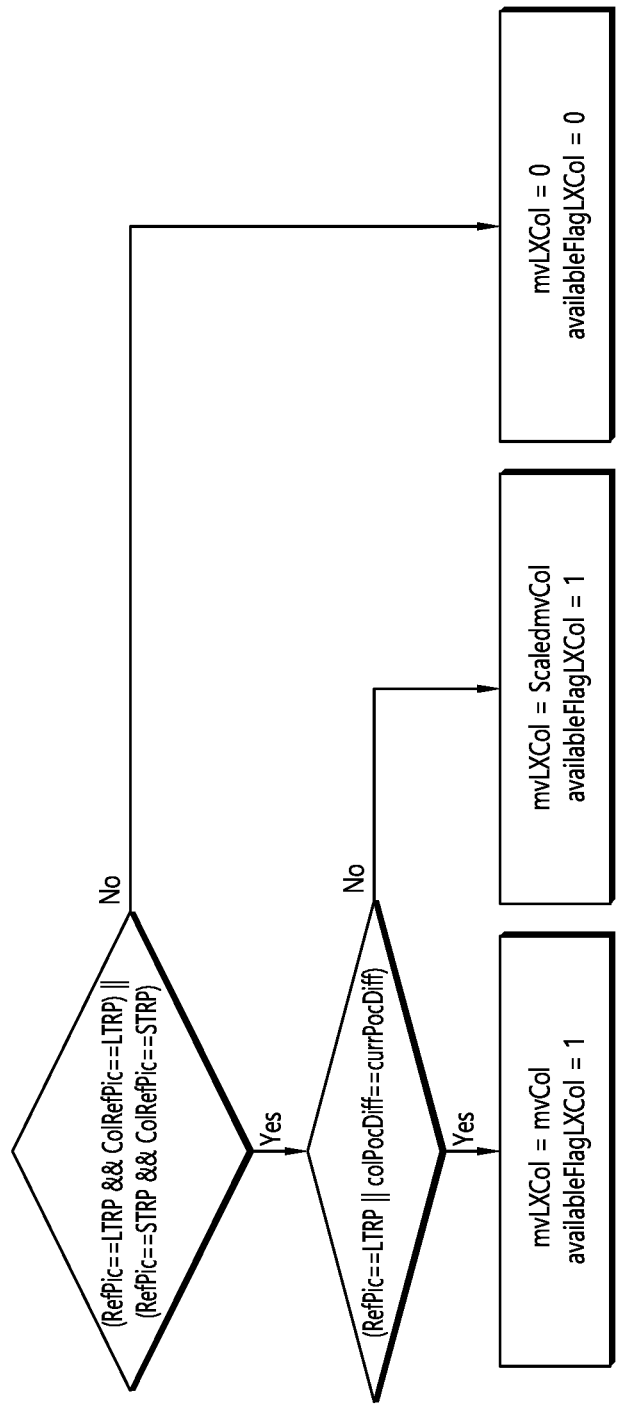
FIG. 9 is a diagram for describing a method of deriving motion vectors in inter prediction.

FIG. 9 is a diagram for describing a method of deriving motion vectors in inter prediction.

In an embodiment of this document, it uses an MV derivation method considering a long-term reference picture in a motion vector scaling process of a temporal motion candidate (a temporal motion candidate, a temporal merge candidate, or a temporal mvp candidate). The temporal motion candidate may correspond to mvCol (mvLXCol). The temporal motion candidate may be referred to as a TMVP.

The following table describes the definition of a long-term reference picture.

TABLE 5

The function LongTermRefPic( aPic, aPb, refIdx, LX), with X being 0 or 1, is defined as follows:
- If the picture with index refIdx from reference picture list LX of the slice containing prediction block aPb in the picture aPic was marked as "used for long term reference" at the time when aPic was the current picture, LongTermRefPic( aPic, aPb, refIdx, LX) is equal to 1.
- Otherwise, LongTermRefPic( aPic, aPb, refIdx, LX ) is equal to 0.

Referring to Table 5 above, if LongTermRefPic(aPic, aPb, refIdx, LX) is equal to 1 (true), the corresponding reference picture may be marked as used for long-term reference. For example, a reference picture not marked as used for long-term reference may be a reference picture marked as used for short-term reference. In another example, a reference picture not marked as used for long-term reference and not marked as unused may be a reference picture marked as used for short-term reference. Hereinafter, a reference picture marked as used for long-term reference may be referred to as a long-term reference picture, and a reference picture marked as used for short-term reference may be referred to as a short-term reference picture.

The following table describes the derivation of TMVP (mvLXCol).

TABLE 6

When availableFlagLXCol is equal to TRUE, mvLXCol and availableFlagLXCol are derived as follows:
- If LongTermRefPic( currPic, currCb, refIdxLX, LX) is not equal to LongTermRefPic( ColPic, colCb, refIdxCol, listCol ), both components of mvLXCol are set equal to 0 and availableFlagLXCol is set equal to 0.
- Otherwise, the variable availableFlagLXCol is set equal to 1, refPicList[ listCol ][ refIdxCol ] is set to be the picture with reference index refIdxCol in the reference picture list listCol of the slice containing coding block colCb in the collocated picture specified by ColPic. and the following applies:
    colPocDiff = DiffPicOrderCnt( ColPic, refPicList[ listCol ][ refIdxCol] )     (8-402)
    currPocDiff = DiffPicOrderCnt( currPic, RefFicList[ X ][ refIdxLX ])     (8-403)
- The temporal motion buffer compression process for collocated motion vectors as specified in clause 8.5.2.15 is invoked with mvCol as input, and the modified mvCol as output.

TABLE 6-continued

- If RefPicList[ X ][ refIdxLX ] is a long-term reference picture, or colPocDiff is equal to currPocDiff,
mvLXCol is derived as follows:
mvLXCol = mvCol                                                                                       (8-404)
- Otherwise, mvLXCol is derived as a scaled version of the motion vector mvCol as follows:
tx = ( 16384 + ( Abs(td) td ) >> 1) ) / td                                                            (8-405)
distScaleFactor = Clip3( −4096, 4095, (tb * tx + 32) >> 6)                                            (8-406)
mvLXCol = Clip3( −131072, 131071, (distScaleFactor * mvCol +
128 − ( distSealeFactor * mvCol >= 0 ) ) >> 8 ) )                                                     (8-407)
where td and tb are derived as follows:
td = Clip3( −128, 127, colPocDiff )                                                                   (8-408)
tb = Clip3( −128, 127, currPocDiff )                                                                  (8-409)

Referring to FIG. 9 and Table 6, when the type of the reference picture pointed to by the current picture (eg, indicating whether a long-term reference picture (LTRP) or a short-term reference picture (STRP)) is not equal to the type of the collocated reference picture pointed to by the collocated picture, the temporal motion vector mvLXCol is not used. That is, when all of them are the long-term reference pictures or the short-term reference pictures, colMV is derived, otherwise, colMV is not derived. In addition, in the case that all of them are the long-term reference pictures and in the case where the POC difference between the current picture and the reference picture of the current picture is the same as the POC difference between the collocated picture and the reference picture of the collocated picture, the collocated motion vector can be used as it is without scaling. If it is a short-term reference picture and the POC difference is different, the motion vector of the collocated block is used after scaled.

In an embodiment of this document, MMVD used in the MERGE/SKIP mode signals a base motion vector index (base MV index), a distance index, and a direction index for one coding block as information for deriving MVD information. In the case of unidirectional prediction, MVD is derived from motion information, and in the case of bidirectional prediction, symmetric MVD information is generated using a mirroring and scaling method.

In the case of bidirectional prediction, MVD information for L0 or L1 is scaled to generate an MVD of L1 or L0. However, when a long-term reference picture is referred, it requires modification in the MVD derivation process.

Figure 10:
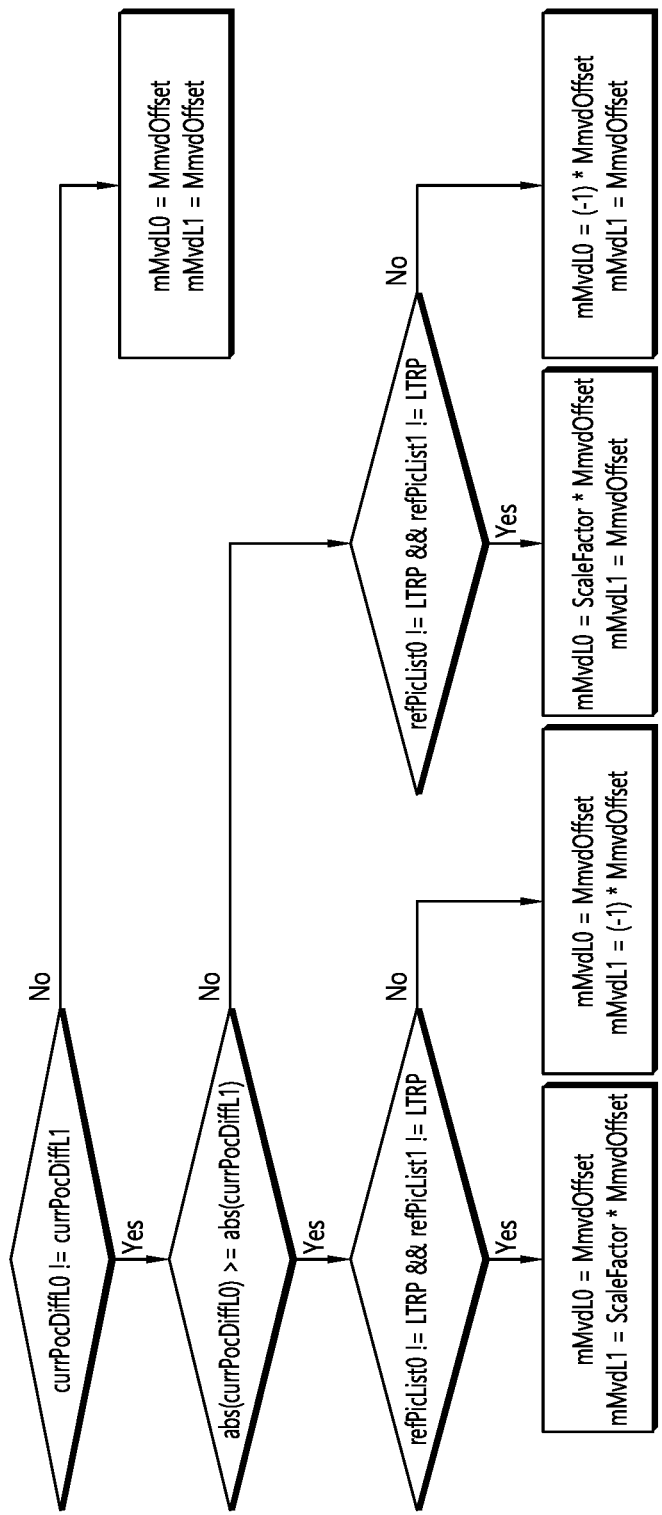
FIG. 10 illustrates an MVD derivation process of MMVD according to one embodiment of the present disclosure.

FIG. 10 illustrates an MVD derivation process of MMVD according to an embodiment of the present document. The method shown in FIG. 10 may be for a block to which bi-directional prediction is applied.

Referring to FIG. 10, when the distance to the L0 reference picture and the distance to the L1 reference picture are the same, the MmvdOffset derived can be used as the MVD as it is, and the POC differences (POC difference between the L0 reference picture and the current picture and the POC difference between the L1 reference picture and the current picture) are different, MVD can be derived by scaling or simple mirroring (ie, −1*MmvdOffset) according to the POC difference and whether it is a long-term or short-term reference picture.

In one example, a method of deriving symmetric MVD using MMVD for a block to which bi-prediction is applied is not suitable for a block using a long-term reference picture. It is difficult to expect performance improvement. Accordingly, in the following drawings and embodiments, an example is introduced, in which MMVD is not applied when reference picture types of L0 and L1 are different.

Figure 11:
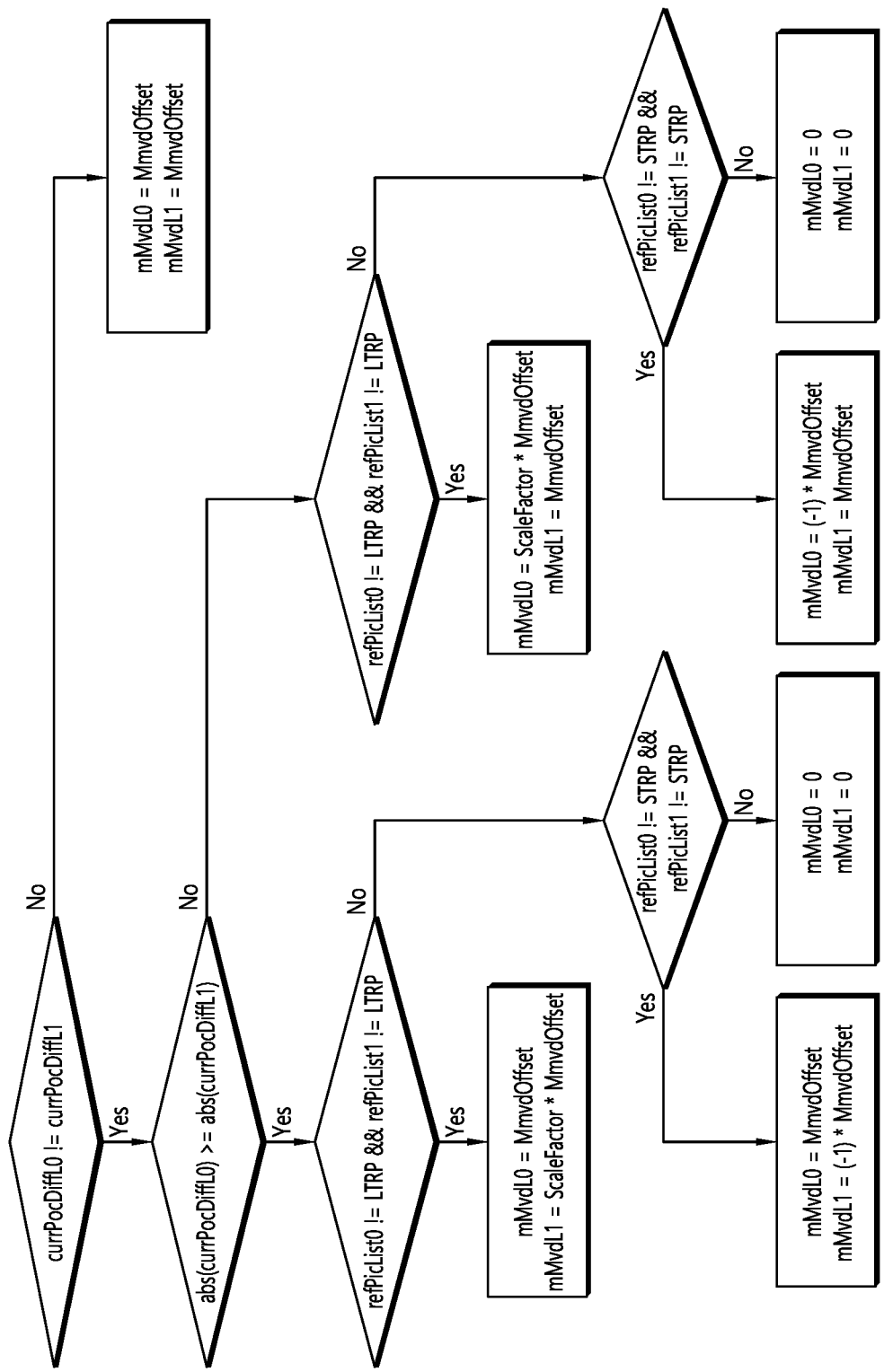
FIG. 11 illustrates an MVD derivation process of MMVD according to another embodiment of the present disclosure.

FIG. 11 illustrates an MVD derivation process of MMVD according to another embodiment of the present document. The method shown in FIG. 11 may be for a block to which bi-directional prediction is applied.

Referring to FIG. 11, a method for deriving MVD may be different according to whether a reference picture referenced by a current picture (or a current slice, a current block) is a long-term reference picture (LTRP) or a short-term reference picture (STRP). In one example, when the method of the embodiment according to FIG. 11 is applied, a part of the standard document according to the present embodiment may be described as shown in the following table.

TABLE 7

8.5.2.7 Derivation process for merge motion vector difference

Inputs to this process are:
- a luma location ( xCb, yCb ) of the top-left sample of the current luma coding block relative to the top-left
    luma sample of the current picture,
- reference indices refIdxL0 and refIdxL1,
- prediction list utilization flags predFlagL0 and predFlagL1.
Outputs of this process are the luma merge motion vector differences in 1/16 fractional-sample accuracy
mMvdL0 and mMvdL1.
The variable currPic specifies the current picture.
The luma merge motion vector differences mMvdL0 and mMvdL1 are derived as follows:
- If both predFlagL0 and predFlagL1 are equal to 1, the following applies:
        currPocDiffL0 = DiffPicOrderCnt( currPic, RefPicList[ 0 ][ refIdxL0 ])
        currPocDiffL1 = DiffPicOrderCnt( currPic, RefPicList[ 1 ][ refIdxL1 ])
    - If currPocDiffL0 is equal to currPocDiffL1 and , the following applies:
            mMvdL0[ 0 ] = MmvdOffset[ xCB ][ yCB ][ 0 ]
            mMvdL0[ 1 ] = MmvdOffset[ xCB ][ yCB ][ 1 ]
            mMvdL1[ 0 ] = MmvdOffset[ xCB ][ yCB ][ 0 ]
            mMvdL1[ 1 ] = MmvdOffset[ xCB ][ yCB ][ 1 ]
    - Otherwise, if Abs( currPocDiffL0 ) is greater than or equal to Abs( currPocDiffL1 ), the following
        applies:
            td = Clip3( −128, 127, currPocDiffL0 )
            tb = Clip3( −128, 127, currPocDiffL1 )

TABLE 7-continued 8.5.2.7 Derivation process for merge motion vector difference

```
            tx = ( 16384 + ( Abs( td ) >> 1))/td
            distScaleFactor = Clip3( −4096, 4095, ( tb * tx + 32 ) >> 6 )
            mMvdL0[ 0 ] = MmvdOffset[ xCB ][ yCB ][ 0 ]
            mMvdL0[ 1 ] = MmvdOffset[ xCB ][ yCB ][ 1 ]
        - If RefPicList[ 0 ][ refIdxL0 ] is not a long-term reference picture and RefPicList[ 1 ][ refIdxL1 ]
            is not a long-term reference picture, the following applies:
                mMvdL1[ 0 ] = Clip3( −2^15, 2^15 −1, (distScaleFactor * mMvdL0[ 0 ] +
                128 − ( distScaleFactor * mMvdL0[ 0 ] >= 0 ) ) >> 8 )
                mMvdL1[ 1 ] = Clip3( −2^15, 2^15 −1, (distScaleFactor * mMvdL0[ 1 ] +
                128 − ( distScaleFactor * mMvdL0[ 1 ] >= 0 ) ) >> 8 )
        - Otherwise, If RefPicList[ 0 ][ refIdxL0 ] is a long-term reference picture and
            RefPicList[ 1 ][ refIdxL1 ] is a long-term reference picture, the following applies:
                mMvdL1[ 0 ] = Sign( currPocDiffL0 ) == Sign( currPocDiffL1 ) ?
                    mMvdL0[ 0 ] : −mMvdL0[ 0 ]
                mMvdL1[ 0 ] = Sign( currPocDiffL0 ) == Sign( currPocDiffL1 ) ?
                    mMvdL0[ 0 ] : −mMvdL0[ 0 ]
        - Otherwise, the following applies:
            mMvdL0[ 0 ] = 0
            mMvdL0[ 1 ] = 0
            mMvdL1[ 0 ] = 0
            mMvdL1[ 1 ] = 0
    - Otherwise (Abs( currPocDiffL0 ) is less than Abs( currPocDiffL1 )), the following applies:
        td = Clip3( −128, 127, currPocDiffL1 )
        tb = Clip3( −128, 127, currPocDiffL0 )
        tx = ( 16384 + ( Abs( td ) >> 1))/td
        distScaleFactor = Clip3( −4096, 4095, ( tb * tx + 32 ) >> 6 )
        mMvdL1[ 0 ] = MmvdOffset[ xCB ][ yCB ][ 0 ]
        mMvdL1[ 1 ] = MmvdOffset[ xCB ][ yCB ][ 1 ]
        - If RefPicList[ 0 ][ refIdxL0 ] is not a long-term reference picture and RefPicList[ 1 ][ refIdxL1 ]
            is not a long-term reference picture, the following applies:
                mMvdL0[ 0 ] = Clip3( −2^15, 2^15 −1, (distScaleFactor * mMvdL1[ 0 ] +
                    128 − (distScaleFactor * mMvdL1[ 0 ] >= 0 ) ) >> 8 )
                mMvdL0[ 1 ] = Clip3( −2^15, 2^15 −1, , (distScaleFactor * mMvdL1[ 1 ] +
                    128 − (distScaleFactor * mMvdL1[ 1 ] >= 0 ) ) >> 8 ))
        - Otherwise, If RefPicList[ 0 ][ refIdxL0 ] is a long-term reference picture and
            RefPicList[ 1 ][ refIdxL1 ] is a long-term reference picture, the following applies:
                mMvdL0[ 0 ] = Sign( currPocDiffL0 ) == Sign( currPocDiffL1 ) ?
                    mMvdL1[ 0 ] : −mMvdL1[ 0 ]
                mMvdL0[ 1 ] = Sign( currPocDiffL0 ) == Sign( currPocDiffL1 ) ?
                    mMvdL1[ 1 ] : −mMvdL1[ 1 ]
        - Otherwise, the following applies:
            mMvdL0[ 0 ] = 0
            mMvdL0[ 1 ] = 0
            mMvdL1[ 0 ] = 0
            mMvdL1[ 1 ] = 0
- Otherwise ( predFlagL0 or predFlagL1 are equal to 1 ), the following applies for X being 0 and 1:
    mMvdLX[ 0 ] = ( predFlagLX == 1) ? MmvdOffset[ xCB ][ yCB ][ 0 ] : 0
    mMvdLX[ 1 ] = ( predFlagLX == 1) ? MmvdOffset[ xCB ][ yCB ][ 1 ] : 0
```

Figure 12:
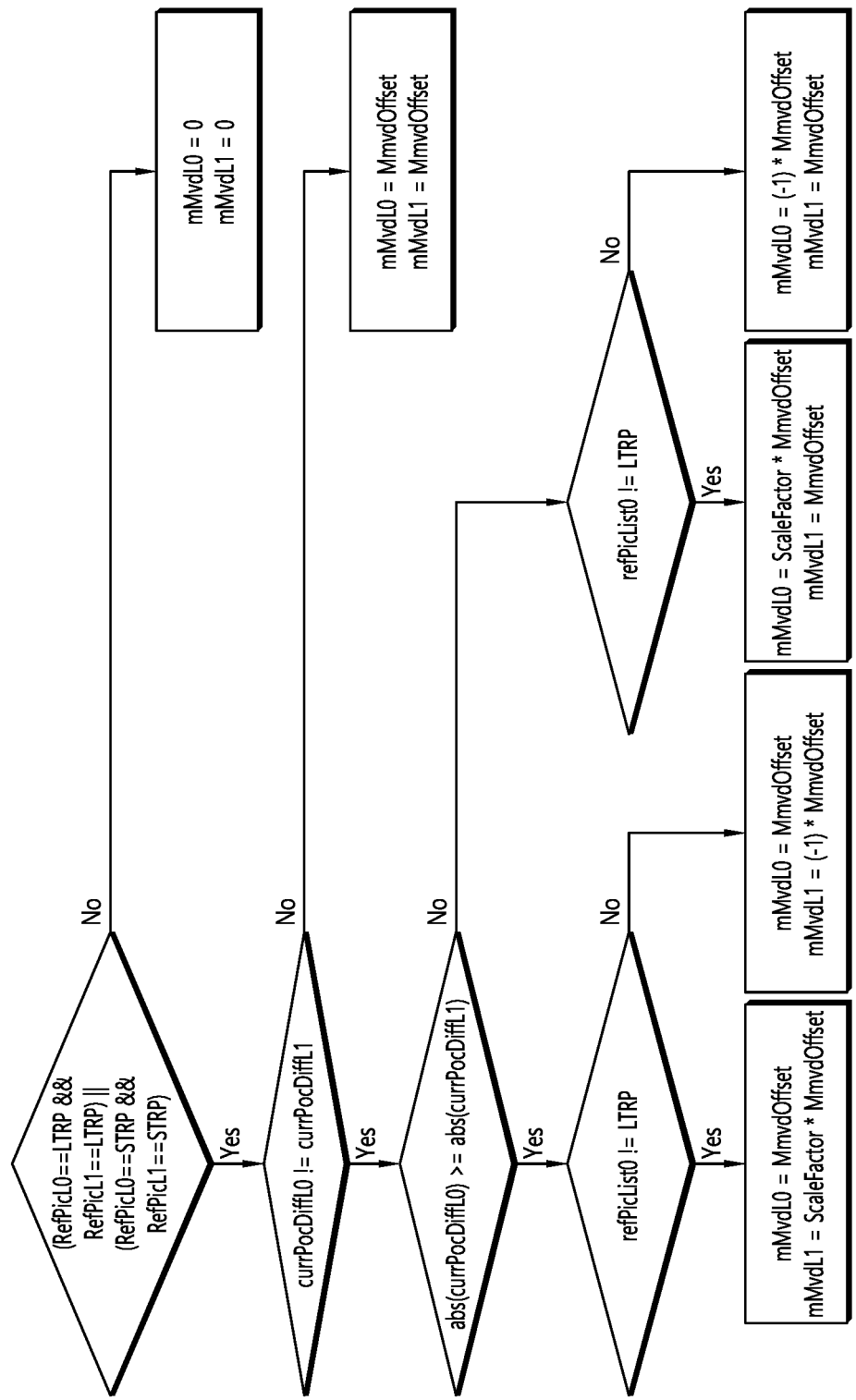
FIG. 12 illustrates an MVD derivation process of MMVD according to yet another embodiment of the present disclosure.

FIG. 12 illustrates an MVD derivation process of MMVD according to another embodiment of the present document. The method shown in FIG. 12 may be for a block to which bi-directional prediction is applied.

Referring to FIG. 12, a method for deriving MVD may be different according to whether a reference picture referenced by a current picture (or a current slice, a current block) is a long-term reference picture (LTRP) or a short-term reference picture (STRP). In one example, when the method of the embodiment according to FIG. 12 is applied, a part of the standard document according to the present embodiment may be described as shown in the following table.

TABLE 8

8.5.2.7 Derivation process for merge motion vector difference

Inputs to this process are:
a luma location ( xCb, yCb ) of the top-left sample of the current luma coding block relative to the top-left hum sample of the current picture,
reference indices refIdxL,0 and refIdxL1.
- prediction list utilization flags predFlagL0 and predFlagL1.
Outputs of this process are the luma merge motion vector differences in 1/16 fractional-sample accuracy mMvdL0 and mMvdL1.
The variable currPic specifies the current picture.
The luma merge motion vector differences mMvdL0 and mMvdL1 are derived as follows:
- If both predFlagL0 and predFlagL1 are equal to 1, the following applies:
    currPocDiffL0 = DiftPicOrderCnt( currPic, RefPicList[ 0 ][ refIdxL0 ] )
    currPocDiffL1 = DiftPicOrderCnt( currPic, RefPicList[ 1 ][ refIdxL1 ] )

TABLE 8-continued 8.5.2.7 Derivation process for merge motion vector difference

- If (RefPicList[ 0 ][ refIdxL0 ] is a long-term reference picture and RefPicList[ 1 ][ refIdxL1 ] is a short-term reference picture) or (RefPicList+ 0 IF relldxL0 + is a short-term reference picture and RefPicList[ 1 ][ refIdxL1 ] is a long-term reference picture), the following applies:
    mMvdL0[ 0 ] = 0
    mMvdL0[ 1 ] = 0
    mMvdL1[ 0 ] = 0
    mMvdL1[ 1 ] = 0
- Otherwise, the following applies:
  - If currPocDiffL0 is equal to currPocDiffL1, the following applies.
    mMvdL0[ 0 ] = MmvdOffset[ xCb ][ yCb ][ 0 ]
    mMvdL0[ 1 ] = MmvdOffset[ xCb ][ yCb ][ 1 ]
    mMvdL1[ 0 ] = MmvdOffset[ xCb ][ yCb ][ 0 ]
    mMvdL1[ 1 ] = MmvdOffset[ xCb ][ yCb ][ 1 ]
  - Otherwise, if Abs( currPocDiffL0 ) is greater than or equal to Abs( currPocDiffL1 ), the following applies:
    td = Clip3( −128, 127, currPocDiffL0 )
    tb = Clip3( −128, 127, currPocDiffL1 )
    tx = ( 16384 + ( Abs( td ) >> 1 ) ) / td
    distScaleFactor = Clip3( −4096, 4095, ( tb * tx + 32 ) >> 6)
    mMvdL0[ 0 ] = MmvdOffset[ xCb ][ yCb ][ 0 ]
    mMvdL0[ 1 ] = MmvdOffset[ xCb ][ yCb ][ 1 ]
    • If RefPicList[ 0 ][ refIdxL0 ] is not a long-term reference picture the following applies:
    mMvdL1[ 0 ] = Clip3( $-2^{15}$, $2^{15} - 1$, (distScaleFactor * mMvdL0[ 0 ] + 128 − ( distScaleFactor * mMvdL0[ 0 ] >= 0 ) ) >> 8)
    mMvdL1[ 1 ] = Clip3( $-2^{15}$, $2^{15} - 1$, (distScaleFactor * mMvdL0[ 1 ] + 128 − ( distScaleFactor * mMvdL0[ 1 ] >= 0 ) ) >> 8)
    • Otherwise, the following applies:
    mMvdL1[ 0 ] = Sign( currPocDiffL0 ) = = Sign( currPocDiffL1 ) ?
    mMvdL0[ 0 ] : −mMvdL0[ 0 ]
    mMvdL1[ 0 ] = Sign( currPocDiffL0 ) = = Sign( currPocDiffL1 ) ?
    mMvdL0[ 0 ] : −mMvdL0[ 0 ]
  - Otherwise (Abs( currPocDiffL0 ) is less than Abs( currPocDiffL1 )), the following applies:
    td = Clip3( −128, 127, currPocDiffL1 )
    tb = Clip3( −128, 127, currPocDiffL0 )
    tx = ( 16384 + ( Abs( td ) >> 1))/td
    distScaleFactor = Clip3( −4096, 4095, (tb * tx + 32 ) >> 6)
    mMvdL0[ 0 ] = MmvdOffset[ xCb ][ yCb ][ 0 ]
    mMvdL0[ 1 ] = MmvdOffset[ xCb ][ yCb ][ 1 ]
    • If RefPicList[ 0 ][ refIdxL0 ] is not a long-term reference picture, the following applies:
    mMvdL1[ 0 ] = Clip3( $-2^{15}$, $2^{15} - 1$, (distScaleFactor * mMvdL1[ 0 ] + 128 − ( distScaleFactor * mMvdL1[ 0 ] >= 0 ) ) >> 8)
    mMvdL1[ 1 ] = Clip3( $-2^{15}$, $2^{15} - 1$, (distScaleFactor * mMvdL1[ 1 ] + 128 − ( distScaleFactor * mMvdL1[ 1 ] >= 0 ) ) >> 8)
    • Otherwise, the following applies:
    mMvdL1[ 0 ] = Sign( currPocDiffL0 ) = = Sign( currPocDiffL1 ) ?
    mMvdL1[ 0 ] : −mMvdL1[ 0 ]
    mMvdL1[ 1 ] = Sign( currPocDiffL0 ) = = Sign( currPocDiffL1 ) ?
    mMvdL1[ 1 ] : −mMvdL1[ 1 ]
- Otherwise ( predFlagL0 or predFlagL1 are equal to 1), the following applies for X being 0 and 1:
    mMvdLX[ 0 ] = ( predFlagLX = = 1 ) ? MmvdOffset[ xCb ][ yCb ][ 0 ] : 0
    mMvdLX[ 1 ] = ( predFlagLX = = 1 ) ? MmvdOffset[ xCb ][ yCb ][ 1 ] : 0

In summary, the MVD derivation process of MMVD, that does not derive MVDs when the reference picture types in each direction are different, have been described.

In one embodiment according to the present document, MVD may not be derived in all cases of referencing a long-term reference picture. That is, when at least one L0 and L1 reference picture is a long-term reference picture, MVD is set to 0, and MVD can be derived only when a short-term reference picture is included. It is described in detail in the following drawings and tables.

Figure 13:
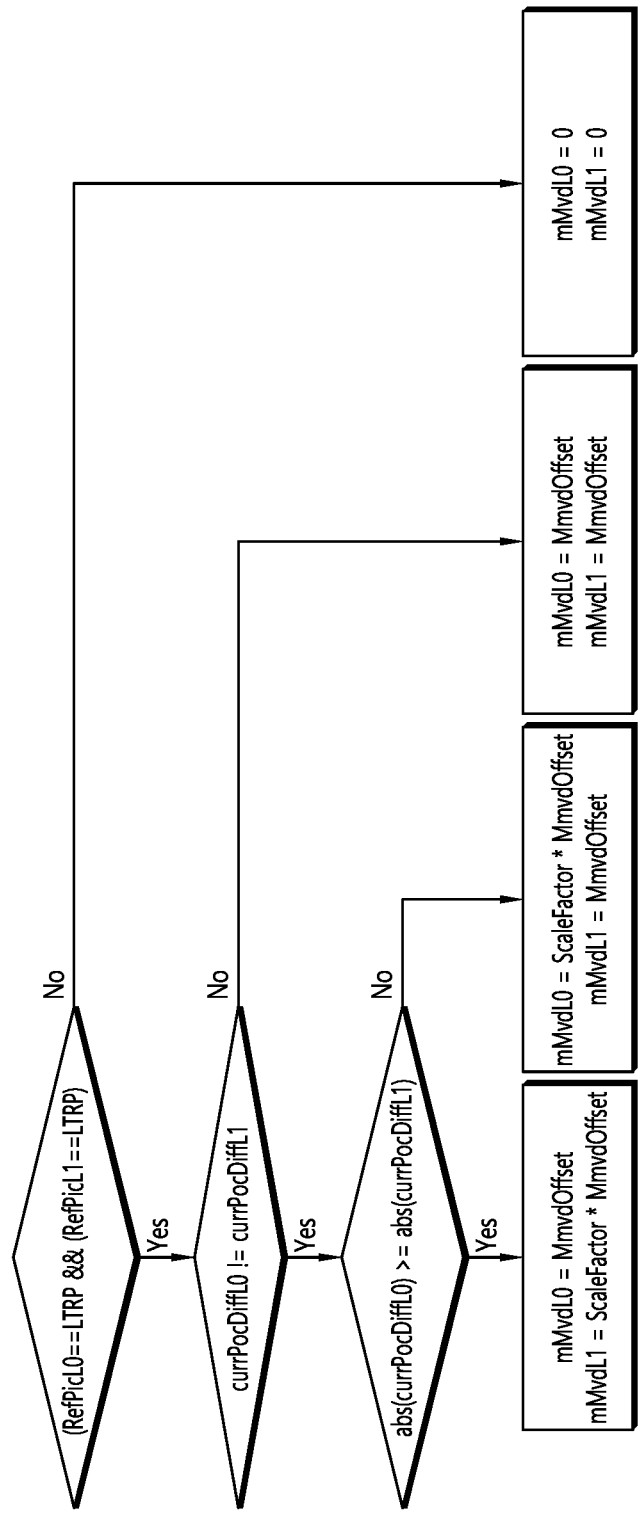
FIG. 13 illustrates an MVD derivation process of MMVD according to one embodiment of the present disclosure.

FIG. 13 illustrates an MVD derivation process of MMVD according to an embodiment of the present document. The method shown in FIG. 13 may be for a block to which bi-directional prediction is applied.

Referring to FIG. 13, based on the highest priority condition (RefPicL0 !=LTRP && RefPicL1 !=STRP), MVD for MMVD may be derived when the current picture (or current slice, current block) refers to only short-term reference pictures. In one example, when the method of the embodiment according to FIG. 13 is applied, a part of the standard document according to the present embodiment may be described as shown in the following table.

TABLE 9

8.5.2.7 Derivation process for merge motion sector difference

Inputs to this process are.
- a luma location ( xCb, yCb ) of the top-left sample of the current luma coding block relative to the top-left luma sample of the current picture,
- reference indices refIdxL0 and refIdxL1.
- prediction list utilization flags predFlagL0 and predFlagL1.

TABLE 9-continued 8.5.2.7 Derivation process for merge motion sector difference

Outputs of this process are the luma merge motion vector differences in 1/16 fractional-sample accuracy mMvdL0 and mMvdL1.
The variable currPic specifies the current picture.
The luma merge motion vector differences mMvdL0 and mMvdL1 are derived as follows:
- If both predFlagL0 and predFlagL1 are equal to 1, the following applies:
    currPocDiffL0 = DiffPicOrderCnt( currPic, RefPicList[ 0 ][ refIdxL0 ] )
    currPocDiffL1 = DiffPicOrderCnt( currPic, RefPicList[ 1 ][ refIdxL1 ] )
  - If RefPicList[ 0 ][ refIdxL0 ] is not a short-term reference picture or RefPicList[ 1 ][ refIdxL1 ] is not
  a short-term reference picture. the following applies:
    mMvdL0[ 0 ] = 0
    mMvdL0[ 1 ] = 0
    mMvdL1[ 0 ] = 0
    mMvdL1[ 1 ] = 0
  - Otherwise. the following applies:
    - If currPocDiffL0 is equal to currPocDiffL1. the following applies:
      mMvdL0[ 0 ] = MmvdOffset[ xCb ][ yCb ][ 0 ]
      mMvdL0[ 1 ] = MmvdOffset[ xCb ][ yCb ][ 1 ]
      mMvdL1[ 0 ] = MmvdOffset[ xCb ][ yCb ][ 0 ]
      mMvdL1[ 1 ] = MmvdOffset[ xCb ][ yCb ][ 1 ]
    - Otherwise, if Abs( currPocDiffL0 ) is greater than or equal to Abs( currPocDiffL1 ), the
    following applies:
      td = Clip3( −128, 127, currPocDiff0 )
      tb = Clip3( −128, 127, currPocDiff1 )
      tx = ( 16384 + ( Abs( td ) >> 1 ) ) / td
      distScaleFactor = Clip3( −4096, 4095, (tb * tx + 32) >> 6)
      mMvdL0[ 0 ] = MmvdOffset[ xCb ][ yCb ][ 0 ]
      mMvdL0[ 1 ] = MmvdOffset[ xCb ][ yCb ][ 1 ]
      mMvdL1[ 0 ] = Clip3( $-2^{15}$, $2^{15}$ − 1, (distScaleFactor * mMvdL0[ 0 ] +
      128 − ( distScaleFactor * mMvdL0[ 0 ] >= 0 ) ) >> 8 )
      mMvdL1[ 1 ] = Clip3( $-2^{15}$, $2^{15}$ − 1, (distScaleFactor * mMvdL0[ 1 ] +
      128 − ( distScaleFactor * mMvdL0[ 1 ] >= 0 ) ) >> 8)
    - Otherwise (Abs( currPocDiffL0 ) is less than Abs( cunPocDiffL1 )), the following applies:
      td = Clip3( −128, 127, CurrPocDifiL1 )
      tb = Clip3( −128, 127, currPocDiffL0 )
      tx = ( 16.384 + ( Abs( td ) >> 1 ) ) / td
      distScaleFactor = Clip3( −4096, 4095, ( tb * tx + 32) >> 6)
      mMvdL1[ 0 ] = MmvdOffset[ xCb ][ yCb ][ 0 ]
      mMvdL1[ 1 ] = MmvdOffset[ xCb ][ yCb ][ 1 ]
      mMvdL0[ 0] = Clip3( $-2^{15}$, $2^{15}$ − 1, (distScaleFactor * mMvdL1[ 0 ] +
      128 − (distScaleFactor * mMvdL1[ 0 ] >= 0 ) ) >> 8)
      mMvdL0[ 1 ] = Clip3( $-2^{15}$, $2^{15}$ − 1, , (distScaleFactor * mMvdL1 [ 1 ] +
      128 − (distScaleFactor * mMvdL1[ 1 ] >= 0) ) >> 8 ) )
- Otherwise ( predFlagL0 or predFlagL1 are equal to 1 ), the following applies for X being 0 and 1:
  - If RefPicList[ X][ refIdxLX ] is not a short-term reference picture, the following applies:
    mMvdLX[ 0 ] = 0
    mMvdLX[ 1 ] = 0
  - Otherwise, the following applies:
    mMvdLX[ 0 ] = ( predFlagLX = = 1 ) ? MmvdOffset[ xCb ][ yCb ][ 0 ] : 0
    mMvdLX[ 1 ] = ( predFlagLX = = 1 ) ? MmvdOffset[ xCb ][ yCb ][ 1 ] : 0

In the embodiment according to the present document, when reference picture types in each direction are different, MVD is derived when a short-term reference picture is obtained, and MVD is derived to 0 when a long-term reference picture is included. It is described in detail in the following drawings and tables.

Figure 14:
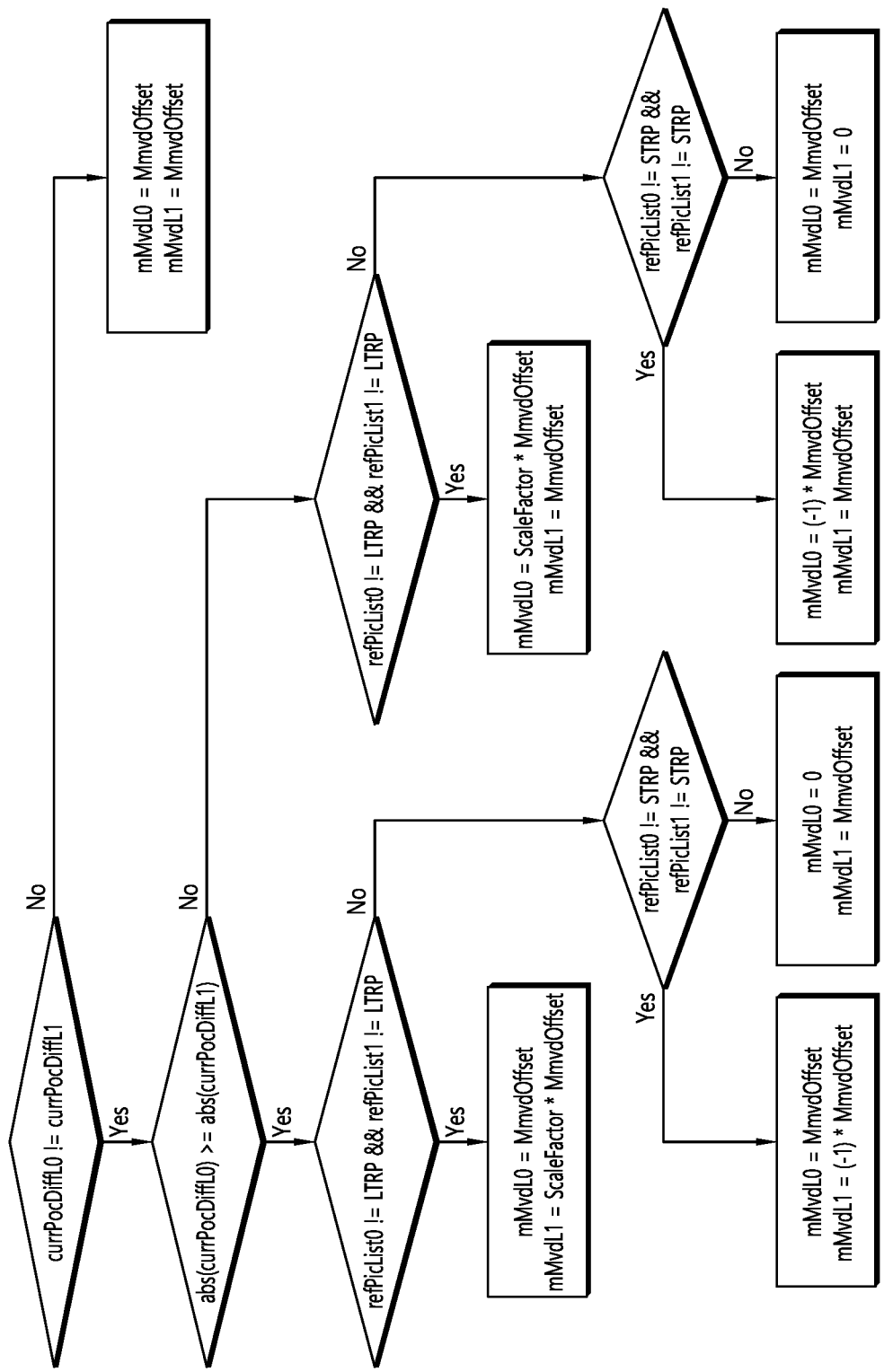
FIG. 14 illustrates an MVD derivation process of MMVD according to one embodiment of the present disclosure.

FIG. 14 shows an MVD derivation process of MMVD according to an embodiment of the present document. The method shown in FIG. 14 may be for a block to which bi-directional prediction is applied.

Referring to FIG. 14, when the reference picture types in each direction are different, MmvdOffset is applied when referring to a reference picture (short-term reference picture) that is close to the current picture, and MVD has a value of 0 when referring to a reference picture (long-term reference picture) that is far from the current picture. In this case, a picture close to the current picture can be regarded as having a short-term reference picture, but when the close picture is a long-term reference picture, mmvdOffset may be applied to a motion vector of a list indicating the short-term reference picture.

TABLE 10 mMvdL0 = 0
mMvdL1 = MmvdOffset
mMvdL0 = 0
mMvdL1 = (−1) * MmvdOffset
mMvdL0 = MmvdOffset
mMvdL1 = 0
mMvdL0 = (−1) * MmvdOffset
mMvdL1 = 0

For example, the four paragraphs included in Table 10 may sequentially replace the lowermost blocks (contents) of the flowchart included in FIG. 14.

In one example, when the method of the embodiment according to FIG. 14 is applied, a part of the standard document according to the present embodiment may be described as the following table.

TABLE 11

8.5.2.7 Derivation process for merge motion vector difference

Inputs to this process are:
- a luma location ( xCb, yCb ) of the top left sample of the current luma coding block relative to the top left luma sample of the current picture,
- reference indices refIdxL0 and refIdxL1.
- prediction list utilization flags predFlagL0 and predFlagL1.
Outputs of this process are the luma merge motion vector differences in 1/16 fractional-sample accuracy mMvdL0 and mMvdL1.
The variable currPic specifies the current picture.
The luma merge motion vector differences mMvdL0 and mMvdL1 are derived as follows:
- If both predFlagL0 and predFlagL1 are equal to 1. the following applies:
    currPocDiffL0 = DiffPicOrderCnt( currPic, RefPicList[ 0 ][ refIdxL0 ] )
    currPocDiffL1 = DiffPicOrderCnt( currPic, RelPicList[ 1 ][ refIdxL1 ])
  - If currPocDiffL0 is equal to currPocDiffL1 and, the following applies:
    mMvdL0[ 0 ] = MmvdOffset[ xCb ][ yCb ][ 0 ]
    mMvdL0[ 1 ] = MmvdOffset[ xCb ][ yCb ][ 1 ]
    mMvdL1[ 0 ] = MmvdOffset[ xCb ][ yCb ][ 0 ]
    mMvdL1[ 1 ] = MmvdOffset[ xCb ][ yCb ][ 1 ]
  - Otherwise, if Abs( currPocDiffL0 ) is greater than or equal to Abs( currPocDiffL1 ), the following applies:
    td = Clip3( −128, 127, currPocDiffL0 )
    tb = Clip3( −128, 127, currPocDiffL1 )
    tx = ( 16384 + ( Abs( td ) >> 1 ) ) / td
    distScaleFactor = Clip3( −4096, 4095, ( tb * tx + 32 ) >> 6)
    mMvdL0[ 0 ] = MmvdOffset[ xCb ][ yCb ][ 0 ]
    mMvdL0[ 1 ] = MmvdOffset[ xCb ][ yCb ][ 1 ]
    - If RefPicList[ 0 ][ refIdxL0 ] is not a long-term reference picture and RefPicList[ 1 ][ refIdxL1 ] is not a long-term reference picture, the following applies:
      mMvdL1[ 0 ] = Clip3( $-2^{15}$, $2^{15} - 1$, (distScaleFactor * mMvdL0[ 0 ] + 128 − ( distScaleFactor * mMvdL0[ 0 ] >= 0 ) ) >> 8)
      mMvdL1[ 1 ] = Clip3( $-2^{15}$, $2^{15} - 1$, (distScaleFactor * mMvdL0[ 1 ] + 128 − ( distScaleFactor * mMvdL0[ 1 ] >= 0 ) ) >> 8)
    - Otherwise, If RefPicList[ 0 ][ refIdxL0 ] is a long-term reference picture and RefPicList[ 1 ][ refIdxL1 ] is a long-term reference picture, the following applies:
      mMvdL1[ 0 ] = Sign( currPocDiffL0 ) = = Sign( currPocDiffL1 ) ?
      mMvdL0[ 0 ] : −mMvdL0[ 0 ]
      mMvdL1[ 0 ] = Sign( currPocDiffL0 ) = = Sign( currPocDiffL1 ) ?
      mMvdL0[ 0 ] : −mMvdL0[ 0 ]
    - Otherwise, the following applies:
      mMvdL0[ 0 ] = 0
      mMvdL0[ 1 ] = 0
      mMvdL1[ 0 ] = MmvdOffset[ xCb ][ yCb ][ 0 ]
      mMvdL1[ 1 ] = MmvdOffset[ xCb ][ yCb ][ 1 ]
  - Otherwise (Abs( currPocDiffL0 ) is less than Abs( currPocDiffL1 )), the following applies:
    td = Clip3( −128, 127, currPocDiffL1 )
    tb = Clip3( −128, 127, currPocDiffL0 )
    tx = ( 16384 + ( Abs( td ) >> 1 ) ) / td
    distScaleFactor = Clip3( −4096, 4095, ( tb * tx + 32) >> 6)
    mMvdL1[ 0 ] = MmvdOffset[ xCb ][ yCb ][ 0 ]
    mMvdL1[ 1 ] = MmvdOffset[ xCb ][ yCb ][ 1 ]
    - If RefPicList[ 0 ][ refIdxL0 ] is not a long-term reference picture and RefPicList[ 1 ][ refIdxL1 ] is not a long-term reference picture, the following applies:
      mMvdL1[ 0 ] = Clip3( $-2^{15}$, $2^{15} - 1$, (distScaleFactor * mMvdL1[ 0 ] + 128 − ( distScaleFactor * mMvdL1[ 0 ] >= 0 ) ) >> 8)
      mMvdL1[ 0 ] = Clip3( $-2^{15}$, $2^{15} - 1$, (distScaleFactor * mMvdL1[ 1 ] + 128 − ( distScaleFactor * mMvdL1[ 1 ] >= 0 ) ) >> 8)
    - Otherwise, If RefPicList[ 0 ][ refIdxL0 ] is a long-term reference picture and RefPicList[ 1 ][refIdxL1 ] is a long-term reference picture, the following applies:
      mMvdL10[ 0 ] = Sign( currPocDiffL0 ) = = Sign( currPocDiffL1 ) ?
      mMvdL1[ 0 ] : −mMvdL1[ 0 ]
      mMvdL0[ 1 ] = Sign( currPocDiffL0 ) = = Sign( currPocDiffL1 ) ?
      mMvdL1[ 1 ] : −mMvdL1[ 1 ]
    - Otherwise, the following applies:
      mMvdL0[ 0 ] = MmvdOffset[ xCb ][ yCb ][ 0 ]
      mMvdL0[ 1 ] = MmvdOffset[ xCb ][ yCb ][ 1 ]
      mMvdL1[ 0 ] = 0
      mMvdL1[ 1 ] = 0
- Otherwise ( predFlagL0 or predFlagL1 are equal to 1), the following applies for X being 0 and 1:
    mMvdLX[ 0 ] = ( predFlagLX = = 1 ) ? MmvdOffset[ xCb ][ yCb ][ 0 ] : 0
    mMvdLX[ 1 ] = ( predFlagLX = = 1 ) ? MmvdOffset[ xCb ][ yCb ][ 1 ] : 0

The following table shows a comparison table between the examples included in this document.

TABLE 12

| L0 | L1 | POC | Embodiment A | | Embodiment B | | Embodiment C | | Embodiment D | |
|---|---|---|---|---|---|---|---|---|---|---|
| | | | L0 Offset | L1 Offset | L0 Offset | L1 Offset | L0 Offset | L1 Offset | L0 Offset | L1 Offset |
| Short | Short | Same | Offset | Offset | Offset | Offset | Offset | Offset | Offset | Offset |
| | | Diff (L0 >= L1) | Offset | Scaled | Offset | Scaled | Offset | Scaled | Offset | Scaled |
| | | Diff (L0 < L1) | Scaled | Offset | Scaled | Offset | Scaled | Offset | Scaled | Offset |
| Long | Long | Same | Offset | Offset | Offset | Offset | 0 | 0 | Offset | Offset |
| | | Diff (L0 >= L1) | Offset | (−1) Offset | Offset | (−1) Offset | 0 | 0 | Offset | (−1) Offset |
| | | Diff (L0 < L1) | (−1) Offset | Offset | (−1) Offset | Offset | 0 | 0 | (−1) Offset | Offset |
| Short | Long | Same | N/A | N/A | N/A | N/A | N/A | N/A | N/A | N/A |
| | | Diff (L0 >= L1) | N/A | N/A | N/A | N/A | N/A | N/A | N/A | N/A |
| | | Diff (L0 < L1) | (−1) Offset | Offset | 0 | 0 | 0 | 0 | Offset | 0 |
| Long | Short | Same | N/A | N/A | N/A | N/A | N/A | N/A | N/A | N/A |
| | | Diff (L0 >= L1) | Offset | (−1) Offset | 0 | 0 | 0 | 0 | 0 | Offset |
| | | Diff (L0 < L1) | N/A | N/A | N/A | N/A | N/A | N/A | N/A | N/A |

Referring to Table 12, a comparison between methods of applying an offset in consideration of reference picture types for MVD derivation of MMVD described in the embodiments according to FIG. 10 to FIG. 14 is shown. In Table 12, Embodiment A may relate to the existing MMVD, Embodiment B may show the embodiment according to FIG. 10 to FIG. 12, Embodiment C may show the embodiment according to FIG. 13, and Embodiment D may show the embodiment according to FIG. 14.

That is, in the embodiment according to FIG. 10, FIG. 11 and FIG. 12, the method of deriving MVD only when the reference picture types of both directions are the same has been described, and in the embodiment according to FIG. 13, the method of deriving MVD only when both directions are short-term reference pictures has been described. In the case of the embodiment according to FIG. 13, MVD may be set to 0 in the case of a long-term reference picture for unidirectional prediction. In addition, in the embodiment according to FIG. 14, a method of deriving MVD in only one direction when reference picture types in both directions are different has been described. Differences between the embodiments represent various features of the techniques described in this document, and it can be understood by those of ordinary skill in the art that the effects to be achieved by the embodiments according to this document can be implemented based on the features.

In an embodiment according to this document, when the reference picture type is a long-term reference picture, a separate process is performed. When a long-term reference picture is included, the POC difference (POCDiff)-based scaling or mirroring does not affect performance improvement, so the MmvdOffset value is assigned to the MVD in the direction having the short-term reference picture, and the value 0 is assigned to the MVD in the direction having the long-term reference picture. In one example, when this embodiment is applied, a part of a standard document conforming to the present embodiment may be described as shown in the following table.

TABLE 13

8.5.2.7 Derivation process for merge motion vector difference

Inputs to this process are:
- a luma location ( xCb, yCb ) of the top left sample of the current luma coding block relative to the top left luma sample of the current picture,
- reference indices refIdxL0 and refIdxL1,
- prediction list utilization flags predFlagL0 and predFlagL1.
Outputs of this process are the luma merge motion vector differences in 1/16 fractional sample accuracy mMvdL0 and mMvdL1.
The variable currPic specifies the current picture.
The luma merge motion vector differences mMvdL0 and mMvdL1 are derived as follows:
- If both predFlagL0 and predFlagL1 are equal to 1, the following applies:
  - If RefPicList[ 0 ][ refIdxL0 ] is a long-term reference picture or RefPicList[ 1 ] refIdxL1 ] is a long-term reference picture, the following applies:
    - If RefPicList[ 0 ][ refIdxL0 ] is a short-term reference picture,
      mMvdL0[ 0 ] = MmvdOffset[ xCb ][ yCb ][0 ]
      mMvdL0[ 1 ] = MmvdOffset[ xCb ][ yCb][ 1 ]
      mMvdL1[ 0 ] = 0
      mMvdL1[ 1 ] = 0
    - Otherwise, if RefPicList[ 1 ][ refIdxL1 ] is a short-term reference picture,
      mMvdL0[ 0 ] = 0
      mMvdL0[ 1 ] = 0
      mMvdL1[ 0 ] = MmvdOffset[ xCb ][yCb ][ 0 ]
      mMvdL1[ 1 ] = MmvdOffset[ xCb ][ yCb][ 1 ]
    - Otherwise,
      mMvdL0[ 0 ] = 0
      mMvdL0[ 1 ] = 0
      mMvdL1[ 0 ] = 0
      mMvdL1[ 1 ] = 0

TABLE 13-continued

8.5.2.7 Derivation process for merge motion vector difference

```
- Otherwise, the following applies:
    currPocDiffL0 = DiffPicOrderCnt( currPic, RefPicList[ 0 ][ refIdxL0 ] )
    currPocDiffL1 = DiffPicOrderCnt( currPic, RefPicList[ 1 ][ refIdxL1 ] )
- If currPocDiffL0 is equal to currPocDiffL, the following applies:
    mMvdL0[ 0 ] = MmvdOffset[ xCb ][ yCb ][ 0 ]
    mMvdL0[ 1 ] = MmvdOffset[ xCb ][ yCb ][ 1 ]
    mMvdL1[ 0 ] = MmvdOffset[ xCb ][ yCb ][ 0 ]
    mMvdL1[ 1 ] = MmvdOffset[ xCb ][ yCb ][ 1 ]
- Otherwise, if Abs( corrPocDiffL0 ) is greater than or equal to Abs( currPocDiffL1 ), the
following applies:
    td = Clip3( -128, 127, currPocDiffL0 )
    tb = Clip3( -128, 127, currPocDiffL1 )
    tx = ( 16384 + ( Abs( td ) >> 1 ) ) / td
    distScaleFactor = Clip3( -4096, 4095, ( tb tx + 32) >> 6)
    mMvdL0[ 0 ] = MmvdOffset[ xCb ][ yCb ][ 0 ]
    mMvdL1[ 1 ] = MmvdOffset[ xCb ][ yCb ][ 1 ]
    mMvdL1[ 0 ] = Clip3( -2$^{15}$, 2$^{15}$ - 1, (distScaleFactor * mMvdL0[ 0 ] +
    128 - ( distScaleFactor * mMvdL0[ 0 ] >= 0 ) ) >> 8)
    mMvdL1[ 1 ] = Clip3( -2$^{15}$, 2$^{15}$ - 1, (distScaleFactor * mMvdL0[ 1 ] +
    128 - ( distScaleFactor * mMvdL0[ 1 ] >= 0 ) ) >> 8)
- Otherwise (Abs( currPocDiffL0 ) is less than Abs( currPocDiffL1 )), the following applies:
    td = Clip3( -128, 127, currPocDiffL1 )
    tb = Clip3( -128, 127, currPocDiffL0 )
    tx = ( 16384 + ( Abs( td ) >> 1 ) ) / td
    distScaleFactor = Clip3( -4096, 4095, ( tb * tx + 32) >> 6)
    mMvdL1 [ 0 ] = MmvdOffset[ xCb ][ yCb ][ 0 ]
    mMvdL1[ 1 ] = MmvdOffset[ xCb ][ yCb ][ 1 ]
    mMvdL0[ 0 ] = Clip3( -2$^{15}$, 2$^{15}$ - 1, (distScaleFactor * mMvdL1 [ 0 ] +
    128 - (distScaleFactor * mMvdL1[ 0 ] >= 0) ) >> 8)
    mMvdL0[ 1 ] = Clip3( -2$^{15}$, 2$^{15}$, 1,, (distScaleFactor * mMvdL1[ 1 ] +
    128 - (distScaleFactor * mMvdL1[ 1 ] >= 0) ) >> 8 ) )
- Otherwise ( predFlagL0 or predFlagL1 are equal to 1), the following applies for X being 0 and 1:
  - If RefPicList[ X ][ refIdxLX ] is a long-term reference picture
      mMvdLX[ 0 ] = 0
      mMvdLX[ 1 ] = 0
  - Otherwise,
      mMvdLX[ 0 ] = ( predFlagLX == 1) ? MmvdOffset[ xCb ][ yCb ][ 0 ] : 0
      mMvdLX[ 1 ] = ( predFlagLX == 1) ? MmvdOffset[ xCb ][ yCb ][ 1 ] : 0
```

In another example, a portion of Table 13 may be replaced with the following table. Referring to Table 14, Offset may be applied based on a reference picture type other than POCDiff.

TABLE 14

```
- If both predFlagL0 and predFlagL1 are equal to 1, the following applies:
  - If RefPicList[ 0 ][ refIdxL0 ] is a long-term reference picture or RefPicList[ 1 ][ refIdxL1 ] is a long-
term reference picture, the following applies.
    - If RefPicList[ 0 ][ refIdxL0 ] is a short-term reference picture,
        mMvdL0[ 0 ] = MmvdOffset[ xCb ][ yCb ][ 0 ]
        mMvdL0[ 1 ] = MmvdOffset[ xCb ][ yCb ][ 1 ]
        mMvdL1[ 0 ] = -MmvdOffset[ xCb ][ yCb ][ 0 ]
        mMvdL1[ 1 ] = -MmvdOffset[ xCb ][ yCb ][ 1 ]
    - Otherwise, if RefPicList[ 1 ][refIdxL1 ] is a short-term reference picture,
        mMvdL0 0 ] = -MmvdOffset[ xCb ][ yCb ][ 0 ]
        mMvdL0 1 ] = -MmvdOffset[ xCb ][ yCb ][ 1 ]
        mMvdL1[ 0 ] = MmvdOffset[ xCb ][ yCb ][ 0 ]
        mMvdL1[ 1 ] = MmvdOffset[ xCb ][ yCb ][ 1 ]
    - Otherwise,
        mMvdL0[ 0 ] = MmvdOffset[ xCb ][ yCb ][ 0 ]
        mMvdL0[ 1 ] = MmvdOffset[ xCb ][ yCb ][ 1 ]
        mMvdL1[ 0 ] = -MmvdOffset[ xCb ][ yCb ][ 0 ]
        mMvdL1[ 1 ] = -MmvdOffset[ xCb ][ yCb ][ 1 ]
```

In another example, a portion of Table 13 may be replaced with the following table. Referring to Table 15, it is possible to always set MmvdOffset to L0 and -MmvdOffset to L1 without considering the reference picture type.

TABLE 15

```
- If both predFlagL0 and predFlagL1 are equal to 1, the following applies:
  - If RefPicList[ 0 ][ refIdxL0 ] is a long-term reference picture or RefPicList[ 1 ][ refIdxL1] is long-
term reference picture, the following applies:
```

TABLE 15-continued

```
mMvdL0[ 0 ] = MmvdOffset[ xCb ][ yCb ] [ 0 ]
mMvdL0[ 1 ] = MmvdOffset[ xCb ][ yCb ][ 1 ]
mMvdL1[ 0 ] = -MmvdOffset[ xCb ][ yCb ][ 0 ]
mMvdL1[ 1 ] = -MmvdOffset[ xCb ][ yCb ][ 1 ]
```

According to an embodiment of this document, SMVD in the inter mode may be performed similarly to MMVD used in the above-described MERGE mode. In the case of bidirectional prediction, whether or not symmetric MVD is derived is signaled from the encoding apparatus to the decoding apparatus, and when the related flag (ex. sym_mvd_flag) is true (or the value is 1), The second direction MVD (eg, MVDL1) is derived through mirroring of the first direction MVD (ex. MVDL0). In this case, scaling for the first direction MVD may not be performed.

The following tables show syntaxes for a coding unit according to an embodiment of this document.

TABLE 16

| coding_unit( x0, y0, ebWidth, cbHeight, treeType ) { | Descriptor |
|---|---|
| if( sps_smvd_enabled_flag && inter_pred_idc[ x0 ][ y0 ] = = PRED_BI && | |
| !inter affine_flag[ x0 ][ y0 ] && RefIdxSymL0 >-1 && RefIdxSymL1 > -1) | |
|   sym_mvd_flag[ x0 ][ y 0 ] | ae(v) |
| if( inter_pred_idc [ x0 ][ y0 ] != PRED_L1 ) { | |
|   if( NumRefIdxActive[ 0 ] >1 && !sym_mvd_flag[ x0 ][ y0 ]) | |
|     ref_idx_l0[ x0 ][ y0 ] | ae(v) |
|   mvd_coding( x0, y0, 0, 0) | |
|   if( MotionModelIdc[ x0 ][ y0 ] >0 ) | |
|     mvd_coding( x0, y0, 0, 1) | |
|   if(MotionModelIdc[ x0 ][ 0 ] > 1) | |
|     mvd_coding( x0, y0, 0, 2) | |
|   mvp_l0_flag[ x0 ][ y0 ] | ae(v) |
| } else { | |
|   MvdL0[ x0 ][ 0 ][ 0 ] = 0 | |
|   MvdL0[ x0 ][ y0 ][ 1 ] = 0 | |
| } | |
| if( inter_pred_idc[ x0 ][ y0 ] != PRED_L0 ) { | |
|   if( NumRefIdxActive[ 1 ] >1 && !sym_mvd_flag[ x0 ][ y0 ] ) | |
|     ref_idx_l1[ x0 ][ y0 ] | ae(v) |
|   if( mvd_l1_zero_flag && inter_pred_ide[ x0 ][ y0 ] = = PRED_BI ) { | |
|     MvdL1[ x0 ][ y0 ] = 0 | |
|     MvdL1[ x0 ][ y0 ][ 1 ] = 0 | |
|     MvdCpLl[ x0 ][ y0 ][ 0][ 0 ] = 0 | |
|     MvdCpL1[ x0 ][ y0 [ 0 ][ 1 ] = 0 | |
|     MvdCpL1[ x0 ][ y0 ][ 1][ 0 ] = 0 | |
|     MvdCpL1[ x0 ][ y0 ][ 1 ][ 1 ] = 0 | |
|     MvdCpL1[ x0 ][ y0][ 2 ][ 0 ] = 0 | |
|     MvdCpL1[ x0 ][y0 ][ 2 ][ 1 ] = 0 | |
|   } else { | |
|     if( sym_mvd_flag[ x0 ][ y0 ] ) { | |
|       MvdL1[ x0 [ y0 ][ 0 ] = -MvdL0[ x0 ][ y0 ][ 0 ] | |
|       MvdL1 [ x0 ][ y0 ][ 1 1 = -MvdL0[ x0 ][ y0 ][ 1 ] | |
|   } else | |
|     mvd_coding( x0, y0, 1, 0) | |
|   if( MotionModelIdc[ x0 ][ y0 ] > 0) | |
|     mvd_coding( x0, y0, 1, 1) | |
|   if(MotionModelIdc[ x0 ][ y0 ] >1 ) | |
|     mvd_coding( x0, y0, 1, 2) | |
|   mvp_l1_flag[ x0 ][ y0 ] | ae(v) |
| } | |
| } else { | |
|   MvdL1[ x0 ][ y0 ][ 0 ] = 0 | |
|   MvdL1[ x0 ][ y0 ][ 1 ] = 0 | |
| } | |
| ... | |
| } | |

TABLE 17

| | |
|---|---|
| if( sps_smvd_enabled_flag && inter_pred_idc[ x0 ][ y0 ] = = PRED_BI && | |
| !inter_affine_flag[ x0 ][ y0 ] && RefIdxSymL0 > -1 && RefIdxSymL1 > -1 ) | |
|   sym_mvd_flag[ x0 ][ y0 ] | ae(v) |

Referring to Tables 16 and 17, when inter_pred_idc==PRED_BI and reference pictures of L0 and L1 are available (eg, RefIdxSymL0>-1 && RefIdxSymL1>-1), sym_mvd_flag is signaled.

The following table shows a decoding procedure for MMVD reference indices according to an example.

TABLE 18

8.3.5 Decoding process for symmetric motion vector difference reference indices

Output of this process are RefIdxSymL0 and RefIdxSymL1 specifying the list 0 and list 1 reference picture indices for symmetric motion vector differences i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) > 0,
      DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.
  RefIdxSymL1 is set equal to −1.
  For each index i with i = 0..NumRefIdxActive[ 1 ] − 1, the following applies:
    When all of the following conditions are true, RefIdxSymL1 is set to i:
      DiffPicOrderCnt( currPic, RefPicList[ 1 ][ i ] ) < 0,
      DiffPicOrderCnt( currPic, RefPicList[ 1 ][ i ] )
      DiffPicOrderCnt( currPic, RefPicList[ 1 ][ RefIdxSymL1 ] ) or RefIdxSymL1 is equal to −1.
  When RefIdxSymL0 is equal to −1 or RefIdxSymL1 is equal to −1, the following applies:
    For each index i with i = 0..NumRefIdxActive[ 0 ] − 1, the following applies:
      When all of the following conditions are true, RefIdxSymL0 is set to i:
        DiffPicOrderCnt( currPic, RefPicList[ 0 ][ i ] ) < 0,
        DiffPicOrderCnt( currPic, RefPicList[ 0 ][ i ] ) >
        DiffPicOrderCnt( currPic, RelPicList[ 0 ][ RefIdxSymL0 ] ) or RefIdxSymL0 is equal to −1.
    For each index i with i = 0..NumRefIdxActive[ 1 ] − 1, the following applies:
      When all of the following conditions are true, RefIdxSymL1 is set to i:
        DiffPicOrderCnt( currPic, RefPicList[ 1 ][ i ] ) > 0,
        DiffPicOrderCnt( currPic, RefPicList[ 1 ][ i ] ) <
        DiffPicOrderCnt( currPic, RefPicList[ 1 ][ RefIdxSymL1 ] ) or RefIdxSymL1 is equal to −1.

Referring to Table 18, a procedure for deriving availability of reference pictures of L0 and L1 is described. That is, if there is a reference picture in the forward direction among the L0 reference pictures, the index of the reference picture closest to the current picture is set as RefIdxSymL0, and the corresponding value is set as the reference index of L0. In addition, when if there is a reference picture in the backward direction among the L1 reference pictures, the index of the reference picture closest to the current picture is set as RefIdxSymL1, and the corresponding value is set as the reference index of L1.

Table 19 below shows a decoding procedure for MMVD reference indices according to another example.

TABLE 19

8.3.5 Decoding process for symmetric motion vector difference reference indices

Output of this process are RefIdxSymL0 and RefIdxSymL1 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) > 0,
      DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.
  RefIdxSymL1 is set equal to −1.
  For each index i with i = 0..NumRefIdxActive[ 1 ] − 1, the following applies:
    When all of the following conditions are true, RefIdxSymL1 is set to i:
      DiffPicOrderCnt( currPic, RefPicList[ 1 ][ i ] ) < 0,
      DifPicOrderCnt( currPic, RefPicList[ 1 ][ i ] )
      DiffPicOrderCnt( currPic, RefPicList[ 1 ][ RefIdxSymL1 ] ) or RefIdxSymL1 is equal to −1.
  When RefIdxSymL0 is equal to −1 or RefIdxSymL1 is equal to −1, the following applies:
    For each index i with i = 0..NumRefIdxActive[ 0 ] − 1, the following applies:
      When all of the following conditions are true, RefIdxSymL0 is set to i:
        DiffPicOrderCnt( currPic, RefPicList[ 0 ][ i ] ) < 0,
        DiffPicOrderCnt( currPic, RefPicList[ 0 ][ i ] ) >
        DiffPicOrderCnt( currPic, RefPicList[ 0 ][ RefIdxSymL0 ] ) or RefIdxSymL0 is equal to −1.
    For each index i with i = 0..NumRefIdxActive[ 1 ] − 1, the following applies:
      When all of the following conditions are true, RefIdxSymL1 is set to i:
        DiffPicOrderCnt( currPic. RefPicList[ 1 ][ i ] ) > 0,
        DiffPicOrderCnt( currPic, RefPicList[ 1 ][ i ] ) <
        DiffPicOrderCnt( currPic, RefPicList[ 1 ][ RefIdxSymL1 ] ) or RefIdxSymL1 is equal to −1.
  When RefIdxSymL0 is not equal to −1 and RefIdxSymL1 is not equal to −1, the following applies
    If (RefPicList[ 0 ][ RefIdxSymL0 ] is a long-term reference picture and RefPicList[ 1 ][ RefIdxSymL1 ] is a short-term reference picture) or (RefPicList[ 0 ][ RefIdxSymL0 ] is a short-term reference picture and RefPicList[ 1 ][ RefIdxSymL1 ] is a long-term reference picture), RefIdxSymL0 and RefIdxSymL1 are set to −1.

Referring to Table 19, as in the embodiment described with FIG. 10, FIG. 11, and FIG. 12, when the types of L0 or L1 reference pictures are different, that is, if the reference picture types of L0 and L1 are different after reference index derivation for SMVD, SMVD is not used in order to prevent SMVD in a case that the long term reference picture and the short term reference picture are used (refer to the lowermost paragraph of Table 19).

In an embodiment of this document, SMVD may be applied in the inter mode similar to MMVD used in the merge mode. When a long-term reference picture is used as in the embodiment described with FIG. 13, the long-term reference picture may be excluded from the reference index derivation process for SMVD as shown in the following table in order to prevent SMVD.

TABLE 20

| 8.3.5 Decoding process for symmetric motion vector difference reference indices |
| --- |
| Output of this process are RefIdxSymL0 and RefIdxSymL1 specifying the list 0 and list 1 reference picture indices for symmetric motion vector differences, i.e., when sym_mvd_flag is equal to 1 for a coding unit. The variable RefIdxSymLX with X being 0 and 1 is derived as follows:<br>  The variable currPic specifies the current picture.<br>  RefIdxSymL0 is set equal to −1.<br>  For each index i with i = 0..NumRefIdxActive[ 0 ] − 1, the following applies:<br>    When all of the following conditions are true, RefIdxSymL0 is set to i:<br>      DiffPicOrderCnt( currPic, RefPicList[ 0 ][ i ] ) > 0,<br>      DiffPicOrderCnt( currPic, RefPicList[ 0 ][ i ] ) <<br>      DiffPicOrderCnt( currPic, RefPicList[ 0 ][ RefIdxSymL0 ] ) or RefIdxSymL0 is equal to −1.<br>      RefPicList[ 0 ][ i ] is a short-term-reference picture.<br>  RefIdxSymL1 is set equal to −1.<br>  For each index i with i = 0..NumRefIdxActive[ 1 ] − 1, the following applies:<br>    When all of the following conditions are true, RefIdxSymL1 is set to i:<br>      DiffPicOrderCnt( currPic, RefPicList[ 1 ][ i ] ) < 0,<br>      DiffPicOrderCnt( currPic, RefPicList[ 1 ][ i ] )<br>      DiffPicOrderCnt( currPic, RefPicList[ 1 ][ RefIdxSymL1 ] ) or RefIdxSymL1 is equal to −1.<br>      RefPicList[ 1 ][ i ] is a short-term-reference picture.<br>  When RefIdxSymL0 is equal to −1 or RefIdxSymL1 is equal to −1, the following applies:<br>    For each index i with i = 0..NumRefIdxActive[ 0 ] − 1, the following applies:<br>      When all of the following conditions are true, RefIdxSymL0 is set to i:<br>        DiffPicOrderCnt( currPic, RefPicList[ 0 ][ i ] ) < 0,<br>        DiffPicOrderCnt( currPic, RefPicList[ 0 ][ i ] ) ><br>        DiffPicOrderCnt( currPic, RefPicList[ 0 ][ RefIdxSymL0 ] ) or RefIdxSymL0 is equal to −1.<br>        RefPicList[ 0 ][ i ] is a short-term-reference picture.<br>    For each index i with i = 0..NumRefIdxActive[ 1 ] − 1, the following applies:<br>      When all of the following conditions are true, RefIdxSymL1 is set to i:<br>        DiffPicOrderCnt( currPic. RefPicList[ 1 ][ i ] ) > 0,<br>        DiffPicOrderCnt( currPic, RefPicList[ 1 ][ i ] ) <<br>        DiffPicOrderCnt( currPic, RefPicList[ 1 ][ RefIdxSymL1 ] ) or RefIdxSymL1 is equal to −1.<br>        RefPicList[ 1 ][ i ] is a short-term-reference picture. |

The following table according to another example of this embodiment shows an example of processing not to apply SMVD when a long-term reference picture is used after reference picture index derivation for SMVD.

TABLE 21

| 8.33 Decoding process for symmetric motion vector difference reference indices |
| --- |
| Output of this process are RefIdxSymL0 and RefIdxSymL1 specifying the list 0 and list 1 reference picture indices for symmetric motion vector differences, i.e., when sym_mvd_flag is equal to 1 for a coding unit. The variable RefIdxSymLX with X being 0 and 1 is derived as follows:<br>  The variable currPic specifies the current picture.<br>  RefIdxSymL0 is set equal to −1.<br>  For each index i with i = 0..NumRefIdxActive[ 0 ] − 1, the following applies:<br>    When all of the following conditions are true, RefIdxSymL0 is set to i:<br>      DiffPicOrderCnt( currPic, RefPicList[ 0 ][ i ] ) > 0,<br>      DiffPicOrderCnt( currPic, RefPicList[ 0 ][ i ] ) <<br>      DiffPicOrderCnt( currPic, RefPicList[ 0 ][ RefIdxSymL0 ] ) or RefIdxSymL0 is equal to −1.<br>  RefIdxSymL1 is set equal to −1.<br>  For each index i with i = 0..NumRefIdxActive[ 1 ] − 1, the following applies:<br>    When all of the following conditions are true, RefIdxSymL1 is set to i:<br>      DiffPicOrderCnt( currPic, RefPicList[ 1 ][ i ] ) < 0,<br>      DiffPicOrderCnt( currPic, RefPicList[ 1 ][ i ] )<br>      DiffPicOrderCnt( currPic, RefPicList[ 1 ][ RefIdxSymL1 ] ) or RefIdxSymL1 is equal to −1.<br>  When RefIdxSymL0 is equal to −1 or RefIdxSymL1 is equal to − 1, the following applies:<br>    For each index i with i = 0..NumRefIdxActive[ 0 ] − 1, the following applies:<br>      When all of the following conditions are true, RefIdxSymL0 is set to i:<br>        DiffPicOrderCnt( currPic, RefPicList[ 0 ][ i ] ) < 0,<br>        DiffPicOrderCnt( currPic, RefPicList[ 0 ][ i ] ) > |

TABLE 21-continued 8.33 Decoding process for symmetric motion vector difference reference indices DiffPicOrderCnt( currPic, RelPicList[ 0 ][ RefIdxSymL0 ] ) or RefIdxSymL0 is equal to −1.
For each index i with i = 0..NumRefIdxActive[ 1 ] − 1, the following applies:
  When all of the following conditions are true, RefIdxSymL1 is set to i:
    DiffPicOrderCnt( currPic, RefPicList[ 1 ][ i ] ) > 0,
    DiffPicOrderCnt( currPic, RefPicList[ 1 ][ i ] ) <
    DiffPicOrderCnt( currPic, RefPicList[ 1 ][ RefIdxSymL1 ] ) or RefIdxSymL1 is equal to −1.
When RefIdxSymL0 is not equal to −1 or RefIdxSymL1 is not equal to −1, the following applies:
  If RefPicList [ 0 ][RefIdxSymL0 ] is a long-term reference picture or RefPicList[ 1 ][ RefIdx
SymL1 ] is a long-term reference picture, RefIdxSymL0 and RefIdxSymL1 are set to −1.

In one embodiment of this document, in the colMV derivation process of TMVP, when the reference picture type of the current picture and the reference picture type of the collocated picture are different, the motion vector MV is set to 0, but the derivation method in the case of MMVD and SMVD are not same as for TMVP and they need to be unified.

Even when the reference picture type of the current picture is a long-term reference picture and the reference picture type of the collocated picture is a long-term reference picture, the motion vector uses the value of the collocated motion vector as it is, but MV may be set to 0 in MMVD and SMVD. In this case, TMVP also sets MV to 0 without additional induction.

In addition, even if the reference picture types are different, a long-term reference picture having a close distance to the current picture may exist. Therefore, instead of setting the MV to 0, colMV may be used as the MV without scaling.

Figure 15:
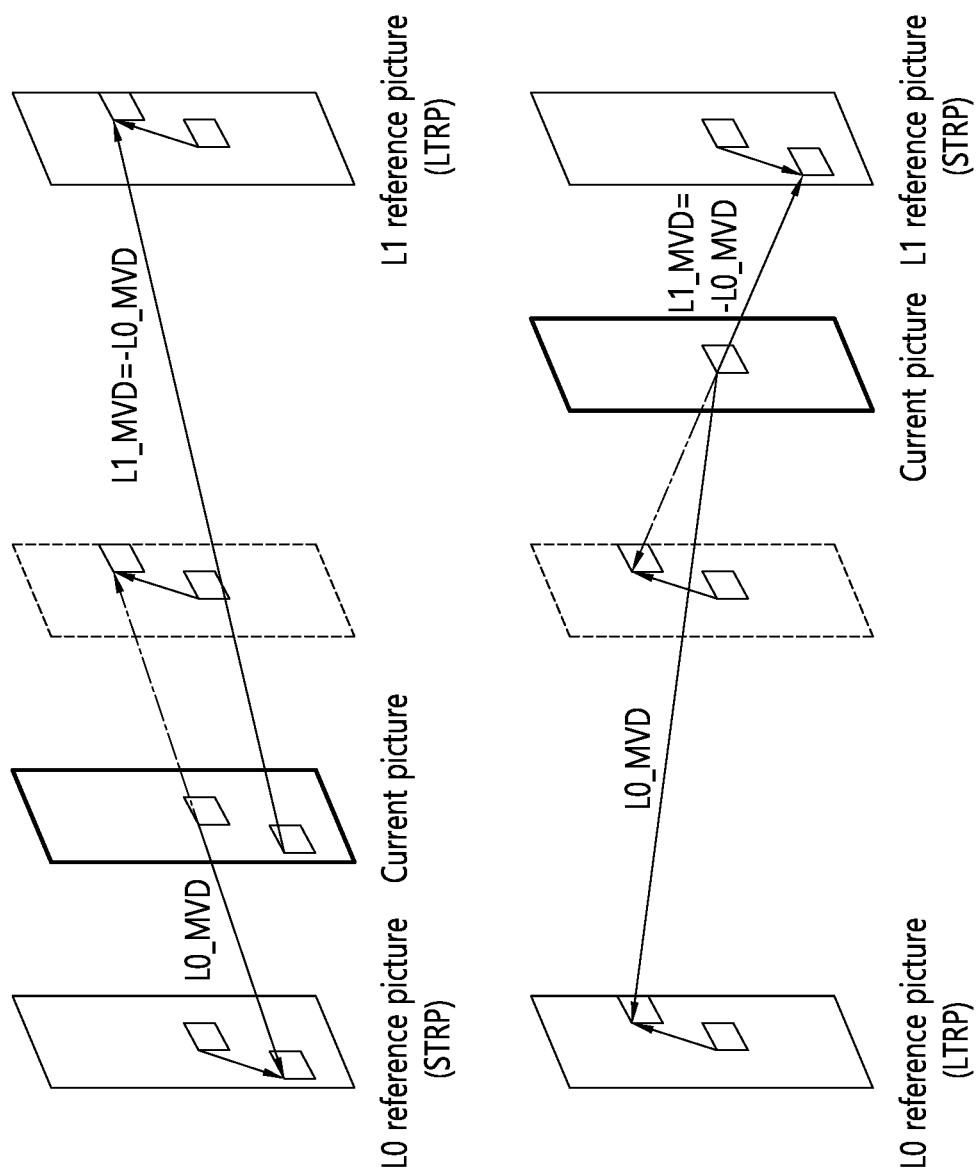
FIG. 15 is a diagram for describing symmetric motion vector differences (SMVD) according to one embodiment of the present disclosure.

FIG. 15 is a diagram for describing symmetric motion vector differences (SMVD) according to one embodiment of the present disclosure.

A method as shown in FIG. 15 may be used for deriving SMVD. In other words, SMVD may be derived based on a short-term reference picture (STRP) and/or a long-term reference picture (LTRP). If different types of reference pictures are used when a mirrored L0 MVD is used as an L1 MVD, an inaccurate MVD may be derived. It is so because a distance ratio (distance between reference picture 0 and a current picture and distance between reference picture 1 and the current picture) increases, and the correlation between motion vectors at different directions decreases.

According to one embodiment of the present disclosure, availability of reference pictures is checked, and if conditions are met, sym_mvd_flag may be parsed. If sym_mvd_flag is true, MVD of L1 (MVDL1) may be derived as a mirrored MVDL0 (MVD of L0).

The following table shows part of coding unit syntax according to the present embodiment.

TABLE 22

| | |
|---|---|
| if( sps_smvd_enabled_flag && inter_pred_ics[ x0 ][ y0 ] = = PRED_BI && | |
|   !inter_affine_flag[ x0 ][ y0 ] && RefIdxSymL0 > −1 && RefIdxSymL1 > −1 ) | |
|   sym_mvd_flag[ x0 ][ y0 ] | ae(v) |
| if( inter_pred_idc[ x0 ][ y0 ] != PRED_L1 ) { | |
|   if( NumRefIdxActive[ 0 ] > 1 && !sym_mvd_flag[ x0 ][ y0 ] ) | |
|     ref_idx_l0[ x0 ][ y0 ] | ac(v) |
|   mvd_coding( x0, y0, 0, 0) | |
|   if( MotionModelIdc[ x0 ][ y0 ] > 0) | |
|     mvd_coding( x0, y0, 0, 1 ) | |
|   if(MotionModelIdc[ x0 ][ y0 ] > 1 ) | |
|     mvd_coding( x0, y0, 0, 2) | |
|   mvp_l0_flag[ x0][ y0 ] | ae(v) |
| } else { | |
|   MvdL0[ x0 ][ y0 ][ 0 ] = 0 | |
|   MvdL0[ x0 ][ y0 ][ 1 ] = 0 | |
| } | |
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( mvd_l1_zero_flag && inter_pred_idc[ x0 ][ y0 ] = = PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding( x0, y0, 1, 0) | |
|     if( MotionModelIdc[ x0 ][ y0 ] > 0 ) | |

TABLE 22-continued

```
        mvd_coding( x0, y0, 1, 1)
        if(MotionModelIdc[ x0 ][ y0 ] > 1 )
          mvd_coding( x0, y0, 1, 2 )
        mvp_l1_flag[ x0 ][ y0 ]                                    ae(v)
      }
    } else {
      MvdL1[ x0 ][ y0 ][ 0 ] = 0
      MvdL1[ x0 ][ y0 ][ 1 ] = 0
    }
```

A procedure for deriving sym_mvd_flag according to the present embodiment may be described based on Table 22.

In the present embodiment, reference picture indices for SMVD (RefIdxSymLX with X=0, 1) may be derived. RefIdxSymL0 may represent (the index of) the closest reference picture having a POC smaller than that of the current picture. RefIdxSymL1 may represent (the index of) the closest reference picture having a POC larger than that of the current picture.

The following table describes a method for deriving reference picture indices for SMVD according to the present embodiment in the form of a standard document.

TABLE 23

8.3.5 Decoding process for symmetric motion vector difference reference indices

Output of this process are RefIdxSymL0 and RefIdxSymL1 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) > 0,
      DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.
  RefIdxSymL1 is set equal to −1.
  For each index i with i = 0..NumRefIdxActive[ 1 ] − 1, the following applies:
    When all of the following conditions are true, RefIdxSymL1 is set to i:
      DiffPicOrderCnt( currPic, RefPicList[ 1 ][ i ] ) < 0,
      DiffPicOrderCnt( currPic, RefPicList[ 1 ][ i ] ) >
      DiffPicOrderCnt( currPic, RefPicList[ 1 ][ RefIdxSymL1 ] ) or RefIdxSymL1 is equal to −1.
When RefIdxSymL0 is equal to −1 or RefIdxSymL1 is equal to − 1, the following applies:
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) < 0,
      DiffPicOrderCnt( currPic, RefPicList[ 0 ][ i ] ) >
      DiffPicOrderCnt( currPic, RefPicList[ 0 ][ RefIdxSymL0 ] ) or RefIdxSymL0 is equal to −1.
  For each index i with i = 0..NumRefIdxActive[ 1 ] − 1, the following applies:
    When all of the following conditions are true, RefIdxSymL1 is set to i:
      DiffPicOrderCnt( currPic, RefPicList[ 1 ][ i ] ) > 0,
      DiffPicOrderCnt( currPic, RefPicList[ 1 ][ i ] ) <
      DiffPicOrderCnt( currPic, RefPicList[ 1 ][ RefIdxSymL1 ] ) or RefIdxSymL1 is equal to −1.

The following table shows a comparison result between embodiments. By considering the reference picture type according to the embodiments included in Table 24, the MVD accuracy of SMVD may be improved. In Table 24, MVD may represent MVD 0 (MVD of l0)

TABLE 24

| | | Embodiment P | | Embodiment Q | | Embodiment R | |
|---|---|---|---|---|---|---|---|
| L0 | L1 | L0 MVD | L1 MVD | L0 MVD | L1 MVD | L0 MVD | L1 MVD |
| short | Short | MVD | (−1) MVD | MVD | (−1) MVD | MVD | (−1) MVD |
| long | Long | MVD | (−1) MVD | MVD | (−1) MVD | | |
| short | Long | MVD | (−1) MVD | | | | |
| long | short | MVD | (−1) MVD | | | | |

Referring to Table 24, embodiment P describes an existing method for deriving SMVD. In embodiment Q, SMVD may be limited when mixed reference picture types (for example, STRP/LTRP or LTRP/STRP) are used in L0 and L1. In embodiment R, SMVD may be limited when a long-term reference picture (LTRP) is referenced.

The following table describes a method for deriving reference picture indices for SMVD according to the embodiment Q of Table 24 in the form of a standard document.

TABLE 25

| 8.3.5 Decoding process for symmetric motion vector difference reference indices |
| --- |
| Output of this process are RefIdxSymL0 and RefIdxSymL1 specifying the list 0 and list 1 reference picture indices for symmetric motion vector differences, i.e., when sym_mvd_flag is equal to 1 for a coding unit<br>The variable RefIdxSymLX with X being 0 and 1 is derived as follows:<br>    The variable currPic specifies the current picture.<br>    RefIdxSymL0 is set equal to −1.<br>    For each index i with i = 0..NumRefIdxActive[ 0 ] − 1, the following applies:<br>        When all of the following conditions are true, RefIdxSymL0 is set to i:<br>            DiffPicOrderCnt( currPic, RefPicList[ 0 ][ i ] ) > 0,<br>            DiffPicOrderCnt( currPic, RefPicList[ 0 ][ i ] ) <<br>            DiffPicOrderCnt( currPic, RefPicList[ 0 ][ RefIdxSymL0 ] ) or RefIdxSymL0 is equal to −1.<br>    RefIdxSymL1 is set equal to −1.<br>    For each index i with i _ 0..NumRefIdxActive[ 1 ] − 1, the following applies:<br>        When all of the following conditions are true, RefIdxSymL1 is set to i:<br>            DiffPicOrderCnt( currPic, RefPicList[ 1 ][ i ] ) < 0,<br>            DiffPicOrderCnt( currPic, RefPicList[ 1 ][ i ] )<br>            DiffPicOrderCnt( currPic, RefPicList[ 1 ][ RefIdxSymL1 ] ) or RefIdxSymL1 is equal to −1.<br>    When RefIdxSymL0 is equal to −1 or RefIdxSymL1 is equal to − 1, the following applies:<br>        For each index i with i = 0..NumRefIdxActive[ 0 ] − 1, the following applies:<br>            When all of the following conditions are true, RefIdxSymL0 is set to i:<br>                DiffPicOrderCnt( currPic, RefPicList[ 0 ][ i ] ) < 0,<br>                DiffPicOrderCnt( currPic, RefPicList[ 0 ][ i ] ) ><br>                DiffPicOrderCnt( currPic, RefPicList[ 0 ][ RefIdxSymL0 ] ) or RefIdxSymL0 is equal to<br>                −1.<br>        For each index i with i = 0..NumRefIdxActive[ 1 ] − 1, the following applies:<br>            When all of the following conditions are true, RefIdxSymL1 is set to i:<br>                DiffPicOrderCnt( currPic. RefPicList[ 1 ][ i ] ) > 0,<br>                DiffPicOrderCnt( currPic, RefPicList[ 1 ][ i ] ) <<br>                DiffPicOrderCnt( currPic, RefPicList[ 1 ][ RefIdxSymL1 ] ) or RefIdxSymL1 is equal to<br>                −1.<br>    When RefIdxSymL0 is no equal to −1 and RefIdxSymL1 is not equal to − 1, the following applies<br>        If (RefPicList[ 0 ][ RefIdxSymL0 ] is a long-term reference picture and<br>        RefPicList[ 1 ][ RefIdxSymL1 ] is a short-term reference picture) or<br>        (RefPicList[ 0 ][ RefIdxSymL0 ] is a short term reference picture and<br>        RefPicList[ 1 ][ RefIdxSymL1 ] is a long-term reference picture), RefIdxSymL0 and RefIdxSymL1<br>        are set equal to −1. |

The following tables describe methods for deriving reference picture indices for SMVD according to the embodiment Q of Table 24 in the form of a standard document.

TABLE 26

| 8.3.5 Decoding process for symmetric motion vector difference reference indices |
| --- |
| Output of this process are RefIdxSymL0 and RefIdxSymL1 specifying the list 0 and list 1 reference picture indices for symmetric motion vector differences, i.e., when_sym_mvd_flag is equal to 1 for a coding unit.<br>The variable RefIdxSymLX with X being 0 and 1 is derived as follows:<br>    The variable currPic specifies the current picture.<br>    RefIdxSymL0 is set equal to −1.<br>    For each index i with i = 0..NumRefIdxActive[ 0 ] − 1, the following applies:<br>        When all of the following conditions are true, RefIdxSymL0 is set to i:<br>            DiffPicOrderCnt( currPic, RefPicList[ 0 ][ i ] ) > 0,<br>            DiffPicOrderCnt( currPic, RefPicList[ 0 ][ i ] ) <<br>            DiffPicOrderCnt( currPic, RefPicList[ 0 ][ RefIdxSymL0 ] ) or RefIdxSymL0 is equal to −1.<br>            RefPicList[ 0 ][ i ] is a short-term-reference picture.<br>    RefIdxSymL1 is set equal to −1.<br>    For each index i with i = 0..NumRefIdxActive[ 1 ] − 1, the following applies:<br>        When all of the following conditions are true, RefIdxSymL1 is set to i:<br>            DiffPicOrderCnt( currPic, RefPicList[ 1 ][ i ] ) < 0,<br>            DiffPicOrderCnt( currPic, RefPicList[ 1 ][ i ] )<br>            DiffPicOrderCnt( currPic, RefPicList[ 1 ][ RefIdxSymL1 ] ) or RefIdxSymL1 is equal to −1.<br>            RefPicList[ 1 ][ i ] is a short-term-reference picture.<br>    When RefIdxSymL0 is equal to −1 or RefIdxSymL1 is equal to −1, the following applies:<br>        For each index i with i = 0..NumRefIdxActive[ 0 ] − 1, the following applies:<br>            When all of the following conditions are true, RefIdxSymL0 is set to i:<br>                DiffPicOrderCnt( currPic, RefPicList[ 0 ][ i ] ) < 0, |

TABLE 26-continued 8.3.5 Decoding process for symmetric motion vector difference reference indices DiffPicOrderCnt( currPic, RefPicList[ 0 ][ i ] ) >
DiffPicOrderCnt( currPic, RefPicList[ 0 ][ RefIdxSymL0 ] ) or RefIdxSymL0 is equal to −1.
RefPicList[ 0 ][ i ] is a short-term-reference picture.
For each index i with i = 0..NumRefIdxActive[ 1 ] − 1, the following applies:
  When all of the following conditions are true, RefIdxSymL1 is set to i:
    DiffPicOrderCnt( currPic. RefPicList[ 1 ][ i ] ) > 0,
  DiffPicOrderCnt( currPic, RefPicList[ 1 ][ i ] ) <
  DiffPicOrderCnt( currPic, RefPicList[ 1 ][ RefIdxSymL1 ] ) or RefIdxSymL1 is equal to −1.
  RefPicList[ 1 ][ i ] is a short-term-reference picture.

TABLE 27

8.3.5 Decoding process for symmetric motion vector difference reference indices

Output of this process are RefIdxSymL0 and RefIdxSymL1 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) > 0,
      DiffPicOrderCnt( currPic, RefPicList[ 0 ][ i ] ) <
      DiffPicOrderCnt( currPic, RefPicList[ 0 ][ RefIdxSymL0 ] ) or RefIdxSymL0 is equal to −1.
  RefIdxSymL1 is set equal to −1.
  For each index i with i = 0..NumRefIdxActive[ 1 ] − 1, the following applies:
    When all of the following conditions are true, RefIdxSymL1 is set to i:
      DiffPicOrderCnt( currPic, RefPicList[ 1 ][ i ] ) < 0,
      DiffPicOrderCnt( currPic, RefPicList[ 1 ][ i ] )
      DiffPicOrderCnt( currPic, RefPicList[ 1 ][ RefIdxSymL1 ] ) or RefIdxSymL1 is equal to −1.
When RefIdxSymL0 is equal to −1 or RefIdxSymL1 is equal to − 1, the following applies:
  For each index i with i = 0..NumRefIdxActive[ 0 ] − 1, the following applies:
    When all of the following conditions are true, RefIdxSymL0 is set to i:
      DiffPicOrderCnt( currPic, RefPicList[ 0 ][ i ] ) < 0,
      DiffPicOrderCnt( currPic, RefPicList[ 0 ][ i ] ) >
      DiffPicOrderCnt( currPic, RelPicList[ 0 ][ RefIdxSymL0 ] ) or RefIdxSymL0 is equal to −1.
  For each index i with i = 0..NumRefIdxActive[ 1 ] − 1, the following applies:
    When all of the following conditions are true, RefIdxSymL1 is set to i:
      DiffPicOrderCnt( currPic. RefPicList[ 1 ][ i ] ) > 0,
      DiffPicOrderCnt( currPic, RefPicList[ 1 ][ i ] ) <
      DiffPicOrderCnt( currPic, RefPicList[ 1 ][ RefIdxSymL1 ] ) or RefIdxSymL1 is equal to −1.
When RefIdxSymL0 is not equal to −1 or RefIdxSymL1 is not equal to −1, the following applies:
  If RefPicList [ 0 ][RefIdxSymL0 ] is a long-term reference picture or
  RefPicList[ 1 ][ RefIdxSymL1 ] is a long-term reference picture, RefIdxSymL0 and RefIdxSymL1 are set to −1.

Referring to Table 26 and/or Table 27, SMVD may be limited when a long-term reference picture (LTRP) is referenced. For example, referring to Table 26, a long-term reference picture may be excluded from a reference picture checking process. Accordingly, other reference pictures (rather than a long-term reference picture, for example) may be considered for SMVD. Referring to Table 27, when a reference picture closest to the current picture is a long-term reference picture, SMVD may not be performed. For example, even if short-term reference pictures are included in a reference picture list, SMVD may not be performed when the closest reference picture to the current picture is the long-term reference picture.

In an example according to one embodiment of the present disclosure, when the POC distance of L0 is greater than or equal to the POC of L1 in the MMVD procedure, L1 MVD may be derived as a scaled or mirrored L0 MVD. When the POC distance of L0 is smaller than the POC of L1 in the MMVD procedure, L0 MVD may be derived as a scaled or mirrored L1 MVD in the MMVD procedure.

Figure 16:
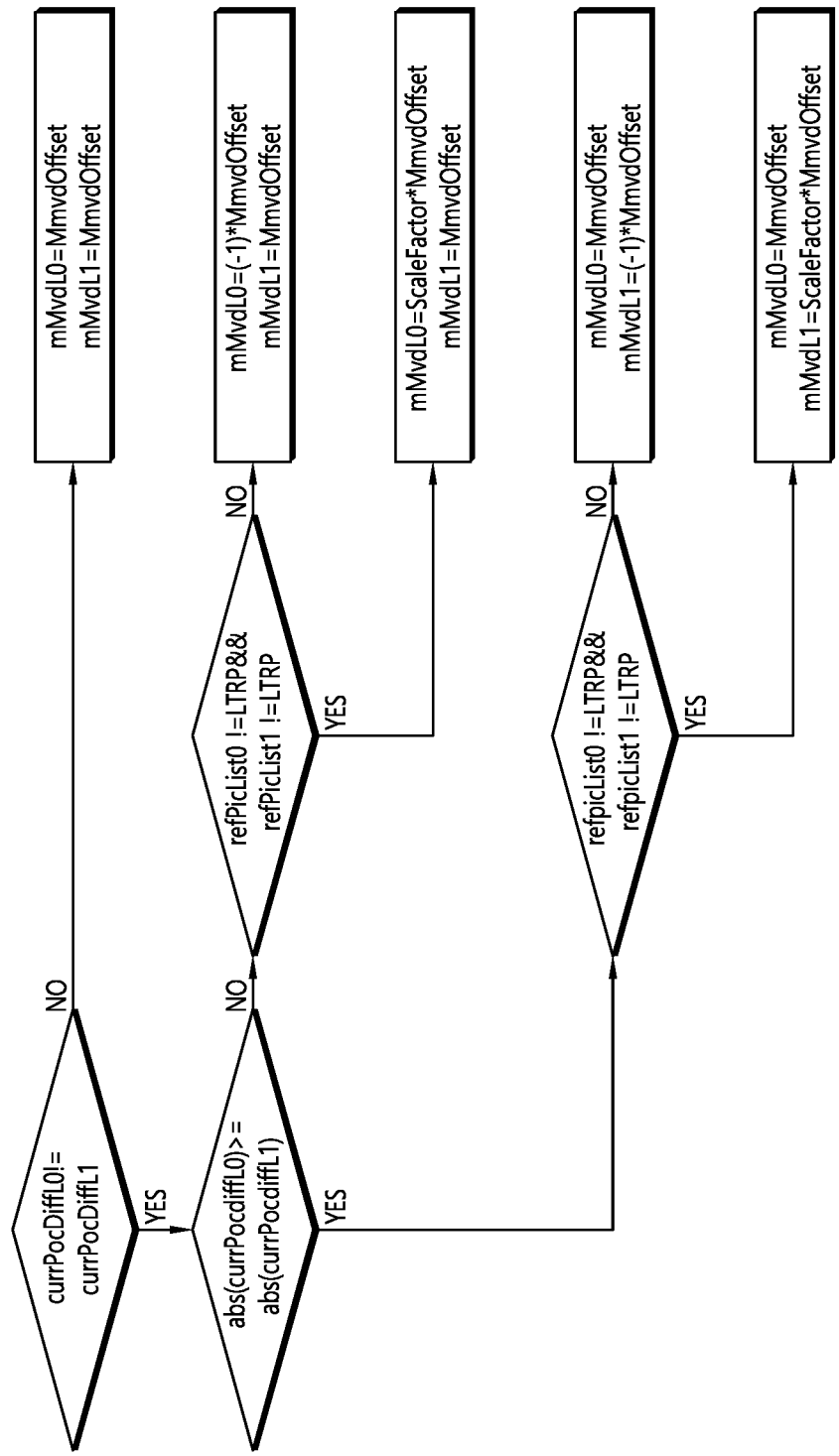
FIG. 16 is a flow diagram illustrating a method for deriving an MMVD according to one embodiment of the present disclosure.

FIG. 16 is a flow diagram illustrating a method for deriving an MMVD according to one embodiment of the present disclosure.

In one embodiment of the present disclosure, an MVD may be derived from an MMVD by considering POC differences and/or reference picture types. Referring to FIG. 16, currPocDiffLX may represent a difference between the POC of a current picture and the POC of a reference picture LX. currPocDiffL0 and currPocDiffL1 may be compared with each other, and the types of reference pictures may be checked ("refPicList0 !=LTRP" or "refPicList1 !=LTRP"). Considering the conditions, MmvdOffset(derived using mmvd_cand_flag, mmvd_distance_idx, and/or mmvd_direction_idx) may be allocated as a value the same as mMvdLX, a mirrored or scaled value of mMvdLX.

The following table represents a part of the standard document according to the present embodiment.

TABLE 28

8.5.2.7 Derivation process for merge motion vector difference

Inputs to this process are:
 a luma location ( xCb, yCb ) of the top-left sample of the current luma coding block relative to the top-left luma sample of the current picture,
 reference indices refIdxL0 and refIdxL1
 prediction list utilization flags predFlagL0 and predFlagL1.
Outputs of this process are the luma merge motion vector differences in 1/16 fractional-sample accuracy mMvdL0 and mMvdL1
The variable currPic specifies the current picture.
The luma merge motion vector differences mMvdL0 and mMvdL1 are derived as follows:
 If both predFlagL0 and predFlagL1 are equal to 1, the following applies:
  currPocDiffL0 = DiffPicOrderCnt( currPic, RefPicList[ 0 ][ refIdxL0 ] ) (8-336)
  currPocDiffL1 = DiffPicOrderCnt( currPic, RefPicList[ 1 ][ refIdxL1 ] ) (8-337)
  If currPocDiffL0 is equal to currPocDiffL1, the following applies:
   mMvdL0[ 0 ] = MmvdOffset[ xCb ][ yCb ][ 0 ] (8-338)
   mMvdL0[ 1 ] = MmvdOffset[ xCb ][ yCb ][ 1 ] (8-339)
   mMvdL1[ 0 ] = MmvdOffset[ xCb ][ yCb ][ 0 ] (8-340)
   mMvdL1[ 1 ] = MmvdOffset[ xCb ][ yCb ][ 1 ] (8-341)
  Otherwise, if Abs( currPocDiffL0 ) is greater than or equal to Abs( currPocDiffL1 ), the following applies:
   td = Clip3( −128, 127, currPocDiffL0 )
       (8-342)
   tb = Clip3( −128, 127, currPocDiffL1 )
       (8-343)
   tx = ( 16384 − ( Abs( td ) >> 1 ) ) / td
       (8-344)
   distScaleFactor = Clip3( −4096, 4095, (tb * tx + 32 ) >> 6) (8-345)
   mMvdL0[ 0 ] = MmvdOffset[ xCb ][ yCb ][ 0 ] (8-346)
   mMvdL0[ 1 ] = MmvdOffset[ xCb ][ yCb ][ 1 ] (8-347)
   If RefPicList[ 0 ][ refIdxL0 ] is not a long-term reference picture and RefPicList[ 1 ][ refIdxL1 ] is not a long-term reference picture, the following applies.
    mMvdL1[ 0 ] = Clip3( −2$^{15}$, 2$^{15}$ −1, (distScaleFactor * mMvdL0[ 0 ] + (8-348)
     128 − ( distScaleFactor * mMvdL0[ 0 ] >= 0 ) ) >> 8 )
    mMvdL1[ 1 ] = Clip3( −2$^{15}$, 2$^{15}$ −1, (distScaleFactor * mMvdL0[ 1 ] + (8-349)
     128 − ( distScaleFactor * mMvdL0[ 1 ] >= 0 ) ) >> 8 )
   Otherwise, the following applies:
    mMvdL1[ 0 ] = Sign( currPocDiffL0 ) = = Sign( currPocDiffL1 ) ?
     mMvdL0[ 0 ] : −mMvdL0[ 0 ] (8-350)
    mMvdL1[ 1 ] = Sign( currPocDiffL0 ) = = Sign( currPocDiffL1 ) ?
     mMvdL0[ 1 ] : −mMvdL0[ 1 ] (8-351)
  Otherwise (Abs( currPocDiffL0 ) is less than Abs( currPocDiffL1 )), the following applies:
   td = Clip3( −128, 127, currPocDiffL1 )
       (8-352)
   tb = Clip3( −128, 127, currPocDiffL0 )
       (8-353)
   tx = ( 16384 + ( Abs( td ) >> 1 ) ) / td
       (8-354)
   distScaleFactor = Clip3( −4096, 4095, ( tb * tx + 32) >> 6 ) (8-355)
   mMvdL1[ 0 ] = MmvdOffset[ xCb ][ yCb ][ 0 ] (8-356)
   mMvdL1[ 1 ] = MmvdOffset[ xCb ][ yCb ][ 1 ] (8-357)
   If RefPicList[ 0 ][ refIdxL0 ] is not a long-term reference picture and RefPicList[ 1 ][ refIdxL1 ] is not a long-term reference picture, the following applies:
    mMvdL0[ 0 ] = Clip3( −2$^{15}$, 2$^{15}$ −1, (distScaleFactor * mMvdL1[ 0 ] + (8-358)
     128 − ( distScaleFactor * mMvdL1[ 0 ] >= 0 ) ) >> 8 )
    mMvdL0[ 1 ] = Clip3( −2$^{15}$, 2$^{15}$ −1, (distScaleFactor * mMvdL1[ 1 ] + (8-359)
     128 − ( distScaleFactor * mMvdL1[ 1 ] >= 0 ) ) >> 8 )
   Otherwise, the following applies:
    mMvdL10[ 0 ] = Sign( currPocDiffL0 ) = = Sign( currPocDiffL1 ) ?
     mMvdL1[ 0 ] : −mMvdL1[ 0 ] (8-360)
    mMvdL0[ 1 ] = Sign( currPocDiffL0 ) = = Sign( currPocDiffL1 ) ?
     mMvdL1[ 1 ] : −mMvdL1[ 1 ] (8-361)
 Otherwise ( predFlagL0 or predFlag1 are equal to 1 ), the following applies for X being 0 and 1:
  mMvdLX[ 0 ] = ( predFlagLX == 1) ? MmvdOffset[ xCb ][ yCb ][ 0 ] : 0 (8-362)
  mMvdLX[ 1 ] = ( predFlagLX == 1) ? MmvdOffset[ xCb ][ yCb ][ 1 ] : 0 (8-363)

When the current picture refers to one or more long-term reference pictures (LTRPs), a mirroring procedure that considers a POC distance may not be required. It is so because a mirroring MVD obtained from a reference picture at a very far distance than other MVDs is not effective in terms of accuracy. Methods for solving the problem above will be described below.

The following table represents a comparison result between embodiments.

TABLE 29

| | | | Embodiment X | | Embodiment Y | | Embodiment Z | |
|---|---|---|---|---|---|---|---|---|
| L0 | L1 | POC | L0 Offset | L1 Offset | L0 Offset | L1 Offset | L0 Offset | L1 Offset |
| Short | Short | Same | Offset | Offset | Offset | Offset | Offset | Offset |
| | | Diff (L0 > = L1) | Offset | Scaled | Offset | Scaled | Offset | Scaled |
| | | Diff (L0 < L1) | Scaled | Offset | Offset | Offset | Offset | Scaled |
| Long | Long | Same | Offset | Offset | Offset | Offset | Offset | Offset |
| | | Diff (L0 > = L1) | Offset | (−1) Offset | Offset | (−1) Offset | Offset | (−1) Offset |
| | | Diff (L0 < L1) | (−1) Offset | Offset | Offset | (−1) Offset | Offset | (−1) Offset |
| Short | Long | Same | N/A | N/A | N/A | N/A | N/A | N/A |
| | | Diff (L0 > = L1) | Offset | (−1) Offset | Offset | (−1) Offset | Offset | (−1) Offset |
| | | Diff (L0 < L1) | (−1) Offset | Offset | Offset | (−1) Offset | Offset | (−1) Offset |
| Long | Short | Same | N/A | N/A | N/A | N/A | N/A | N/A |
| | | Diff (L0 > = L1) | Offset | (−1) Offset | Offset | (−1) Offset | Offset | (−1) Offset |
| | | Diff (L0 < L1) | (−1) Offset | Offset | Offset | (−1) Offset | Offset | (−1) Offset |

Referring to Table 29, embodiment X shows an existing method for deriving MMVD. In embodiment Y, the MMVD procedure may be limited when the current block references one or more long-term reference pictures. In other words, a procedure for comparing POC distances for a long-term reference picture may be omitted in embodiment Y In embodiment Z, the procedure for deriving MMVD may be limited for all cases. In other words, the procedure for comparing POC distances for all cases may be omitted in embodiment Z. In Table 29, Offset may refer to MmvdOffset.

Figure 17:
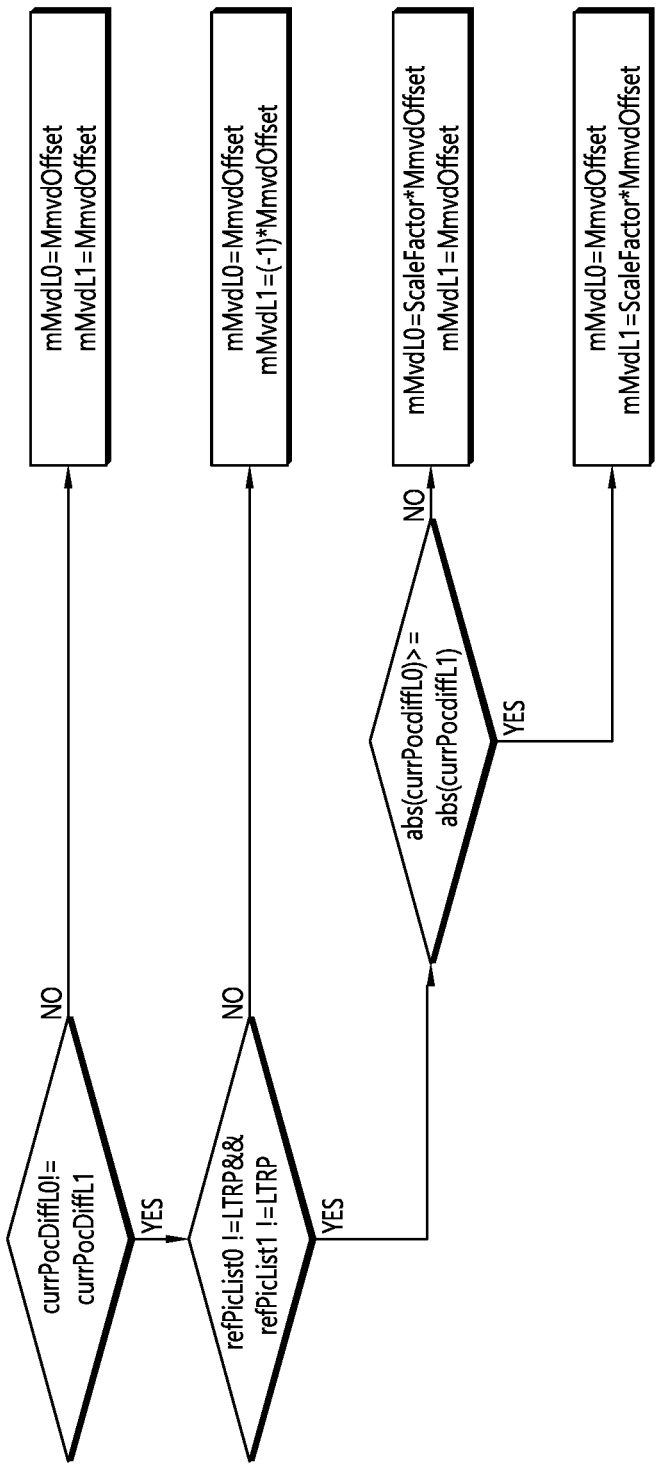
FIG. 17 is a flow diagram illustrating a method for deriving an MMVD according to one embodiment of the present disclosure.

FIG. 17 is a flow diagram illustrating a method for deriving an MMVD according to one embodiment of the present disclosure. The flow diagram of FIG. 17 may describe a method for deriving an MMVD according to embodiment Y above.

Referring to FIG. 17, when a reference picture type is a long-term reference picture, conditions for comparing POC differences may be removed, and an anchor MVD used for a mirroring procedure may be fixed to L0 MVD.

The following table describes a method for deriving MMVDs according to embodiment Y of Table 29 in the form of a standard document.

TABLE 30

8.5.2.7 Derivation process for merge motion vector difference

Inputs to this process are:
    a luma location ( xCb, yCb ) of the top-left sample of the current luma coding block relative to the top-
    left luma sample of the current picture,
    reference indices refIdxL0 and refIdxL1
    prediction list utilization flags predFlagL0 and predFlagL1.
Outputs of this process are the luma merge motion vector differences in 1/16 fractional-sample accuracy
mMvdL0 and mMvdL1
The variable currPic specifies the current picture.
The luma merge motion vector differences mMvdL0 and mMvdL1 are derived as follows:
    If both predFlagL0 and predFlagL1 are equal to 1, the following applies:
        currPocDiffL0 = DiffPicOrderCnt( currPic, RefPicList[ 0 ][ refIdxL0 ] ) (8-336)
        currPocDiffL1 − DiffPicOrderCnt( currPic, RefPicList[ 1 ][ refIdxL1 ] ) (8-337)
        If currPocDiffL0 is equal to currPocDiffL1, the following applies:
            mMvdL0[ 0 ] = MmvdOffset[ xCb ][ yCb ][ 0 ] (8-338)
            mMvdL0[ 1 ] = MmvdOffset[ xCb ][ yCb ][ 1 ] (8-339)
            mMvdL1[ 0 ] = MmvdOffset[ xCb ][ yCb ][ 0 ] (8-340)
            mMvdL1[ 1 ] = MmvdOffset[ xCb ][ yCb ][ 1 ] (8-341)
        If RefPicList[ 0 ][ refIdxL0 ] is a long-term reference picture or RefPicList[ 1 ][ refIdxL1 ] is a long-
        term reference picture, the following applies.
            mMvdL0[ 0 ] = MmvdOffset[ xCb ][ yCb ][ 0 ] (8-342)
            mMvdL0[ 1 ] = MmvdOffset[ xCb ][ yCb ][ 1 ] (8-343)
            mMvdL1[ 0 ] = −mMvdL0[ 0 ]
            (8-344)
            mMvdL1[ 1 ] = −mMvdL0[ 1 ]
            (8-345)
        Otherwise, the following applies :
            td = Clip3( −128, 127, currPocDiffL0 ) (8-346)
            tb = Clip3( −128, 127, currPocDiffL1 ) (8-347)
            tx = ( 16384 + ( Abs( td ) >> 1 ) ) / td (8-348)
            distScaleFactor = Clip3( −4096, 4095, (tb * tx + 32 ) >> 6) (8-349)
        If Abs( currPocDiffL0 ) is greater than or equal to Abs( currPocDiffL1 ), the following applies:
            mMvdL0[ 0 ] = MmvdOffset[ xCb ][ yCb ][ 0 ] (8-350)
            mMvdL0[ 1 ] = MmvdOffset[ xCb ][ yCb ][ 1 ] (8-351)
            mMvdL1[ 0 ] = Clip3( $-2^{15}$, $2^{15}$ − 1, (distScaleFactor * mMvdL0[ 0 ] + (8-352)
            128 − ( distScaleFactor * mMvdL0[ 0 ] >= 0 ) ) >> 8 )
            mMvdL1[ 1 ] = Clip3( $-2^{15}$, $2^{15}$ − 1, (distScaleFactor * mMvdL0[ 1 ] + (8-353)
            128 − ( distScaleFactor * mMvdL0[ 1 ] >= 0 ) ) >> 8 )
        Otherwise (Abs( currPocDiffL0 ) is less than Abs( currPocDiffL1 )), the following applies:
            mMvdL1[ 0 ] = MmvdOffset[ xCb ][ yCb ][ 0 ] (8-354)
            mMvdL1[ 1 ] = MmvdOffset[ xCb ][ yCb ][ 1 ] (8-355)
            mMvdL0[ 0 ] = Clip3( $-2^{15}$, $2^{15}$ − 1, (distScaleFactor * mMvdL1[ 0 ] + (8-356)

TABLE 30-continued 8.5.2.7 Derivation process for merge motion vector difference $128 - ( \text{distScaleFactor} * \text{mMvdL1}[ 0 ] >= 0 ) ) >> 8 )$
$\text{mMvdL0}[ 1 ] = \text{Clip3}( -2^{15}, 2^{15} - 1, (\text{distScaleFactor} * \text{mMvdL1}[ 1 ] + $ (8-357)
$128 - ( \text{distScaleFactor} * \text{mMvdL1}[ 1 ] >= 0 ) ) >> 8 )$
Otherwise ( predFlagL0 or predFlag1 are equal to 1 ), the following applies for X being 0 and 1:
$\text{mMvdLX}[ 0 ] = ( \text{predFlagLX} == 1) ? \text{MmvdOffset}[ \text{xCb} ][ \text{yCb} ][ 0 ] : 0$ (8-358)
$\text{mMvdLX}[ 1 ] = ( \text{predFlagLX} == 1) ? \text{MmvdOffset}[ \text{xCb} ][ \text{yCb} ][ 1 ] : 0$ (8-359)

Figure 18:
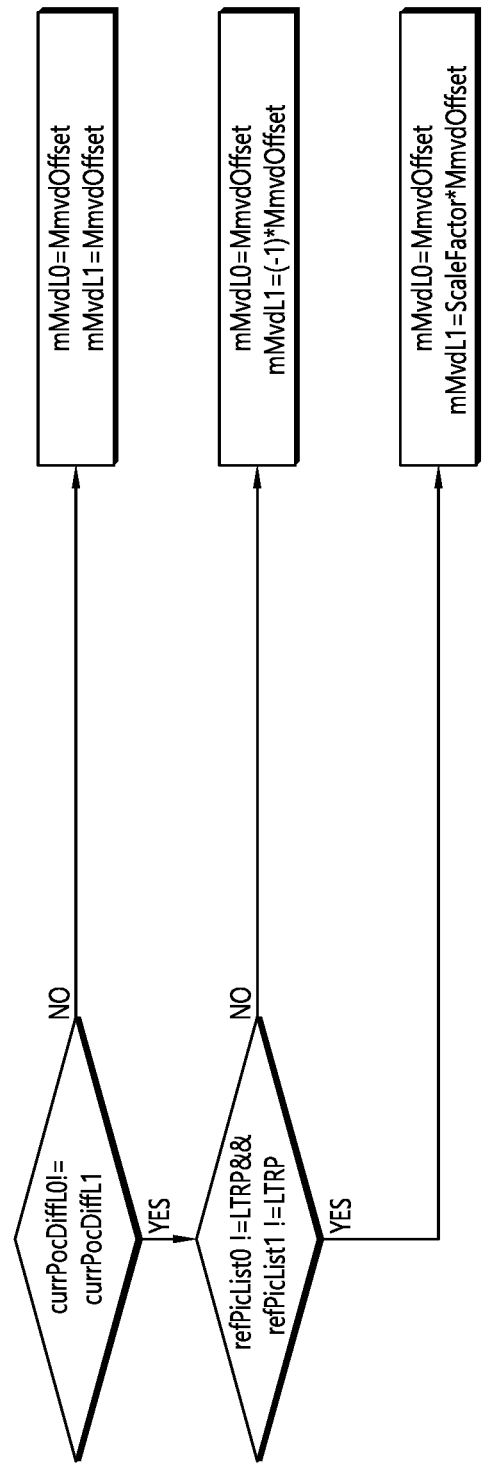
FIG. 18 is a flow diagram illustrating a method for deriving an MMVD according to one embodiment of the present disclosure.

FIG. 18 is a flow diagram illustrating a method for deriving an MMVD according to one embodiment of the present disclosure. The flow diagram of FIG. 18 may describe a method for deriving an MMVD according to embodiment Z above.

Referring to FIG. 18, a procedure for deriving an MMVD may be limited for all cases. Conditions for comparing POC differences may be removed for all cases, and an anchor MVD used for a mirroring or scaling procedure may be fixed to L0 MVD.

The following table describes a method for deriving MMVDs according to embodiment Z in the form of a standard document.

TABLE 31

8.5.2.7 Derivation process for merge motion vector difference

Inputs to this process are:
  a luma location ( xCb, yCb ) of the top-left sample of the current luma coding block relative to the top-left luma sample of the current picture,
  reference indices refIdxL0 and refIdxL1
  prediction list utilization flags predFlagL0 and predFlagL1.
Outputs of this process are the luma merge motion vector differences in 1/16 fractional-sample accuracy mMvdL0 and mMvdL1
The variable currPic specifies the current picture.
The luma merge motion vector differences mMvdL0 and mMvdL1 are derived as follows:
  If both predFlagL0 and predFlagL1 are equal to 1, the following applies:
    currPocDiffL0 = DiffPicOrderCnt( currPic, RefPicList[ 0 ][ refIdxL0 ] ) (8-336)
    currPocDiffL1 = DiffPicOrderCnt( currPic, RefPicList[ 1 ][ refIdxL1 ] ) (8-337)
    If currPocDiffL0 is equal to currPocDiffL1, the following applies:
      mMvdL0[ 0 ] = MmvdOffset[ xCb ][ yCb ][ 0 ] (8-338)
      mMvdL0[ 1 ] = MmvdOffset[ xCb ][ yCb ][ 1 ] (8-339)
      mMvdL1[ 0 ] = MmvdOffset[ xCb ][ yCb ][ 0 ] (8-340)
      mMvdL1[ 1 ] = MmvdOffset[ xCb ][ yCb ][ 1 ] (8-341)
    If RefPicList[ 0 ][ refIdxL0 ] is not a long-term reference picture and RefPiclist[ 1 ][ refIdxL1 ] is not a long-term reference picture, the following applies:
      mMvdL0[ 0 ] = MmvdOffset[ xCb ][ yCb ][ 0 ] (8-342)
      mMvdL0[ 1 ] = MmvdOffset[ xCb ][ yCb ][ 1 ] (8-343)
      mMvdL1[ 0 ] = -mMvdL0[ 0 ] (8-344)
      mMvdL1[ 1 ] = -mMvdL0[ 1 ] (8-345)
    Otherwise, the following applies:
      td - Clip3( -128, 127, currPocDiffL0 ) (8-346)
      td = Clip3( -128, 127, currPocDiffL1 ) (8-347)
      tx = ( 16384 + ( Abs( td ) >> 1 ) ) / td (8-348)
      distScaleFactor = Clip3( -4096, 4095, (tb * tx + 32 ) >> 6) (8-349)
      mMvdL0[ 0 ] = MmvdOffset[ xCb ][ yCb ][ 0 ] (8-350)
      mMvdL0[ 1 ] = MmvdOffset[ xCb ][ yCb ][ 1 ] (8-351)
      mMvdL1[ 0 ] = Clip3( $-2^{15}, 2^{15}$ - 1, (distScaleFactor * mMvdL0[ 0 ] + (8-352)
        128 - ( distScaleFactor * mMvdL0[ 0 ] >= 0 ) ) >> 8 )
      mMvdL1[ 1 ] = Clip3( $-2^{15}, 2^{15}$ - 1, (distScaleFactor * mMvdL0[ 1 ] + (8-353)
        128 - ( distScaleFactor * mMvdL0[ 1 ] >= 0 ) ) >> 8 )
  Otherwise ( predFlagL0 or predFlag1 are equal to 1 ), the following applies for X being 0 and 1:
    mMvdLX[ 0 ] = ( predFlagLX == 1) ? MmvdOffset[ xCb ][ yCb ][ 0 ] : 0 (8-354)
    mMvdLX[ 1 ] = ( predFlagLX == 1) ? MmvdOffset[ xCb ][ yCb ][ 1 ] : 0 (8-355)

Also, in one example of the present embodiment, conditions for comparing POC differences may be removed for all cases, and only the mirroring procedure may be used. The following table describes a method for deriving MMVDs according to the present embodiment in the form of a standard document.

TABLE 32

8.5.2.7 Derivation process for merge motion vector difference

Inputs to this process are:
  a luma location ( xCb, yCb ) of the top-left sample of the current luma coding block relative to the top-left luma sample of the current picture, TABLE 32-continued 8.5.2.7 Derivation process for merge motion vector difference reference indices refIdxL0 and refIdxL1,
    prediction list utilization flags predFlagL0 and predFlagL1.
Outputs of this process are the luma merge motion vector differences in 1/16 fractional-sample accuracy
mMvdL0 and mMvdL1
The variable currPic specifies the current picture.
The luma merge motion vector differences mMvdL0 and mMvdL1 are derived as follows:
    If both predFlagL0 and predFlagL1 are equal to 1, the following applies:
        currPocDiffL0 = DiffPicOrderCnt( currPic, RefPicList[ 0 ][ refIdxL0 ] ) (8-336)
        currPocDiffL1 = DiffPicOrderCnt( currPic, RefPicList[ 1 ][ refIdxL1 ] ) (8-337)
        If currPocDiffL0 is equal to currPocDiffL1, the following applies:
            mMvdL0[ 0 ] = MmvdOffset[ xCb ][ yCb ][ 0 ] (8-338)
            mMvdL0[ 1 ] = MmvdOffset[ xCb ][ yCb ][ 1 ] (8-339)
            mMvdL1[ 0 ] = MmvdOffset[ xCb ][ yCb ][ 0 ] (8-340)
            mMvdL1[ 1 ] = MmvdOffset[ xCb ][ yCb ][ 1 ] (8-341)
        Otherwise, the following applies:
            mMvdL0[ 0 ] = MmvdOffset[ xCb ][ yCb ][ 0 ] (8-346)
            mMvdL0[ 1 ] = MmvdOffset[ xCb ][ yCb ][ 1 ] (8-347)
            mMvdL1[ 0 ] = −mMvdL0[ 0 ] (8-348)
            mMvdL1[ 1 ] = −mMvdL0[ 1 ] (8-349)
    Otherwise ( predFlagL0 or predFlag1 are equal to 1 ), the following applies for X being 0 and 1:
        mMvdLX[ 0 ] = ( predFlagLX == 1) ? MmvdOffset[ xCb ][ yCb ][ 0 ] : 0 (8-358)
        mMvdLX[ 1 ] = ( predFlagLX == 1) ? MmvdOffset[ xCb ][ yCb ][ 1 ] : 0 (8-359)

The following drawings are created to explain a specific example of the present specification. Since the names of specific devices described in the drawings or the names of specific signals/messages/fields are presented by way of example, the technical features of the present specification are not limited to the specific names used in the following drawings.

Figure 19:
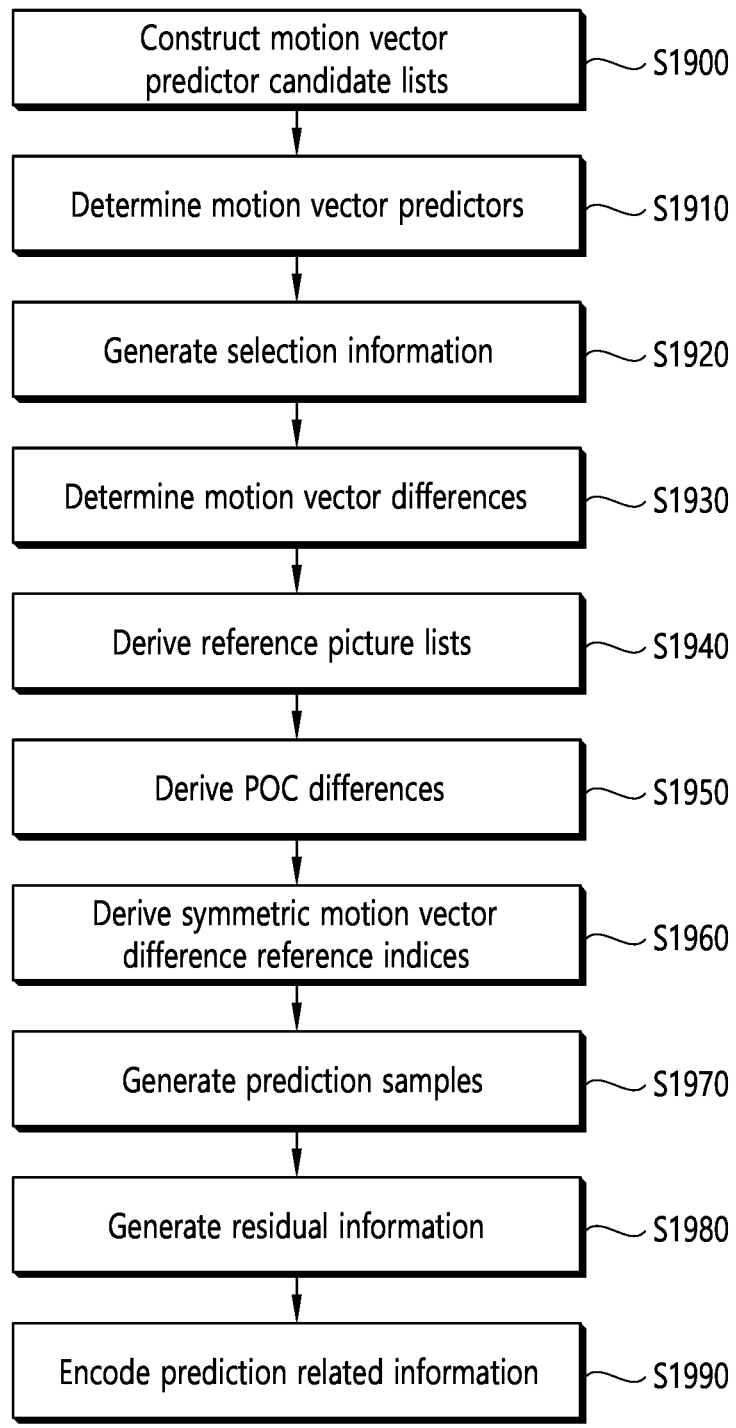
FIGS. 19 and 20 illustrate a video/image encoding method and one example of a related component according to an embodiment(s) of the present disclosure.
Figure 20:
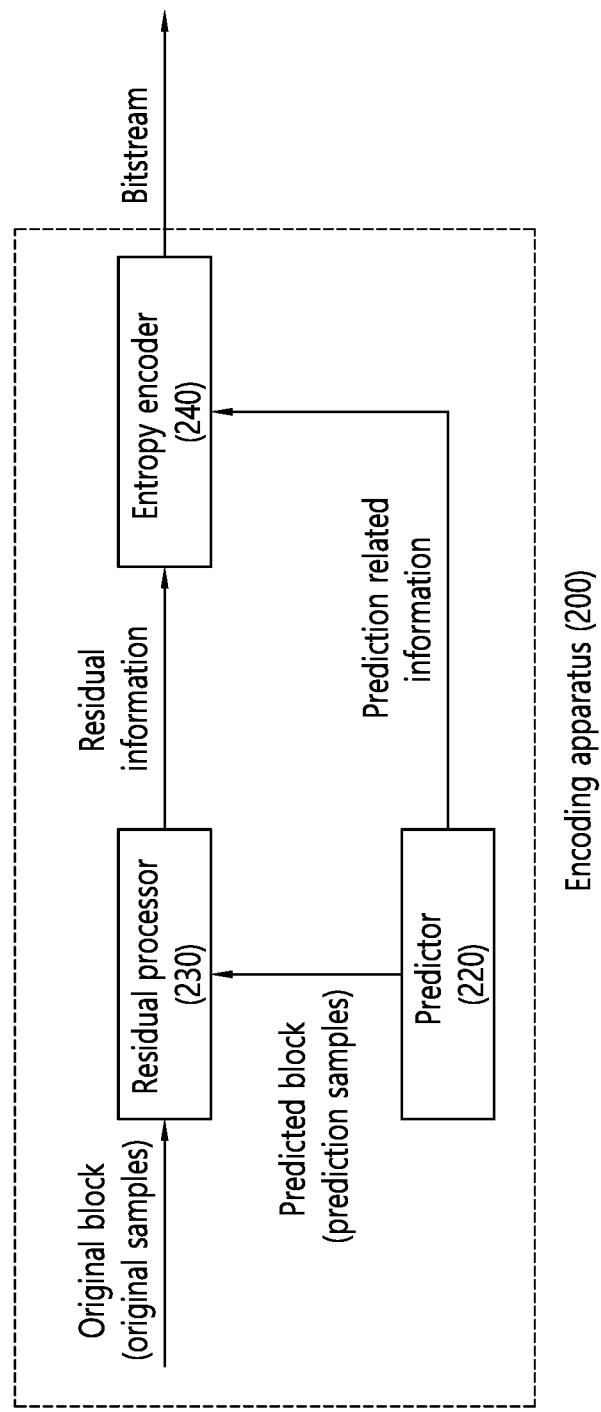

FIGS. 19 and 20 illustrate a video/image encoding method and one example of a related component according to an embodiment(s) of the present disclosure. The encoding apparatus of FIG. 2 may perform the method of FIG. 19. Specifically, for example, the predictor 220 of the encoding apparatus may perform the S1900 to S1970 steps of FIG. 19, and the residual processor 230 of the encoding apparatus may perform the S1980 step. The entropy encoder 240 of the encoding apparatus may perform the S1990 step. The method of FIG. 19 may include the embodiments of the present disclosure described above.

Referring to FIG. 19, the encoding apparatus constructs motion vector predictor candidate lists for a current block S1900. For example, the encoding apparatus may perform inter prediction on the current block considering the rate distortion (RD) cost to generate prediction samples of the current block. Alternatively, for example, the encoding apparatus may determine an inter prediction mode used to generate prediction samples of the current block and derive motion information. Here, the inter prediction mode may be a motion vector prediction (MVP) mode but is not limited to the example. Here, the MVP mode may be referred to as an advanced motion vector prediction (AMVP) mode.

The encoding apparatus may derive optimal motion information for the current block through motion estimation. For example, the encoding apparatus may search for a similar reference block with high correlation in fractional pixel units within a predetermined search range in the reference picture using the original block of the original picture for the case of the current block, through which motion information may be derived.

The encoding apparatus may construct a motion vector predictor candidate list to represent derived motion information using a motion vector predictor and/or a motion vector difference. For example, the encoding apparatus may construct a motion vector predictor candidate list based on a spatial neighboring candidate block and/or a temporal neighboring candidate block. Alternatively, the encoding apparatus may further use a zero motion vector to construct the motion vector predictor candidate list. For example, when bi-prediction is applied to the current block, L0 motion vector predictor candidate list for L0 prediction and L1 motion vector predictor candidate list for L1 prediction may be constructed.

The encoding apparatus determines motion vector predictors of the current block based on the motion vector predictor candidate lists S1910. For example, the encoding apparatus may determine a motion vector predictor for the current block based on the derived motion information (or motion vector) from among motion vector predictor candidates in the motion vector predictor candidate list. Alternatively, the encoding apparatus may determine a motion vector predictor having the smallest difference from the derived motion information (or motion vector) within the motion vector predictor candidate list. For example, when bi-prediction is applied to the current block, the L0 motion vector predictor for L0 prediction and the L1 motion vector predictor for L1 prediction are determined from the L0 motion vector predictor candidate list and the L1 motion vector predictor candidate list, respectively.

The encoding apparatus generates selection information indicating the motion vector predictors from among the motion vector predictor candidate lists S1920. For example, the selection information may be referred to as index information and may also be referred to as an MVP flag or an MVP index. In other words, the encoding apparatus may generate information indicating the motion vector predictor used to represent the motion vector of the current block within the motion vector predictor candidate list. For example, when bi-prediction is applied to the current block, selection information for the L0 motion vector predictor and selection information for the L1 motion vector predictor may be generated, respectively.

The encoding apparatus determines motion vector differences for the current block based on the motion vector predictors S1930. For example, the encoding apparatus may determine a motion vector difference based on the derived motion information (or motion vector) and the motion vector predictor for the current block. Alternatively, the encoding apparatus may determine a motion vector difference based on a difference between the derived motion information (or motion vector) and the motion vector predictor for the current block. For example, when bi-prediction is applied to the current block, the L0 motion vector difference and the L1 motion vector difference may be determined, respectively. Here, the L0 motion vector difference may be denoted by MvdL0, and the L1 motion vector difference may be denoted by MvdL1.

The encoding apparatus derives reference picture lists for the current block S1940. In one example, the reference picture lists may include reference picture list 0 (or L0, reference picture list L0) and reference picture list 1 (or L1, reference picture list L1). For example, the encoding apparatus may construct reference picture lists for each slice included in the current picture.

The encoding apparatus derives POC differences between each of the reference pictures included in the reference picture lists and the current picture S1950. In one example, the POC difference between the current picture and the previous reference picture of the current picture may be larger than 0. In another example, the POC difference between the current picture and the next reference picture of the current picture may be smaller than 0. However, the description above is only an example.

The encoding apparatus derives symmetric motion vector difference reference indices based on the POC differences S1960. The symmetric motion vector difference reference indices may indicate reference pictures for the SMVD application. The symmetric motion vector difference reference indices may include reference index L0 (RefIdxSumL0) and reference index L1 (RefIdxSumL1).

The encoding apparatus may derive motion vectors based on symmetric MVDs and the motion vector predictors. The motion information may include the motion vectors.

The encoding apparatus generates prediction samples based on the motion vector differences and the symmetric motion vector difference reference indices S1970. For example, the prediction samples may be generated based on the blocks (or samples) indicated by the motion vector among the blocks (or samples) within the reference pictures indicated by the reference picture indices.

The encoding apparatus generates prediction related information that includes the inter prediction mode S1950. The prediction related information may include information on MMVD and information on SMVD.

The encoding apparatus derives residual information based on the prediction samples S1980. Specifically, the encoding apparatus may derive residual samples based on the prediction samples and the original samples. The encoding apparatus may derive residual information based on the residual samples.

The encoding apparatus encodes prediction related information including the selection information and the information on the motion vector difference S1990. The encoding apparatus encodes image/video information including the prediction related information and the residual information. The encoded image/video information may be output in the form of a bitstream. The bitstream may be transmitted to the decoding apparatus through a network or a (digital) storage medium. The prediction related information may include information on MMVD and information on SMVD.

The image/video information may include various types of information according to an embodiment of the present disclosure. For example, the image/video information may include information disclosed in at least one of Tables 1 to 32 described above.

In one embodiment, bi-prediction may be applied to the current block. The motion vector differences may include L0 motion vector difference for L0 prediction and L1 motion vector difference for L1 prediction. The symmetric motion vector difference reference indices may include L0 symmetric motion vector difference reference index for L0 prediction and L1 symmetric motion vector difference reference index for L1 prediction. The L0 symmetric motion vector difference reference index and the L1 symmetric motion vector difference reference index may be derived based on the short-term reference pictures included within the reference picture lists.

In one embodiment, the absolute value of the L1 motion vector difference may be the same as that of the L0 motion vector difference. The sign of the L1 motion vector difference may be different from that of the L0 motion vector difference.

In one embodiment, the image information may include a symmetric motion vector difference flag, the value of which is 1.

In one embodiment, the reference picture lists may include reference picture list L0 for L0 prediction and reference picture list L1 for L1 prediction. The POC differences may include a first POC difference between L0 short-term reference picture included in the reference picture list L0 and the current picture and a second POC difference between L1 short-term reference picture included in the reference picture list L1 and the current picture. The L0 symmetric motion vector difference reference index may indicate the L0 short-term reference picture. The L1 symmetric motion vector difference reference index may indicate the L1 short-term reference picture. The L0 symmetric motion vector difference reference index may be derived based on the first POC difference. The L1 symmetric motion vector difference reference index may be derived based on the second POC difference.

In one embodiment, the first POC difference may be the same as that of the second POC difference.

In one embodiment, the reference picture lists may include the reference picture list L0 for L0 prediction. The reference picture list L0 may include a first L0 short-term reference picture and a second L0 short-term reference picture. The POC differences may include a third POC difference between the first L0 short-term reference picture and the current picture and a fourth POC difference between the second L0 short-term reference picture and the current picture. Based on the comparison between the third and fourth POC differences, a reference index indicating the first L0 short-term reference picture may be derived as the L0 symmetric motion vector difference reference index.

In one embodiment, when the third POC difference is smaller than the fourth POC difference, the reference index indicating the first L0 short-term reference picture may be derived as the L0 symmetric motion vector difference reference index.

Figure 21:
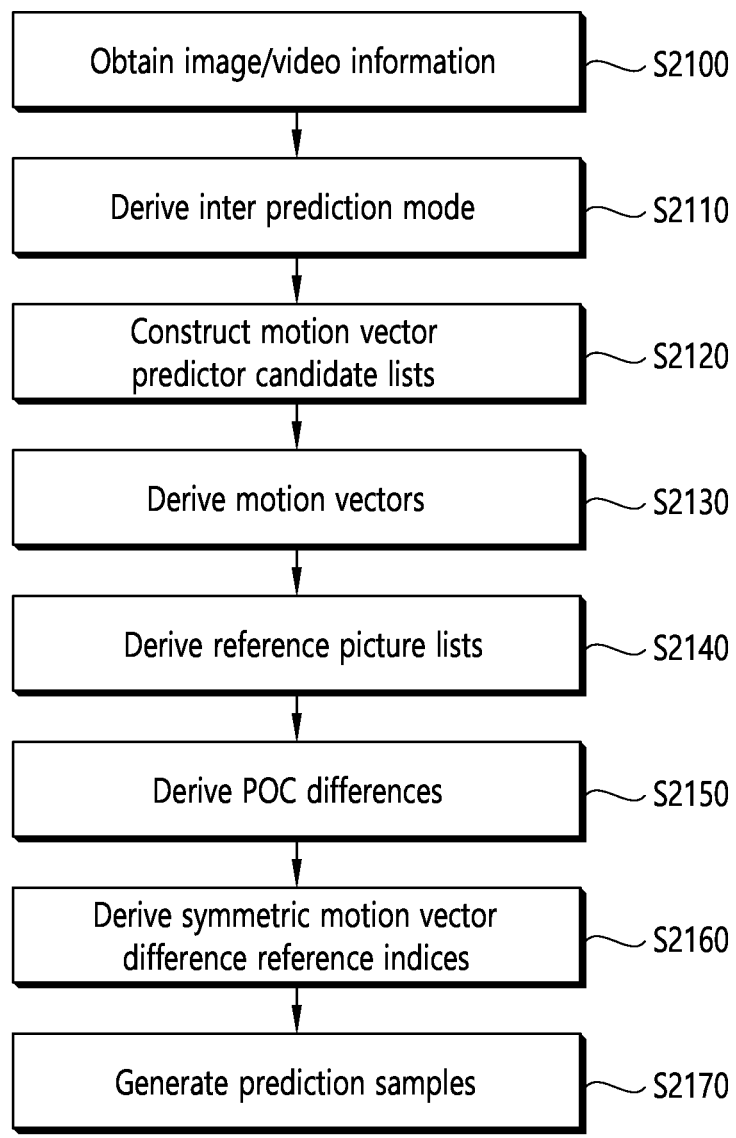
FIGS. 21 and 22 illustrate an image/video decoding method and one example of a related component according to an embodiment(s) of the present disclosure.
Figure 22:
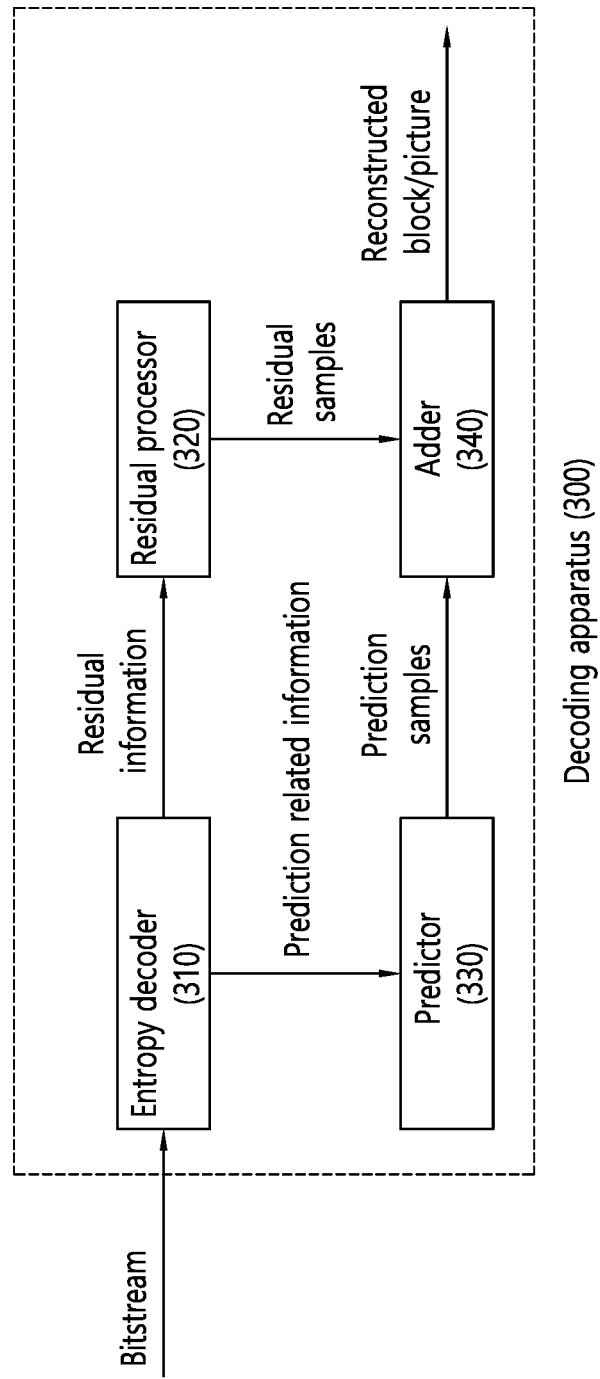

FIGS. 21 and 22 illustrate an image/video decoding method and one example of a related component according to an embodiment(s) of the present disclosure. The decoding apparatus of FIG. 3 may perform the method of FIG. 21. Specifically, for example, the entropy decoder 310 of the decoding apparatus may perform the S2100 step of FIG. 21, and the predictor 330 of the decoding apparatus may perform the S2110 to S2170 steps. The method of FIG. 21 may include the embodiments of the present disclosure described above.

Referring to FIG. 21, the decoding apparatus receives/obtains image/video information S2100. The decoding apparatus may receive/obtain the image/video information through a bitstream. The image/video information may include prediction related information (including prediction mode information) and residual information. The prediction related information may include information on MMVD and information on SMVD. Also, the image/video information may include various types of information according to an embodiment of the present disclosure. For example, the image/video information may include the information disclosed in at least one of Tables 1 to 32 described above.

The decoding apparatus derives the inter prediction mode for a current block based on the prediction related information S2110. Here, the inter prediction mode may include the merge mode, AMVP mode (the mode using motion vector predictor candidates), MMVD, and SMVD.

The decoding apparatus constructs motion vector predictor candidate lists of a current block based on inter prediction mode information S2120. For example, the decoding apparatus may construct a motion vector predictor candidate list based on a spatial neighboring candidate block and/or a temporal neighboring candidate block. Alternatively, the decoding apparatus may further use a zero motion vector to construct the motion vector predictor candidate list. The motion vector predictor candidate list constructed here may be the same as the motion vector predictor candidate list constructed by the encoding apparatus. For example, when bi-prediction is applied to the current block, L0 motion vector predictor candidate list for L0 prediction and L1 motion vector predictor candidate list for L1 prediction may be constructed.

The decoding apparatus derives motion vectors of the current block based on the motion vector predictor candidate lists S2130. For example, the decoding apparatus may derive a motion vector predictor candidate for the current block within the motion vector predictor candidate list based on the selection information described above and based on the derived motion vector predictor candidate, derive motion information (or a motion vector) of the current block. Alternatively, the motion information (or motion vector) of the current block may be derived based on the derived motion vector predictor candidate and a motion vector difference derived from the information on the motion vector difference. For example, when bi-prediction is applied to the current block, L0 motion vector predictor for L0 prediction and L1 motion vector predictor for L1 prediction may be derived from the L0 motion vector predictor candidate list and the L1 motion vector predictor candidate list based on the selection information for L0 prediction and the selection information for L1 prediction, respectively. For example, when bi-prediction is applied to the current block, the L0 motion vector difference and the L1 motion vector difference may be derived based on the information related to the motion vector difference, respectively. Here, MvdL0 may denote the L0 motion vector difference, and MvdL1 may denote the L1 motion vector difference. Also, the motion vector of the current block may be derived as L0 motion vector and L1 motion vector, respectively.

The decoding apparatus derives reference picture lists for the current block S2140. In one example, the reference picture lists may include reference picture list 0 (or L0, reference picture list L0) and reference picture list 1 (or L1, reference picture list L1). For example, the decoding apparatus may construct reference picture lists for each slice included in the current picture.

The decoding apparatus derives POC differences between each of the reference pictures included in the reference picture lists and the current picture S2150. In one example, the POC difference between the current picture and the previous reference picture of the current picture may be larger than 0. In another example, the POC difference between the current picture and the next reference picture of the current picture may be smaller than 0. However, the description above is only an example.

The decoding apparatus derives motion information including reference picture indices for SMVD based on the POC differences S2160. The decoding apparatus may derive reference indices for SMVD. The reference indices for SMVD may indicate reference pictures for the SMVD application. The reference indices for SMVD may include reference index L0 (RefIdxSumL0) and reference index L1 (RefIdxSumL1).

The decoding apparatus generates prediction samples based on the motion information S2170. The decoding apparatus may generate the prediction samples based on the motion vectors and the reference picture indices included in the motion information. For example, the prediction samples may be generated based on the blocks (or samples) indicated by the motion vector from among the blocks (or samples) within the reference pictures indicated by the reference picture indices.

In one embodiment, the motion vectors may be derived based on motion vector predictors and motion vector differences derived based on the motion vector predictor candidate lists. Bi-prediction may be applied to the current block. The motion vector differences may include L0 motion vector difference for L0 prediction and L1 motion vector difference for L1 prediction. The symmetric motion vector difference reference indices may include L0 symmetric motion vector difference reference index for L0 prediction and L1 symmetric motion vector difference reference index for L1 prediction. The L1 motion vector difference may be derived based on the L0 motion vector difference. The L0 symmetric motion vector difference reference index and the L1 symmetric motion vector difference reference index may be derived based on short-term reference pictures included in the reference picture lists.

In one embodiment, the image information may include a symmetric motion vector difference flag. Based on the symmetric motion vector difference flag, the value of which is 1, the L0 symmetric motion vector difference reference index and the L1 symmetric motion vector difference reference index may be derived.

In one embodiment, the absolute value of the L1 motion vector difference may be the same as that of the L0 motion vector difference. The sign of the L1 motion vector difference may be different from that of the L0 motion vector difference.

In one embodiment, the reference picture lists may include reference picture list L0 for L0 prediction and reference picture list L1 for L1 prediction. The POC differences may include a first POC difference between L0 short-term reference picture included in the reference picture list L0 and the current picture and a second POC difference between L1 short-term reference picture included in the reference picture list L1 and the current picture. The L0 symmetric motion vector difference reference index may indicate the L0 short-term reference picture. The L1 symmetric motion vector difference reference index may indicate the L1 short-term reference picture. The L0 symmetric motion vector difference reference index may be derived based on the first POC difference. The L1 symmetric motion vector difference reference index may be derived based on the second POC difference.

In one embodiment, the first POC difference may be the same as that of the second POC difference.

In one embodiment, the reference picture lists may include the reference picture list L0 for L0 prediction. The reference picture list L0 may include a first L0 short-term reference picture and a second L0 short-term reference picture. The POC differences may include a third POC difference between the first L0 short-term reference picture and the current picture and a fourth POC difference between the second L0 short-term reference picture and the current picture. Based on the comparison between the third and fourth POC differences, a reference index indicating the first L0 short-term reference picture may be derived as the L0 symmetric motion vector difference reference index.

In one embodiment, when the third POC difference is smaller than the fourth POC difference, the reference index indicating the first L0 short-term reference picture may be derived as the L0 symmetric motion vector difference reference index.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding device and/or decoding device according to the present document is, for example, may be included in the device that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a tele-conference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 23:
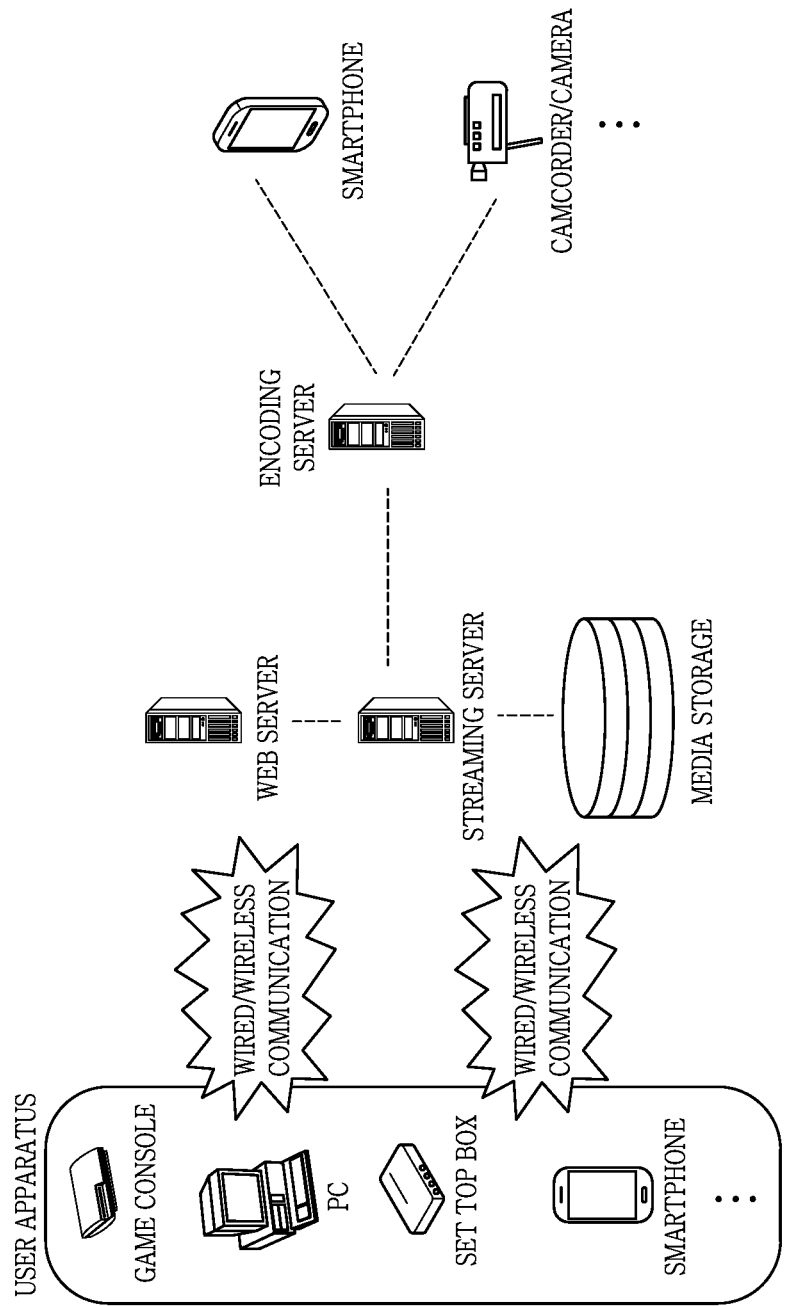
FIG. 23 illustrates an example of a content streaming system to which the embodiments of the present disclosure may be applied.

FIG. 23 shows an example of a content streaming system to which embodiments disclosed in the present document may be applied.

Referring to FIG. 23, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:
    obtaining image information including prediction related information from a bitstream;
    deriving an inter prediction mode based on the prediction related information;
    constructing motion vector predictor candidate lists for a current block based the inter prediction mode;
    deriving motion vectors for the current block based on the motion vector predictor candidate lists;
    deriving reference picture lists for the current block, wherein the reference picture lists include an L0 reference picture list and an L1 reference picture list;
    determining whether an L0 reference picture in the L0 reference picture list is a short-term reference picture;
    deriving a first picture order count (POC) difference between the L0 reference picture in the L0 reference picture list and current picture;
    deriving an L0 symmetric motion vector difference reference index;
    determining whether an L1 reference picture in the L1 reference picture list is a short-term reference picture;
    deriving a second POC difference between the L1 reference picture in the L1 reference picture list and the current picture;
    deriving an L1 symmetric motion vector difference reference index; and
    generating predicted samples based on the motion vectors, the L0 symmetric motion vector difference reference index and the L1 symmetric motion vector difference reference index,
    wherein the motion vectors are derived based on motion vector predictors derived based on the motion vector predictor candidate lists and motion vector differences,
    wherein bi-prediction is applied to the current block,
    wherein the motion vector differences include an L0 motion vector difference for an L0 prediction and an L1 motion vector difference for an L1 prediction,
    wherein the L1 motion vector difference is derived based on the L0 motion vector difference,
    wherein the L0 symmetric motion vector difference reference index is derived based on the first POC difference and a determination that the L0 reference picture in the L0 reference picture list is the short-term reference picture,
    wherein the L0 symmetric motion vector difference reference index is derived by using a reference index for the L0 reference picture which is determined as the short-term reference picture and not a long-term reference picture,
    wherein the L1 symmetric motion vector difference reference index is derived based on the second POC difference and a determination that the L1 reference picture in the L1 reference picture list is the short-term reference picture, and
    wherein the L1 symmetric motion vector difference reference index is derived by using a reference index for the L1 reference picture which is determined as the short-term reference picture and not a long-term reference picture.

2. The method of claim 1, wherein the image information includes a symmetric motion vector difference flag, and
    wherein the L0 symmetric motion vector difference reference index and the L1 symmetric motion vector difference reference index are derived based on a value of the symmetric motion vector difference flag being 1.

3. The method of claim 2, wherein an absolute value of the L1 motion vector difference is equal to an absolute value of the L0 motion vector difference, and
    wherein a sign of the L1 motion vector difference is different from a sign of the L0 motion vector difference.

4. The method of claim 1, wherein the L0 symmetric motion vector difference reference index indicates the L0 reference picture, and the L1 symmetric motion vector difference reference index indicates the L1 reference picture.

5. The method of claim 4, wherein the first POC difference is equal to the second POC difference.

6. The method of claim 1, further comprising:
    deriving a third POC difference between a first L0 short-term reference picture and the current picture; and
    deriving a fourth POC difference between a second L0 short-term reference picture and the current picture,
    wherein the L0 reference picture list includes the first L0 short-term reference picture and the second L0 short-term reference picture, and
    wherein based on a comparison between the third POC difference and fourth POC difference, a reference index indicating the first L0 short-term reference picture is derived as the L0 symmetric motion vector difference reference index.

7. The method of claim 6, wherein based on the third POC difference being smaller than the fourth POC difference, the reference index indicating the first L0 short-term reference picture is derived as the L0 symmetric motion vector difference reference index.

8. An image encoding method performed by an encoding apparatus, the method comprising:
    constructing motion vector predictor candidate lists of a current block;
    determining motion vector predictors of the current block based on the motion vector predictor candidate lists;
    generating selection information indicating the motion vector predictors among the motion vector predictor candidate lists;

determining motion vector differences for the current block based on the motion vector predictors;

deriving reference picture lists including reference pictures, wherein the reference picture lists include an L0 reference picture list and an L1 reference picture list;

determining whether an L0 reference picture in the L0 reference picture list is a short-term reference picture;

deriving a first picture order count (POC) difference between the L0 reference picture in the L0 reference picture list and current picture;

deriving an L0 symmetric motion vector difference reference index;

determining whether an L1 reference picture in the L1 reference picture list is a short-term reference picture;

deriving a second POC difference between the L1 reference picture in the L1 reference picture list and the current picture;

deriving an L1 symmetric motion vector difference reference index;

generating predicted samples based on the motion vector differences, the L0 symmetric motion vector difference reference index and the L1 symmetric motion vector difference reference index;

generating residual information based on the predicted samples; and encoding image information including the residual information and prediction related information including the selection information and information on the motion vector difference, wherein bi-prediction is applied to the current block, wherein the motion vector differences include an L0 motion vector difference for an L0 prediction and an L1 motion vector difference for an L1 prediction, wherein the L0 symmetric motion vector difference reference index is derived based on the first POC difference and a determination that the L0 reference picture in the L0 reference picture list is the short-term reference picture, wherein the L0 symmetric motion vector difference reference index is derived by using a reference index for the L0 reference picture which is determined as the short-term reference picture and not a long-term reference picture, wherein the L1 symmetric motion vector difference reference index is derived based on the second POC difference and a determination that the L1 reference picture in the L1 reference picture list is the short-term reference picture, and wherein the L1 symmetric motion vector difference reference index is derived by using a reference index for the L1 reference picture which is determined as the short-term reference picture and not a long-term reference picture.

9. The method of claim 8, wherein an absolute value of the L1 motion vector difference is equal to an absolute value of the L0 motion vector difference, and wherein a sign of the L1 motion vector difference is different from a sign of the L0 motion vector difference.

10. The method of claim 9, wherein the image information includes a symmetric motion vector difference flag, wherein a value of the symmetric motion vector difference flag is 1.

11. The method of claim 8, wherein the L0 symmetric motion vector difference reference index indicates the L0 reference picture, and the L1 symmetric motion vector difference reference index indicates the L1 reference picture.

12. The method of claim 11, wherein the first POC difference is equal to the second POC difference.

13. The method of claim 8, further comprising:

deriving a third POC difference between a first L0 short-term reference picture and the current picture; and deriving a fourth POC difference between a second L0 short-term reference picture and the current picture, wherein the L0 reference picture list includes the first L0 short-term reference picture and the second L0 short-term reference picture, and wherein based on a comparison between the third POC difference and fourth POC difference, a reference index indicating the first L0 short-term reference picture is derived as the L0 symmetric motion vector difference reference index.

14. The method of claim 12, wherein based on the third POC difference being smaller than the fourth POC difference, the reference index indicating the first L0 short-term reference picture is derived as the L0 symmetric motion vector difference reference index.

15. A transmission method of data for an image, the method comprising:

obtaining a bitstream for the image, wherein the bitstream is generated based on constructing motion vector predictor candidate lists of a current block, determining motion vector predictors of the current block based on the motion vector predictor candidate lists, generating selection information indicating the motion vector predictors among the motion vector predictor candidate lists, determining motion vector differences for the current block based on the motion vector predictors, deriving reference picture lists including reference pictures, wherein the reference picture lists include an L0 reference picture list and an L1 reference picture list, determining whether an L0 reference picture in the L0 reference picture list is a short-term reference picture, deriving a first picture order count (POC) difference between the L0 reference picture in the L0 reference picture list and current picture, deriving an L0 symmetric motion vector difference reference index, determining whether an L1 reference picture in the L1 reference picture list is a short-term reference picture, deriving a second POC difference between the L1 reference picture in the L1 reference picture list and the current picture, deriving an L1 symmetric motion vector difference reference index, generating predicted samples based on the motion vector differences, the L0 symmetric motion vector difference reference index and the L1 symmetric motion vector difference reference index, generating residual information based on the predicted samples, and encoding image information including the residual information and prediction related information including the selection information and information on the motion vector difference; and transmitting the data comprising the bitstream, wherein bi-prediction is applied to the current block, wherein the motion vector differences include an L0 motion vector difference for an L0 prediction and an L1 motion vector difference for an L1 prediction, wherein the L0 symmetric motion vector difference reference index is derived based on the first POC difference and a determination that the L0 reference picture in the L0 reference picture list is the short-term reference picture, wherein the L0 symmetric motion vector difference reference index is derived by using a reference index for the L0 reference picture which is determined as the short-term reference picture and not a long-term reference picture, wherein the L1 symmetric motion vector difference reference index is derived based on the second POC difference and a determination that the L1 reference picture in the L1 reference picture list is the short-term reference picture, and wherein the L1 symmetric motion vector difference reference index is derived by using a reference index for the L1 reference picture which is determined as the short-term reference picture and not a long-term reference picture.

\* \* \* \* \*